US009577981B2

(12) United States Patent
Aso et al.

(10) Patent No.: US 9,577,981 B2
(45) Date of Patent: *Feb. 21, 2017

(54) COMMUNICATION CONTROL METHOD, COMMUNICATION NODE, AND MOBILE NODE

(71) Applicant: Sun Patent Trust, New York, NY (US)

(72) Inventors: Keigo Aso, Osaka (JP); Jun Hirano, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,500

(22) Filed: Sep. 22, 2016

(65) Prior Publication Data

US 2017/0012939 A1 Jan. 12, 2017

Related U.S. Application Data

(63) Continuation of application No. 15/077,453, filed on Mar. 22, 2016, now Pat. No. 9,491,790, which is a
(Continued)

(30) Foreign Application Priority Data

Mar. 31, 2005 (JP) ................................. 2005-101478
Jun. 24, 2005 (JP) ................................. 2005-185751
(Continued)

(51) Int. Cl.
*H04L 29/12* (2006.01)
*H04W 76/02* (2009.01)
(Continued)

(52) U.S. Cl.
CPC ............ *H04L 61/6077* (2013.01); *H04W 8/12* (2013.01); *H04W 76/021* (2013.01); *H04L 61/2007* (2013.01); *H04W 80/04* (2013.01)

(58) Field of Classification Search
None
See application file for complete search history.

(56) References Cited

U.S. PATENT DOCUMENTS 6,549,522 B1   4/2003 Flynn
7,299,044 B2  11/2007 Ikeda et al.
(Continued)

FOREIGN PATENT DOCUMENTS

CN   1282481 A   1/2001
CN   1578273 A   2/2005
(Continued)

OTHER PUBLICATIONS

Chinese Office Action dated Apr. 29, 2010, for corresponding CN Application No. 2006800099044, 25 pages.
(Continued)

*Primary Examiner* — Chirag Shah
*Assistant Examiner* — Srinivasa Reddivalam
(74) *Attorney, Agent, or Firm* — Seed Intellectual Property Law Group LLP

(57) ABSTRACT

A technique is disclosed in which an MN (mobile node) 100 notifies, to a CN (correspondent node), home network connection information indicative of whether or not it is currently in connection with a home network which has allocated its own plurality of HoAs (home addresses), an address of each HA (home agent) and an ID of each HA in a state associated with the plurality of HoAs. Based on the information received from the MN, the CN grasps the home network with which the MN is currently in connection and makes an inquiry about the condition of the HA and sets an appropriate HoA, judged on the basis of the grasping result or the inquiry result, as a destination address of a packet to be transmitted to the MN.

8 Claims, 25 Drawing Sheets

Related U.S. Application Data continuation of application No. 14/860,485, filed on Sep. 21, 2015, now Pat. No. 9,326,305, which is a continuation of application No. 13/875,152, filed on May 1, 2013, now Pat. No. 9,179,483, which is a continuation of application No. 11/909,609, filed as application No. PCT/JP2006/306423 on Mar. 29, 2006, now abandoned.

(30) Foreign Application Priority Data

| Jul. 27, 2005 | (JP) | ................................. | 2005-218094 |
| Oct. 14, 2005 | (JP) | ................................. | 2005-301024 |

(51) Int. Cl.
  *H04W 8/12* (2009.01)
  *H04W 80/04* (2009.01)

(56) References Cited

U.S. PATENT DOCUMENTS

| 7,567,503 | B2 | 7/2009 | Ng et al. |
| 7,961,595 | B2 | 6/2011 | Ng et al. |
| 2002/0009066 | A1 | 1/2002 | Shimizu et al. |
| 2003/0018810 | A1 | 1/2003 | Karagiannis et al. |
| 2004/0037297 | A1 | 2/2004 | Ishida et al. |
| 2004/0047348 | A1 | 3/2004 | O'Neill |
| 2005/0007995 | A1 | 1/2005 | Inoue et al. |
| 2005/0041634 | A1 | 2/2005 | Aura |
| 2005/0101321 | A1 | 5/2005 | Ikeda et al. |
| 2006/0002344 | A1 | 1/2006 | Ono et al. |
| 2006/0050628 | A1 | 3/2006 | Ng et al. |
| 2006/0056369 | A1 | 3/2006 | Morishige et al. |
| 2009/0257346 | A1 | 10/2009 | Ng et al. |

FOREIGN PATENT DOCUMENTS

| EP | 1 432 198 A1 | 6/2004 |
| EP | 1 855 427 A1 | 11/2007 |
| EP | 1 865 670 A1 | 12/2007 |
| JP | 2001-339438 A | 12/2001 |
| JP | 2004-080543 A | 3/2004 |
| JP | 2004-129024 A | 4/2004 |
| JP | 2004-129210 A | 4/2004 |
| JP | 2005-033374 A | 2/2005 |
| WO | 2004/059926 A1 | 7/2004 |
| WO | 2004/105272 A1 | 12/2004 |

OTHER PUBLICATIONS

Derarapalli et al., "Network Mobility (NEMO) Basic Support Protocol," RFC 3963, Jan. 2005, Network Working Group, 33 pages.

International Search Report dated May 16, 2006, for corresponding International Application No. PCT/JP2006/306423, 1 page.

Japanese Office Action dated Jul. 16, 2013, for corresponding JP Application No. 2012-074597, 2 pages.

Johnson et al., "Mobility Support in IPv6," Network Working Group, Jun. 2004, pp. 1-165.

Nordmark et al., "Multihoming L3 Shim Approach," Internet-Draft, <draft-ietf-multi6-13shim-00.txt>, Jan. 10, 2005, 54 pages.

Soliman et al., Hierarchical Mobile IPv6 mobility management, Jun. 2003, IETF Mobile IP working group, 61 pages.

Wakikawa et al., "NEMO Basic Support and Extension for Multihomed Mobile Router," Keio University, Graduate School of Media and Governance, Oct. 28, 2003, 7 pages.

Ylitalo et al., "Dynamic Network Interface Selection in Multihomed Mobile Hosts," Proceedings of the 36th Hawaii International Conference on System Sciences (HICSS'03), IEEE, Piscataway, NJ, USA, Jan. 6-9, 2003, 10 pages.

Partial Supplementary European Search Report dated Nov. 21, 2016, for corresponding EP Application No. 06730371.9-1870/1865669, 8 pages.

FIG. 3

| ID OF HA | ADDRESS OF HA | HoA |
|---|---|---|
| HA. ID1 | ADDRESS OF HA. ID1 | PF1.HoA |
| HA. ID2 | ADDRESS A OF HA. ID2 | PF2.HoA |
| HA. ID2 | ADDRESS B OF HA. ID2 | PF3.HoA |
| HA. ID3 | ADDRESS OF HA. ID3 | PF4.HoA |

FIG. 5

| ID OF HA | HOME NETWORK CONNECTION INFORMATION |
|---|---|
| ADDRESS OF HA. ID ||
| HoA ||

COMMUNICATION CONTROL METHOD, COMMUNICATION NODE, AND MOBILE NODE

TECHNICAL FIELD

The present invention relates to a communication control method, communication node and mobile node which are designed to make communications through the use of the IP (Internet Protocol), and more particularly to a communication node such as a mobile node having both a multihome function and a mobile function, a correspondent node serving as a communication partner of this mobile node or a home agent designed to manage this mobile node, and a communication control method of controlling communications between a mobile node and these communication nodes.

BACKGROUND ART

So far, there has been known a configuration, referred to as a site multihome, which establishes connections with a plurality of internet service providers (ISPs) and enables a subordinate's network to use a plurality of prefixes allocated from each of the ISPs. In addition, there has been known a configuration, referred to as a host multihome, which has a plurality of interfaces and acquires an address from a connection-accepting side for each of the interfaces. In the following description, a site having a side multihome configuration will be referred to as a multihoming site while a subnet (sub-network) pertaining to the multihoming side will be referred to as a site multihoming network.

First of all, referring to FIG. 30, a description will be given hereinbelow of a site multihome. FIG. 30 is an illustration of one example of a configuration of a network for explaining a site multihome according to a prior art technique.

FIG. 30 shows a site 1 which has connections with a plurality of ISPs (ISP 1 and ISP 2) and maintains a connectivity to the internet 701, which is an IP network, through these ISPs. This site 1 includes a subnet A and a subnet B. Therefore, the site 1 is a multihoming site, and the subnets A and B are site multihoming networks.

The site multihome is a technology capable of multiplexing connection routes to the internet 701, and the utilization of the site multihome allows the enhancement of the fault resistance characteristic on the connectivity from a communication node 702 within the site 1 to the internet 701. For example, the communication node 702 within the site 1 can establish a connection with the internet 701 through two ISPs of the ISPs 1 and 2 or it can make a connection through the internet 701 with a communication partner (CN: Correspondent Node) 703.

A prefix (network prefix) is advertised from each of the ISP 1 and the ISP 2 to the site 1 shown in FIG. 30 and, hence, the plurality of prefixes are available within a subnet pertaining to the site 1. Thus, for example, the communication node 702 having a connection with the subnet A can generate a plurality of addresses configured with of the prefixes of the respective ISP 1 and ISP 2.

As means whereby the communication node 702 gets the advantage based on the site multihome, there is a method of switching addresses to be used for communications as needed. The effect based on the site multihome is realizable by determining a transit ISP for a source address in the case of a transmission packet and by determining a transit ISP for a destination address in the case of a reception packet.

On the other hand, at present, in the case of the IETF SHIM6, as a means whereby a communication node which is in a multihomed condition owing to the site multihome makes a communication with a communication partner through the use of a plurality of addresses, there has been proposed a method of managing a plurality of addresses in the interior of a network layer and mapping them into a single identifier with respect to an upper layer for concealing the fact that the plurality of addresses exist (for example, see the following Non-Patent Document 1).

When a communication node transmits a packet to a communication partner by switching a source address, a need exists to previously notify a plurality of addresses to be used for the switching to the communication partner, and the Non-Patent Document 1 additionally discloses a message for the notification of the information thereon. As a method whereby a communication partner can grasp a plurality of addresses of a communication node which is a source, in addition to the method proposed by the Non-Patent Document 1, it is also acceptable to employ a method in which the notification is made in a state where a plurality of addresses are included in a message according to a different protocol, such as a binding update message based on the mobile IP disclosed in the following Non-Patent Document 2. Thus, the communication partner can recognize that, even in the case of a packet in which a different source address is set, it is a packet transmitted from the same communication node.

Meanwhile, several methods are conceivable as means whereby a communication partner determines a destination address to be set in a transmission packet. For example, there are a method of directly using, as a destination address, an address set in a source address of a packet received from a communication node which is in a multihoming condition and a method which involves using an address indicated explicitly by that communication node or using an address selected in consideration of information on address selection.

Thus, as the advantages, the utilization of the site multihome enables multiplexing the communication routes at the transmission/reception of a packet and achieves the recovery at a communication disconnection stemming from the interior of an ISP, the load distribution for the ISP or the like.

In the following description, a node which is in connection with a site multihoming network and which generates and holds a plurality of addresses configured with a plurality of prefixes (network prefixes) will sometimes be referred to as a site multihoming node.

Secondly, referring to FIG. 31, a description will be given hereinbelow of a host multihome. FIG. 31 is an illustration of one example of an arrangement of a network for explaining a host multihome according to a conventional technique. FIG. 31 shows a communication node 902 which establishes connections with subnets (subnet A and subnet B) through the use of a plurality of interfaces and maintains the connectivity with the internet 901 which is an IP network.

In this case, the host multihome signifies a configuration in which a node (which is sometimes referred to as a host multihoming node) having a plurality of interfaces holds a plurality of addresses acquired from each interface connection side. A node (for example, the communication node 902) having such a configuration can multiplex the communication routes at the transmission/reception of a packet as well as the site multihome in a manner such that the switching among the interfaces is made for the communication with the communication partner 903, and it can provide the advantages, such as the recovery at communication disconnection stemming from interfaces, connected networks and ISPs and the load distribution.

Furthermore, a brief description will be given hereinbelow of a mobile IP disclosed in the Non-Patent Document 2. An MN (Mobile Node) which is a communication node according to the mobile IP receives, as allocation, at least one HoA (Home Address) from its own home network. In a case in which this MN moves to a different sub-network (foreign network), it acquires at least one CoA (Care-of Address) on a sub-network of the driving destination and transmits a binding update message including CoA association information as binding information indicative of the relationship between this CoA and the HoA allocated in the home network to an HA (Home Agent) in the home network. In this way, the HA receives, as proxy, a packet transmitted toward the HoA of the MN and transfers it to the CoA, which enables the MN to receive the packet addressed to the HoA even in the case of lying in a foreign network.

Moreover, in a case in which the MN has established a connection with a home network, it transmits a binding update message to an HA in this home network for making a request for the deletion of the registered CoA association information. Upon receipt of this binding update message, the HA deletes the CoA association information on the MN, it holds, and stops the proxy reception of a packet transmitted toward the HoA of the MN. In this way, the packet addressed to the HoA of the MN is received by the interface of the MN which is in connection with the home network.

A description will be given hereinbelow of a case in which a plurality of HAs have relation with an MN. As the case in which a plurality of HAs have relation with an MN, the following two cases are conceivable.

The first is a case in which a plurality of HAs exists in a home network allocated to an MN. In this case, each of the plurality of HAs is connected on the same linkage, and the MN registers the CoA association information in one of these HAs. As disclosed in the Non-Patent Document 1, the MN can acquire an address list of the HAs existing in the home network by employing a technique referred to as a DHAAD (Dynamic Home Agent Address Discovery). This technique is realizable in a manner such that the MN first transmits a request message to a home agent anycast address generated with a prefix of its own home network and, upon receipt of this request message, the HA in the home network returns a response message including an address list of the HAs to this MN. The addresses of the HAs included in the address list are arranged in the order of the priority of the respective HAs and, hence, the MN can select the appropriate HA by using the addresses in the order from the leading address.

The second is a case in which a plurality of home networks are allocated to an MN. The home network to be allocated to the MN is a network which provides an HoA of the MN and an HA made to manage this HoA, and the allocation of the plurality of home networks signifies that, since an HoA is allocated from each of the home networks, the MN holds a plurality of HoAs at the same time and an HA made to manage each of the HoAs exists on each of the home networks. As well as a communication node which is in a site multihomed condition, this MN is required to select an HoA to be set in a source address of a transmission packet, and when the MN switches the HoA as the source address to transmit a packet to a CN, it is required to notify a plurality of HoAs, which are to be used for the switching, to this CN in advance. In the second case, as well as the first case, a plurality of HAs can exist in a home network.

In addition, in a case in which an MN after movement transmits a packet to a CN without carrying out a route optimization, the MN generates a packet where its own HoA is set as a source address and transmits it in a state where it is encapsulated as an inner packet into an outer header addressed to the HA. Thus, the packet is delivered to the HA in a encapsulated condition and, after decapsulated in the HA, it is transferred to the CN. As disclosed in the Non-Patent Document 2, the destination of the outer header of this encapsulated packet should be the address of the HA which is managing the HoA set in the source address of the inner header. Therefore, in the case of an MN having a plurality of HoAs, since the HA through which the encapsulated packet passes is determined according to which of HoAs is selected as a source address of the inner packet, it is appropriate that the HoA selection is made in consideration of the condition of each of the HAs.

In a case in which a plurality of home networks allocated to an MN exist under the same management, although the MN may acquire priority information produced with respect to all the HAs existing on a plurality of home networks as the objects of comparison at a time, if a plurality of home networks which are not under the same management are allocated thereto, difficulty is experienced in acquiring the priority information, which has been produced with all the HAs being the objects of comparison, at a time, and the MN itself is required to collect the information from each of the HAs on a plurality of home networks for making the comparison therebetween. For this reason, for acquiring the information for the comparison between HAs existing on the respective home networks, the MN is required to inquire at the HAs on the respective home networks allocated thereto.

On the other hand, as in the case of the CN which is a communication node in a multihomed condition, as means whereby a CN determines a destination address to be set in a transmission packet, several methods are conceivable. For example, there are a method in which an HoA set in a source address of a packet received from an MN is directly used as a destination address and a method which involves using an address explicitly indicated by the MN or using an HoA selected in consideration of information on address selection.

In a case in which a CN transmits a packet to an MN, since the CN does not know the CoA of this MN, the CN transmits a packet in a state where an HoA is set as a destination address. The packet where the HoA of the MN is set as the destination address is proxy-received by an HA managing this HoA, and the HA encapsulates it and transmits toward the CoA of the MN. Thus, as well as a packet to be transmitted by the MN, the HA through which the packet transmitted from the CN passes becomes an HA which manages the HoA set as a destination address of a transmission packet and, hence, it is appropriate to select a destination address of the transmission packet to the MN in consideration of the HA condition. Moreover, in this case, as well as the case of the MN, there is a need for the CN to make an inquiry at an HA existing in a home network of the MN so as to acquire the information for the comparison between the HAs.

A description will be given hereinbelow of a case in which a home network to be allocated to an MN is a site multihoming network. The HoA of the MN is an address configured with a prefix advertised in a network. Therefore, in a case in which the home network is a site multihoming network, since a plurality of different prefixes are advertised in the home network, if a plurality of different prefixes in a single network are available as prefixes for the configuration of the HoA of the MN, a single home network becomes capable of allocating a plurality of HoAs to a single MN.

As well as the case of the allocation of a plurality of home networks, also in this case, the MN is required to select an HoA to be set in a source address, and the CN is also required to select an HoA to be set as a destination address. In addition, conceivable is a case in which a plurality of home networks are allocated to an MN and, of these home networks, one or a plurality of home networks are site multihoming networks. Also in this case, it is considered that the destination address selection is made by the MN and CN in a manner similar to those mentioned above.

Furthermore, a description will be given hereinbelow of a case in which an MN according to the mobile IP is a host multihoming node. As specified in the mobile IP, a home network and a foreign network exist as the connection-accepting side of an interface of the MN. This also applies to a case in which a plurality of interfaces exist, and each of the interfaces is connectable to one of the networks.

In a case in which the MN makes communications through the use of an interface which is in connection with the home network, since a home address is allocated to this interface, a communication using an HoA directly becomes feasible without utilizing the packet switching according to the mobile IP. On the other hand, if the MN makes communications through the use of an interface which is in connection with a foreign network, since a CoA which is a valid address on the foreign network is allocated to this interface, employable are a method of utilizing the mobile IP and encapsulating a packet using an HoA between an MN and an HA before the transmission/reception thereof, a method of carrying out the route optimization with respect to a CN and conducting the transmission/reception by using a CoA directly, and other manners.

Non-Patent Document 1: Erik Nordmark, Marcelo Bagnulo, "Multihoming L3 Shim Approach", draft-ietf-multi6-13shim-00.txt, 10 Jan. 2005.

Non-Patent Document 2: Johnson, D. B., Perkins, C. E., and Arkko, J., "Mobility Support in IPv6", RFC3775, June 2004.

However, in a case in which, even after an MN holding a plurality of HoAs has acquired a CoA to be associated with an HoA due to movement, for preventing the present position from being known, it transmits/receives all packets through an HA without notifying the CoA acquired at the movement destination to a CN, the CN cannot grasp the present connection situation of the MN (for example, whether or not the MN is moving). As disclosed in the Non-Patent Document 2, this is because the registration of binding information in the CN by the MN is made at its option.

For this reason, even in a situation where the MN is in connection with one of a plurality of home networks and is capable of directly making a communication by using an HoA allocated from this home network, there is a possibility that the CN selects an HoA allocated from a home network which is not in connection with the MN and starts the communication. In this case, a packet transmitted from the CN arrives at the MN through a home network different from the home network which is in connection with the MN, which creates a problem in that the packet transmission route becomes relatively long and a delay of the packet transmission/reception occurs.

In addition, when the MN has a plurality of interfaces and one of these interfaces is in connection with a home network, the communication becomes feasible by directly using an HoA allocated to the interface which is in connection with that home network. However, in a case in which, for utilizing a different interface connected to a foreign network, the address allocated to this interface is registered in an HA in a state associated as a CoA with an HoA allocated to the interface which is in connection with the home network, this CoA association information is held in a binding cache of the HA, and all packets transmitted to the HoA of the MN are proxy-received by the HA and transferred to the associated CoA. Moreover, likewise, also with respect to the CN, in a case in which the MN associates an address, allocated to a different interface which is in connection with the foreign network, as a CoA with an HoA allocated to an interface which is in connection with the home network and registers it in the CN, this CoA association information is held in a binding cache of the CN, and a packet transmitted from the CN to the HoA of the MN is delivered through the HA to the MN. This creates a problem in that, for the optimization of the communication route, the CN selects one to be transmitted to the CoA of the MN by use of the CoA association information.

Still additionally, since the interface connected to the home network is utilized when the CoA association information relative to the HoA is already held in the HA and/or CN as the CoA association information on the interface connected to the foreign network, if the CoA association information in the HA and/or the CN are deleted, all the packets are received by the interface connected to the home network of the MN.

For these reasons, even in a case in which communications are made by using both an interface connected to a home network and an interface connected to a foreign network, a current-status binding update message or a binding cache held by an HA and/or a CN cannot cope with the notification and maintenance of these states, the MN cannot establish a communication using simultaneously both the interface connected to the home network and the interface connected to the foreign network. In addition, in this case, since the MN has registered the CoA association information in the CN, this causes that the CN has an interpretation different from the actual condition, i.e., the CN makes a judgment that no connection with the home network takes place.

In a case in which a plurality of home networks are allocated to an MN and a CN selects an HoA in consideration of a condition of an HA of the MN when one or a plurality of home networks of these home networks are site multihoming networks, even if a plurality of HoAs are notified from the MN, the CN cannot distinguish between these HoAs being addresses in the home networks which are site multihoming networks and they being addresses in normal home networks. Accordingly, even if several HoAs of the plurality of HoAs allocated to the MN are allocated from the same home network and managed by the same HA, the CN cannot recognize this fact and, hence, there is a possibility that the CN makes a judgment that each of the HoAs is allocated from a separate home network and managed by a separate HA and makes an inquiry at the HA.

In this case, since the CN recognizes that the HAs equal in number to the HaAs of the MN exist, for example, in the case of an inquiry at the HA, the inquiry is made at the HA which is recognized as the HA corresponding to each HoA. Accordingly, the CN carries out unnecessary inquiry, such as making the same inquiry at the same HA a number of times, which creates a problem in that ineffective time and processing take place until the address selection reaches completion.

As described above, for the selection of an HoA of an MN by a CN, the CN cannot grasp the current MN connection condition and HoA allocation status, which creates a problem in that a delay of communication occurs due to undesirable HoA selection, unnecessary HA inquiry processing, or the like.

Moreover, in a case in which an MN holds a plurality of interfaces and one of these interfaces is connected to a home network while a different interface is connected to a foreign network, there is a problem in that, even if both the interface connected to the home network and the interface connected to the foreign network are available, the MN cannot utilize these at the same time on the basis of the mobile IP in the present situation.

BRIEF SUMMARY

In consideration of the above-mentioned problems, it is an object of the present invention to, when a plurality of HAs are allocated to an MN, enable a CN which is a communication partner of the MN to appropriately recognize the HAs and connection condition of the MN and select an appropriate HoA from a plurality of HoAs and set it as a destination address of a packet to be transmitted to the MN, thereby reducing the delay stemming from the processing on selection among the plurality of HoAs and the delay of communication due to a result of the selection for achieving the improvement of communication efficiency.

Furthermore, it is an object of the present invention to, even in a case in which an MN having a plurality of interfaces is connected to a home network and a foreign network, enable an HA of the MN and/or a CN to recognize an appropriate connection condition of the MN, and allow the MN to employ these interfaces simultaneously for realizing the multiplexing of communication routes.

For achieving the above-mentioned purposes, in a communication control method according to the present invention for a communication between a mobile node to which a plurality of home addresses are allocated and a predetermined communication node, the mobile node notifies, to the predetermined communication node, information enabling a selection of a home address which is preferably set as a destination address of a packet when the packet is transmitted from the predetermined communication node to the mobile node.

With this arrangement, when an MN has a plurality of HoAs, a CN which is a communication partner of the MN can select an appropriate HoA from the plurality of HoAs and set it as a destination address of a packet to be transmitted to the MN, thereby reducing the delay stemming from the processing on selection among the plurality of HoAs and the delay of communication due to a result of the selection for achieving the improvement of communication efficiency.

Combined with the above-mentioned arrangement, the communication control method according to the present invention comprises:

a mobility association information notifying step in which the mobile node notifies, to the predetermined communication node, information on association between the plurality of home addresses of the mobile node and home network connection information indicative of whether or not the mobile node is currently in connection with one or a plurality of home networks which have allocated the plurality of home addresses;

a home address specifying step in which, when the predetermined communication node transmits a packet to the mobile node, the predetermined communication node makes reference to the home network connection information to specify a home network with which the mobile node is currently in connection; and a destination address setting step in which the communication node sets the home address of the mobile node, associated with the home network specified in the home address specifying step, as a destination address of the packet.

With this arrangement, when the MN is in connection with a home network, the CN can transmit a packet in which set is an HoA which allows the direct arrival at this home network.

In addition, combined with the above-mentioned arrangement, the communication control method according to the present invention further comprises a care-of-address acquiring step in which, when the mobile node is currently in connection with one or a plurality of home networks which have allocated the plurality of home addresses, the mobile node acquires a care-of address compatible with the home network, wherein, in the mobility association information notifying step, the care-of address acquired in the care-of-address acquiring step is used as the home network connection information.

With this arrangement, through the notification of the care-of address acquired in the home network, the mobile node can notify the fact that an interface having the home address corresponding to this care-of address is currently in connection with the home network.

Still additionally, combined with the above-mentioned arrangement, the communication control method according to the present invention further comprises:

a mobility association information notifying step in which the mobile node notifies, to the predetermined communication node, information on the association among the plurality of home addresses of the mobile node, addresses of one or a plurality of home agents managing the plurality of home addresses and home agent ID information enabling the identification of each of the plurality of home agents;

a home agent inquiring step in which the predetermined communication node makes an inquiry at each of the plurality of home agents, identified by the home agent ID information, about a condition of the home agent;

a home agent selecting step in which the predetermined communication node selects a home agent, through which a packet to be transmitted from the predetermined communication node to the mobile node passes, on the basis of a result of the inquiry in the home agent inquiring step; and a destination address setting step in which the home address of the mobile node associated with the home agent selected in the home agent selecting step is set as the packet destination address.

This arrangement allows the CN to make an inquiry about the conditions at the HAs which are made to manage a plurality of HoAs of the MN to select an optimum HA through which a packet to be transmitted from the CN to the MN passes and to transmit the packet in which the HoA associated with this HA is set. Moreover, at this time, this arrangement enables avoiding the duplicate inquiry at the same HA.

Yet additionally, combined with the above-mentioned arrangement, the communication control method according to the present invention further comprises:

a mobility association information notifying step in which, when the mobile node has a plurality of communication interfaces each connectable to a different network and is connected to a home network through at least one of the plurality of communication interfaces, the mobile node notifies, to the predetermined communication node, information on association between home network connection information indicative of the home address which is currently in connection with the home network and the fact that this home address is currently in connection with the home network and an address allocated to a different communication interface which is not connected to the home network; and an destination address setting step in which, when the predetermined communication node transmits a packet to the mobile node, the predetermined communication node selects and sets a destination address to be set as a destination address of the packet, from the home address which is currently in connection with the home network and the address allocated to the different communication interface.

With this arrangement, when the CN or the HA acquires each address allocated to each of the plurality of communication interfaces of the MN, for example, if a disconnection of a communication using an HoA as a destination address occurs, the selection of a CoA associated with this HoA is made, which enables the recovery of the communication in a manner such that the packet in which the HoA is set as the destination address is switched to be directed to the CoA associated with the HoA.

Moreover, combined with the above-mentioned arrangement, the communication control method according to the present invention further comprises a selection function notifying step in which the predetermined communication node notifies the fact that the predetermined communication node has a home address selection function to select the home address properly set as a destination address of a packet when the packet is transmitted from the predetermined communication node to the mobile node.

This arrangement allows the CN or the HA to notify, to the MN, the fact that it has a function (function according to the present invention) to be used when it selects a home address, including, for example, a home network connection information registration function and others.

Still moreover, combined with the above-mentioned arrangement, in the communication control method according to the present invention, the predetermined communication node is a home agent of the mobile node and, in the selection function notifying step, the predetermined communication node transmits a router advertisement message including information indicating that the predetermined communication node has the home address selection function so as to notify the fact that the predetermined communication node has the home address selection function, to the mobile node connected to a network in which the predetermined communication node exists.

This arrangement allows the HA to transmit, for example, a router advertisement message, in which set is a flag indicative of the fact that it handles a function according to the present invention, to the MN connected to the home network, thereby achieving the notification of the fact that it handles a function of the present invention.

Furthermore, for achieving the above-mentioned purposes, a communication node according to the present invention, which makes a communication with a mobile node to which a plurality of home addresses are allocated, comprises:

mobility association information acquiring means for receiving, from the mobile node, information on the association between the plurality of home addresses of the mobile node and home network connection information indicative of whether or not the mobile node is currently in connection with one or a plurality of home networks which have allocated the plurality of home addresses;

home address specifying means for, when a packet is transmitted to the mobile node, making reference to the home network connection information to specify a home network with which the mobile node is currently in connection; and destination address setting means for setting the home address of the mobile node, associated with the home network specified by the home address specifying means, as a destination address of the packet.

With this configuration, when the MN is in connection with a home network, the CN can transmit a packet in which set is an HoA which allows the direct arrival at this home network.

Furthermore, for achieving the above-mentioned purposes, a communication node according to the present invention, which makes a communication with a mobile node to which a plurality of home addresses are allocated, comprises:

mobility association information acquiring means for notifying, from the mobile node, information on association among the plurality of home addresses of the mobile node, addresses of one or a plurality of home agents managing the plurality of home addresses and home agent ID information enabling an identification of each of the plurality of home agents;

home agent inquiry executing means for, when a packet is transmitted to the mobile node, making an inquiry at each of the plurality of home agents identified on the basis of the home agent ID information about a condition of the home agent;

home agent selecting means for selecting a home agent, through which a packet to be transmitted to the mobile node passes, on the basis of a result of the inquiry acquired by the home agent inquiry executing means; and destination address setting means for setting the home address of the mobile node, associated with the home agent selected by the home agent selecting means, as a destination address of the packet.

This configuration allows the CN to make an inquiry about the conditions at the HAs which are made to manage a plurality of HoAs of the MN to select an optimum HA through which a packet to be transmitted from the CN to the MN passes and to transmit the packet in which the HoA associated with this HA is set. Moreover, at this time, this configuration enables avoiding the duplicate inquiry at the same HA.

Still furthermore, for achieving the above-mentioned purposes, a communication node according to the present invention, which makes a communication with a mobile node to which one or a plurality of home addresses are allocated, with the mobile node having one or a plurality of communication interfaces connectable to a home network and a foreign network and the mobile node being connected to the home network through at least one of the one or plurality of communication interfaces, comprises:

mobility association information acquiring means for receiving, from the mobile node, information on the association between home network connection information indicative of the current connection with the home network and an address allocated to a different communication interface which is not in connection with the home network; and destination address setting means for, when a packet is transmitted to the mobile node, selecting and setting a destination address, as a destination address of the packet, from the home address which is currently in connection with the home network and the address allocated to the different communication interface.

With this configuration, when the CN or the HA acquires each address allocated to each of the plurality of communication interfaces of the MN, for example, if a disconnection of a communication using an HoA as a destination address occurs, the selection of a CoA associated with this HoA is made, which enables the recovery of the communication in a manner such that the packet in which the HoA is set as the destination address is switched to be directed to the CoA associated with the HoA.

In addition, combined with the above-mentioned configuration, in the communication node according to the present invention, a care-of address acquired in the home network with which the mobile node is currently in connection is used as the home network connection information indicative of the current connection with the home network.

With this configuration, for example, by detecting the fact that a care-of address notified from a mobile node and a home address corresponding to this care-of address have the same network prefix, the communication node can grasp the fact that the interface having this home address is currently in connection with the home network.

Yet furthermore, for achieving the above-mentioned purposes, a mobile node according to the present invention to which one or a plurality of home addresses are allocated, comprises mobility association information notifying means for notifying, to a predetermined communication node, home network connection information indicative of whether or not its own communication interface is currently in connection with one or a plurality of home networks which have allocated the home addresses.

With this configuration, an MN can notify, to a CN, information indicative of whether or not the MN is in connection with a home network and indicative of the home network connected thereto and, when the MN is in connection with the home network, the CN can transmit a packet in which set is an HoA which allows the direct arrival at this home network.

Moreover, for achieving the above-mentioned purposes, a mobile node according to the present invention to which a plurality of home addresses are allocated, comprises mobility association information notifying means for notifying, to a predetermined communication node, information on the association among its own plurality of home addresses, addresses of one or a plurality of home agents managing the plurality of home addresses and home agent ID information enabling the identification of each of the plurality of home agents.

This configuration allows the MN to notify, to the CN, information on the home agents managing its own plurality of HoAs and further the CN to make an inquiry about the conditions at the HAs which are made to manage the plurality of HoAs of the MN to select an optimum HA through which a packet to be transmitted from the CN to the MN passes and to transmit the packet in which the HoA associated with this HA is set. At this time, add to it that this configuration enables avoiding the duplicate inquiry at the same HA.

Still moreover, for achieving the above-mentioned purposes, a mobile node according to the present invention to which one or a plurality of home addresses are allocated, with the mobile node having one or a plurality of communication interfaces connectable to a home network and a foreign network and the mobile node being connected to the home network through at least one of the one or plurality of communication interfaces, comprises mobility association information notifying means for notifying, to a predetermined communication node, information on the association between home network connection information indicative of the current connection with the home network and an address allocated to a different communication interface which is not in connection with the home network.

With this configuration, the MN can notify, to the CN or the HA, each address allocated to each of the plurality of communication interfaces of the MN, for example, if a disconnection of a communication using an HoA as a destination address occurs, the CN or the HA selects a CoA associated with this HoA, which enables the recovery of the communication in a manner such that the packet in which the HoA is set as the destination address is switched to be directed to the CoA associated with the HoA.

In addition, combined with the above-mentioned configuration, the mobile node according to the present invention further comprises care-of-address acquiring means for acquiring a care-of address compatible with the home network with which the mobile node is currently in connection, wherein the mobility association information notifying means uses the care-of address, acquired by the care-of-address acquiring means, as the home network connection information.

With this configuration, through the notification of the care-of address acquired in the home network, the mobile node can notify the fact that an interface having the home address corresponding to this care-of address is currently in connection with the home network.

According to the present invention, as the advantages based upon with the above-mentioned arrangements and configurations, an MN having a plurality of HoAs notifies, to a CN, a connection condition with a network corresponding to each of the plurality of HoAs, so the CN becomes capable of selecting an appropriate HoA, and even in a case in which several HoAs of the plurality of the MN are managed by the same HA, the notification of appropriate information to the CN enables the CN to select an appropriate HoA and allows an efficient inquiry at an HA.

In addition, since the MN notifies, to the HA and/or the CN, information on an interface connected to a network as information separate from CoA association information on a different interface, the HA and/or the CN can recognize a proper connection condition of the MN, and the MN can use simultaneously an interface connected to a home network and an interface connected to a foreign network.

BRIEF DESCRIPTION OF THE DRAWINGS

FIG. 3 is an illustration of one example of an information storage table storing mobility association information in an allocation mobility association information holding unit of an MN according to the first embodiment of the present invention;

FIG. 5 is an illustration of one example of HoA information included in a plural-HoA information notification message generated by a plural-HoA information notification message generating unit of an MN according to the first embodiment of the present invention;

DETAILED DESCRIPTION

First to third embodiments of the present invention will be described hereinbelow with reference to the drawings.

First Embodiment

Figure 1:
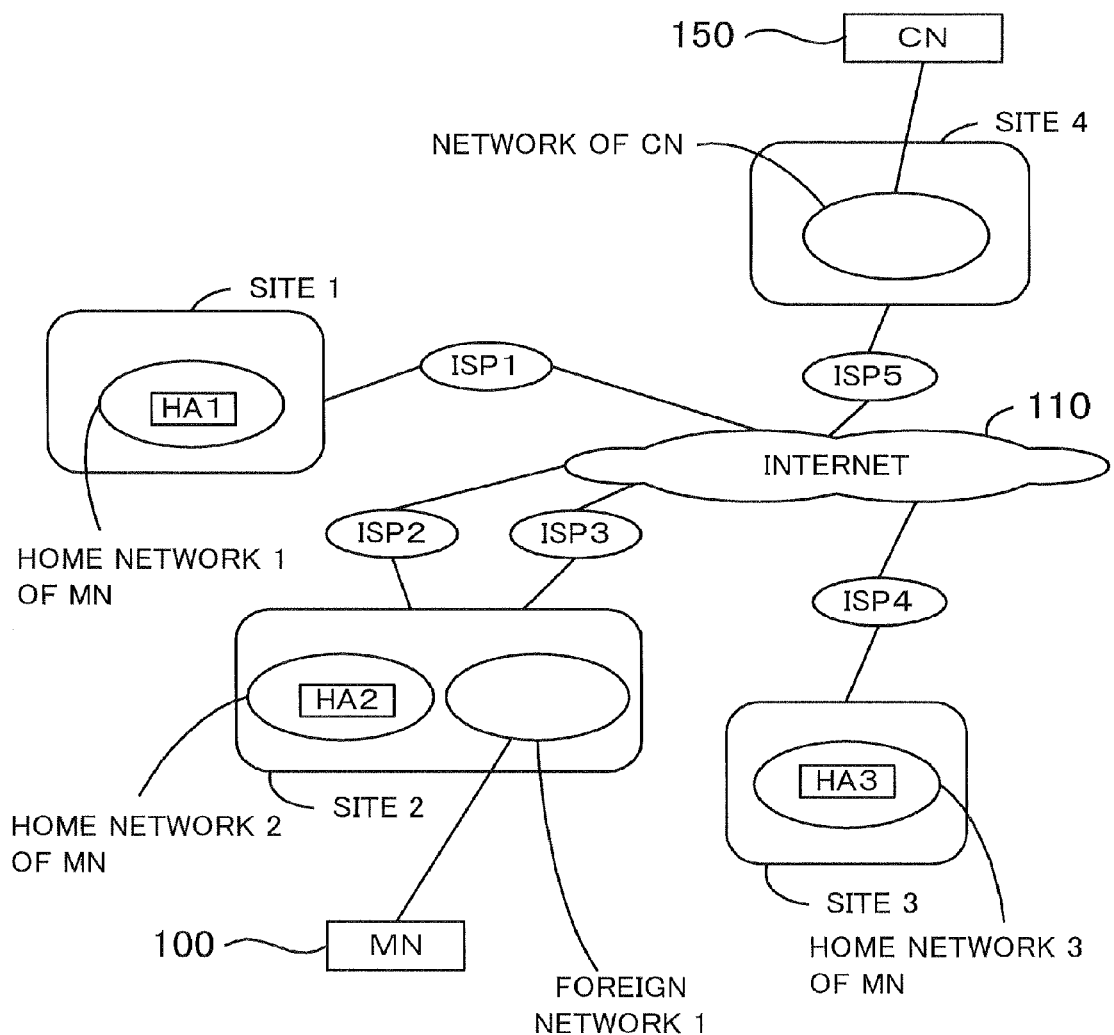
FIG. 1 is an illustration of one example of a configuration of a network according to a first embodiment of the present invention.

First of all, referring to FIG. 1, a description will be given of a configuration of a network according to a first embodiment of the present invention. FIG. 1 is an illustration of one example of a configuration of a network according to the first embodiment of the present invention. Incidentally, the configuration of a communication system shown in FIG. 1 is only one example, but the present invention is not limited to the configuration shown in FIG. 1.

In FIG. 1, shown are four sites (site 1, site 2, site 3 and site 4), an MN 100 connected to a network of the site 2 of these four sites and a CN 150 connected to a network of the site 4. Moreover, the respective sites 1 to 4 are connected through ISPs to each other. The site 1 is connected through the ISP 1 to the internet 110, the site 2 is connected thereto through the ISP 2 and the ISP 3, the site 3 is connected thereto through the ISP 4, and the site 4 is connected thereto through the ISP 5.

To the MN 100, a home network 1, a home network 2 and a home network 3 are allocated from the site 1, the site 2 and the site 3, respectively, and an HA 1 serving as a home agent made to manage the MN 100 exists in the home network 1, and an HA 2 and an HA 3 lie in the home network 2 and the home network 3, respectively. The home network 2 pertains to the site 2 connected to two ISPs (ISP 2 and ISP 3) so as to have a site multihome configuration, and since two prefixes (network prefixes) advertised from both the ISP 2 and the ISP 3 are usable within the home network 2, the home network 2 can allocate a global address (HoA), configured with these two prefixes, to the MN 100.

On the other hand, since only one prefix advertised from one ISP is available within each of the home network 1 and the home network 3, one HoA is allocated to the MN 100 within each of the home network 1 and the home network 3. Although a plurality of addresses can also be generated with one prefix, a description will be given hereinbelow of a case in which one global address is generated from one prefix. Each of these global addresses will sometimes be referred to simply as an address. Moreover, the configuration shown in FIG. 1 is only one example, and the numbers of home networks to be allocated to the MN 100, home agents, HoAs and interfaces of the MN 100 are not limited to the above-mentioned configuration, but one or multiple is also acceptable.

In the following description, a prefix advertised from each of the ISPs 1 to 5 is expressed by a symbol in which the number of the ISP is appended to PF. That is, the prefix advertised from the ISP 1 is expressed by PF1, the prefix advertised from the ISP 2 is designated by PF1, the prefix advertised from the ISP 3 is represented by PF3, the prefix advertised from the ISP 4 is depicted by PF4, and the prefix advertised from the ISP 5 is denoted by PF5.

For making clear the prefix of an address held by the MN 100 and the contents (HoA or CoA) of this address, an address held by the MN 100 is expressed by a combination of a symbol where the number of ISP is appended to PF and HoA or CoA. That is, for example, an HoA configured with a prefix advertised from the site 1 is designated by PF1. HoA. Accordingly, HoAs held by the MN 100 in FIG. 1 are four: PF1. HoA, PF2. HoA, PF3. HoA and PF4. HoA, while CoAs acquired from a foreign network 1 under connection are two: PF2. CoA and PF3. CoA. Moreover, an address of the CN 150 is depicted by PF5. CN.

With the network configuration shown in FIG. 1, a first embodiment of the present invention will be described hereinbelow in consideration of a case in which, when the MN 100 is in connection with the foreign network 1, the MN 100 makes a communication with the CN 150 through the HA 1 within the home network 1. Thus, in this case, a packet to be transmitted from the MN 100 to the CN 150 includes a packet addressed to the CN 150 as an inner packet and becomes an encapsulated packet addressed to the HA 1 within the home network 1.

Figure 2:
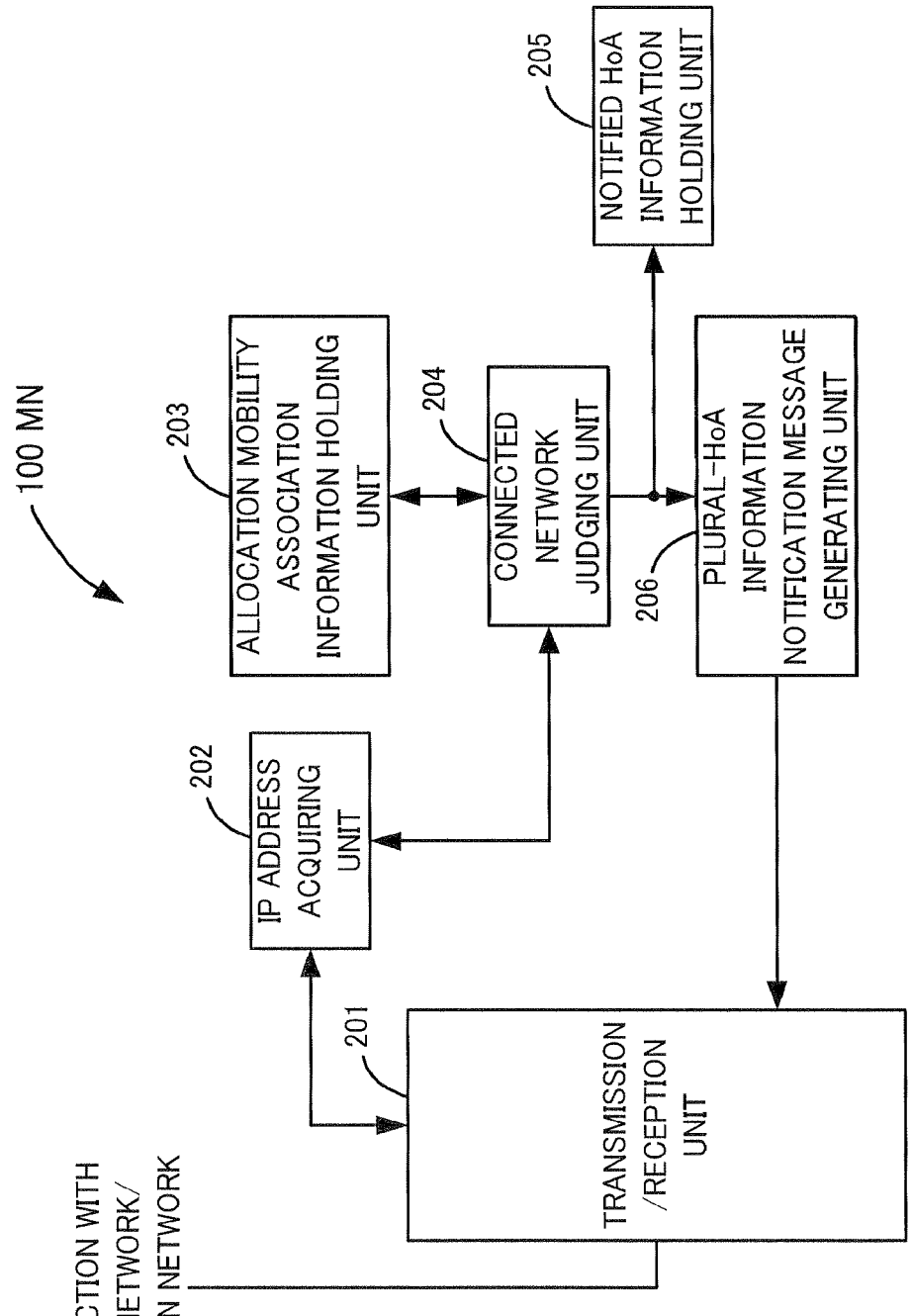
FIG. 2 is a block diagram showing one example of a configuration of an MN according to the first embodiment of the present invention.

First, a description will be given of a configuration of an MN according to the first embodiment of the present invention. FIG. 2 is a block diagram showing one example of a configuration of an MN according to the first embodiment of the present invention. The MN 100 shown in FIG. 2 is composed of a transmission/reception unit 201, an IP address acquiring unit 202, an allocation mobility association information holding unit 203, a connected network judging unit 204, a notified HoA information holding unit 205 and a plural-HoA information notification message generating unit 206. In FIG. 2, although functions realized in the MN 100 are shown by blocks, these functions are realizable by hardware or software.

The transmission/reception unit 201 is connected through radio communication to a network (for example, a home network of the MN 100 or a foreign network), and it fulfills a function to make a communication with an arbitrary node within these networks and to make a communication through an ISP with an arbitrary node connected to a different network. This transmission/reception unit 201 includes one or more communication interfaces, and an IP address generated/acquired by the IP address acquiring unit 202 is allocated to each of these communication interfaces.

Moreover, the IP address acquiring unit 202 fulfills a function to generate or acquire an IP address through the use of the address automatic setting (stateless address autoconfiguration), the DHCP (Dynamic Host Configuration Protocol), the manual setting or the like for the purpose of obtaining a valid IP address in a network connected thereto. Still moreover, for example, a case in which an address is dynamically allocated from an operator side in a manner different from the DHCP is also conceivable.

For example, in the case of the employment of the address automatic setting, the IP address acquiring unit 202 hands over a prefix, advertised in a connected network, to the connected network judging unit 204 to indicate the judgment on the connected network on the basis of this prefix. If the judgment result by the connected network judging unit 204 shows a connection with a foreign network, the IP address acquiring unit 202 automatically generates an address by use of a prefix acquired in advance. On the other hand, if the judgment result shows a connection with a home network, the IP address acquiring unit 202 acquires a home address, allocated from a connected home network, from the allocation mobility association information holding unit 203 to allocate this address to a communication interface or automatically generates an address by use of a prefix in a home network to allocate it to a communication interface. An IP address acquired by the IP address acquiring unit 202 in this way is allocated to a communication interface of the transmission/reception unit 201 in a state associated. Incidentally, the acquisition of the prefix information on a connection-accepting side network and the address generation/acquisition method are not limited to the above-mentioned methods.

In addition, the allocation mobility association information holding unit 203 has a function to hold a home network allocated thereto, an HoA allocated from this home network, a prefix thereof, information (for example, address of an HA) on an HA managing this HoA and others in a state associated with each other.

Still additionally, the connected network judging unit 204 has a function to make a judgment on a network with which it is in connection. The connected network judging unit 204 acquires a prefix of its own home network from the allocation mobility association information holding unit 203 so as to make a comparison between this acquired prefix and a prefix in the connected network notified from the IP address acquiring unit 202. When this comparison result shows that both the prefixes agree with each other, a judgment is made that it is in connection with the home network. If they do not agree with each other, a judgment is made that it is in connection with a foreign network. The connected network judging unit 204 hands over this judgment result to the IP address acquiring unit 202. The method of making a judgment on a connected network is not limited to the above-mentioned method, but an arbitrary method whereby a variation of a connected network is detectable is usable.

Yet additionally, when the connected network judging unit 204 has detected a connection with a different network due to the movement of the MN 100, the connected network judging unit 204 hands over, to the notified HoA information holding unit 205, the information indicative of whether the connection-accepting side network is the home network or the foreign network, a plurality of HoAs to be notified to the CN 150 and the information (for example, an address of the HA) on the HA which has allocated these HoAs, acquired from the allocation mobility association information holding unit 203, and indicates the holding of these pieces of information, and further hands them over to the plural-HoA information notification message generating unit 206 and gives an instruction to the plural-HoA information notification message generating unit 206 for generating a plural-HoA information notification message.

The notified HoA information holding unit 205 fulfills a function to hold the information on plural-HoA information handed over from the connected network judging unit 204 and notified to the CN 150. Moreover, the plural-HoA information notification message generating unit 206 generates a plural-HoA information notification message on the basis of the information notified from the connected network judging unit 204 and hands over this plural-HoA information notification message to the transmission/reception unit 201 and gives an instruction for the transmission thereof to the CN 150.

Referring to FIG. 3, a description will be given hereinbelow of information to be stored in the allocation mobility association information holding unit 203 of the MN 100. FIG. 3 is an illustration of one example of an information storage table, in which an allocation mobility association information holding unit of an MN stores mobility association information, according to the first embodiment of the present invention.

In the information storage table shown in FIG. 3, an ID (ID of an HA) for the identification of an HA in a home network to which the MN 100 itself pertains, an address of an HA managing an HoA and information on an HoA of the MN 100 actually managed by this HA are stored in a state associated with each other. When the HoA of the MN 100 itself, the address of the HA which has allocated this HoA to the MN 100, and the ID for the identification of this HA are held in a state associated with each other, a plurality of HoAs are allocated to the MN 100 and, even if several HoAs of the plurality of HoAs are managed by the same HA (that is, in a case in which a plurality of HoAs are allocated from a home network which is in a site multihome condition), the identification becomes feasible between the plurality of HoAs allocated from the home network which is in a site multihome condition and an HoA allocated from a home network other than this home network.

As the method of allocating these mobility association information (information which may be changed due to movement of the MN 100), it is also acceptable that they are set statically by a manager of the MN 100, and that they are acquired dynamically in a manner such that the MN 100 interchanges messages through the transmission/reception unit 201 with respect to an authentication server (not shown), an HA or the like.

Although FIG. 3 shows one example in which the information are managed by using the IDs of HAs and, if the IDs of the HAs are identical to each other, even if the addresses of the HAs are different from each other, they are considered to be the same HA, it is also appropriate to make a similar judgment on the basis of the addresses of the HAs without using the IDs of the HAs. However, in the case of the judgment based on the addresses of the HAs, if the HA has a plurality of addresses, there is a possibility that the judgment is made as separate HAs. In such a case, it is preferable that the identification of the HA is made using information such as ID other than the address so that the confirmation on the HA identify becomes feasible even in a case in which a single HA has a plurality of addresses. Moreover, it is also acceptable to manage the information on the basis of only the ID of the HA without using the address of the HA.

Figure 4:
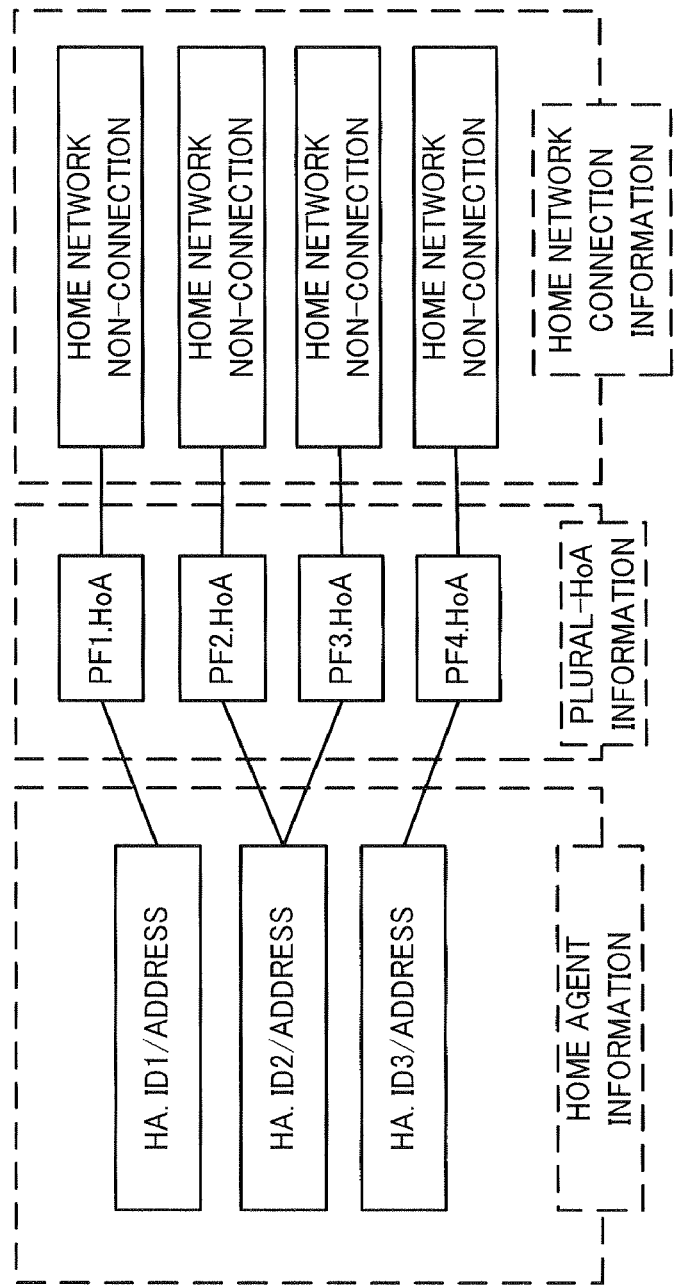
FIG. 4 is an illustration of one example of information which is to be handed over from a connected network judging unit to a notified HoA information holding unit and a plural-HoA information notification message generating unit in an MN according to the first embodiment of the present invention.

In addition, referring to FIG. 4, a description will be given hereinbelow of information (mobility association information) to be handed over from the connected network judging unit 204 to the notified HoA information holding unit 205 and the plural-HoA information notification message generating unit 206 in the MN 100. FIG. 4 is an illustration of one example of information a connected network judging unit hands over to a notified HoA information holding unit and a plural-HoA information notification message generating unit in an MN according to the first embodiment of the present invention.

The connected network judging unit 204 associates information, indicative of whether or not it is currently in connection with the home network which has allocated a plurality of HoAs, with the plurality of HoAs held by the allocation mobility association information holding unit 203. Moreover, in a case in which the MN 100 now allocates one HoA to an interface and a direct communication is possible through the use of this HoA, information indicative of the fact that it is in connection with the home network is added in a state associated with this HoA.

In the example shown in FIG. 4, the notified HoA information holding unit 205 holds the information (home agent information) indicative of the fact that the PF1. HoA is managed by an HA identified the HA. ID1 or the address thereof. Moreover, the notified HoA information holding unit 205 holds the information indicative of the fact that the PF2. HoA and the PF3. HoA are managed by an HA identified the HA. ID2 or the address thereof. Still moreover, the notified HoA information holding unit 205 holds the information indicative of the fact that the PF4. HoA is managed by an HA identified the HA. ID3 or the address thereof. In addition, since the MN 100 does not make a connection with any home network at present but it is in connection with the foreign network, the information indicative of non-connection with the home network is appended to the home network connection information associated with all the HoAs.

Referring to FIG. 5, a description will be given hereinbelow of HoA information included in a plural-HoA information notification message generated by the plural-HoA information notification message generating unit 206 in the MN 100. FIG. 5 is an illustration of one example of HoA information included in a plural-HoA information notification message generated by a plural-HoA information notification message generating unit in an MN according to the first embodiment of the present invention.

As shown in FIG. 5, the plural-HoA information notification message contains the ID of an HA, home network connection information, an address of an HA (HA. ID address) specified by the ID of the HA and each field for the insertion of an HoA managed by the HA.

When this plural-HoA information notification message is transmitted to the CN 150, it is possible to notify, to the CN 150, the address of the HA managing the HoA and the home network connection information indicative of whether or not the HoA is valid in the current MN connection condition (that is, whether or not the MN is currently in connection with the home network where this HoA is valid). That is, the information grasped and managed by the MN 100 as shown in FIG. 4 is notified through the use of the plural-HoA information notification message shown in FIG. 5, to the CN 150.

This plural-HoA information notification message carrying HoA information is not limited to a new message, but it is also appropriate that, for example, similar information is included in a binding update message based on the mobile IP and transmitted, and that the information is included in a message according to a protocol handling site multihome or host multihome and transmitted. Moreover, it is also appropriate to generate a plural-HoA information notification message including only information on an HA managing an HoA but not including home network connection information, or to generate a plural-HoA information notification message including only the home network connection information but not including information on an HA managing an HoA.

As described above, the MN 100 shown in FIG. 2 can hold plural-HoA information in a state associated with identification information on an HA which manages each HoA. Moreover, the MN 100 shown in FIG. 2 can hold that, particularly, a plurality of HoAs (that is, a plurality of HoAs generated in a site multihome condition) are managed by the same HA. Still moreover, the MN 100 shown in FIG. 2 can further hold network connection information indicative of a home network with a valid HoA, with which it is currently in connection, in an associated state. Yet moreover, the MN 100 shown in FIG. 2 can notify the above-mentioned plural-HoA information, HA identification information and network connection information to the CN 150 through the use of a plural-HoA information notification message.

Figure 6:
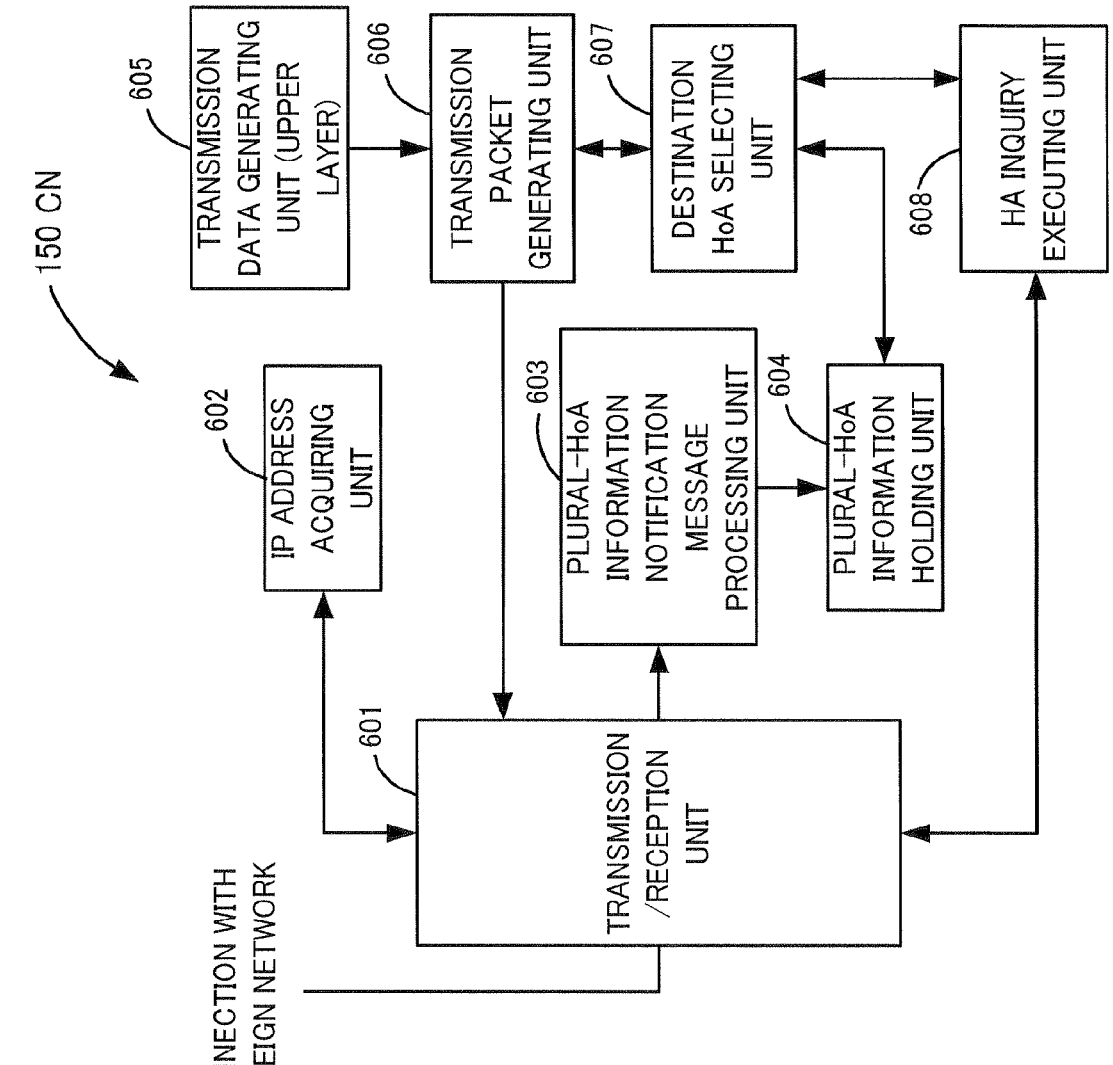
FIG. 6 is a block diagram showing one example of a configuration of a communication partner according to the first embodiment of the present invention.

Furthermore, referring to FIG. 6, a description will be given hereinbelow of a configuration of a communication partner according to the first embodiment of the present invention. FIG. 6 is a block diagram showing one example of a configuration of a communication partner according to the first embodiment of the present invention. The CN 150 shown in FIG. 6 is composed of a transmission/reception unit 601, an IP address acquiring unit 602, a plural-HoA information notification message processing unit 603, a plural-HoA information holding unit 604, a transmission data generating unit (upper layer) 605, a transmission packet generating unit 606, a destination HoA selecting unit 607 and an HA inquiry executing unit 608. In FIG. 6, although the functions to be realized in the CN 150 are expressed by blocks, these functions are realizable by hardware or software.

The transmission/reception unit 601 is connected through radio communication to a foreign network and has a function to make a communication with an arbitrary node, which is in connection with a different network, through an arbitrary node in the foreign network and ISP. This transmission/reception unit 601 includes one or more communication interfaces, and an IP address generated/acquired by the IP address acquiring unit 602 is allocated to each of the communication interfaces.

The IP address acquiring unit 602 fulfills a function to generate or acquire an IP address through the use of the address automatic setting (stateless address autoconfiguration), the DHCP, the manual setting or the like for the purpose of obtaining a valid IP address in a network connected thereto. The IP address acquired by the IP address acquiring unit 602 is allocated to a communication interface held by the transmission/reception unit 601.

The plural-HoA information notification message processing unit 603 fulfills a function to conduct the processing on a plural-HoA information notification message received from the MN 100. The plural-HoA information notification message processing unit 603 gives an instruction so as to store the information, included in the plural-HoA information notification message received from the MN 100, in the plural-HoA information holding unit 604.

Upon receipt of an instruction from the plural-HoA information notification message processing unit 603, the plural-HoA information holding unit 604 fulfills a function to store the information, included in the plural-HoA information notification message received from the MN 100. In the plural-HoA information holding unit 604, the information similar in configuration to that shown in FIG. 4 is held for each MN 100.

The transmission data generating unit (upper layer) 605 is an upper layer for generating a data section to be included in a packet and signifies an application and a transport layer such as TCP/UDP (User Datagram Protocol) carrying the data.

The transmission packet generating unit 606 fulfills a function to generate an IP packet including a data section generated by the transmission data generating unit 605. At the generation of the IP packet, the transmission packet generating unit 606 gives an instruction to the destination HoA selecting unit 607 for the selection of an HoA of the MN 100 to be set as a destination address of a transmission packet, and then sets the HoA selected by the destination HoA selecting unit 607 as the destination address of the packet, and further hands over this packet to the transmission/reception unit 601 and gives a transmission instruction thereto.

In addition, receipt of an instruction from the transmission packet generating unit 606, the destination HoA selecting unit 607 fulfills a function to select an optimum HoA to be set as a destination address of a packet generated by the transmission packet generating unit 606. At the selection of the optimum HoA, the destination HoA selecting unit 607 refers to the information (for example, the information shown in FIG. 4) stored in the plural-HoA information holding unit 604. At this time, in the case of giving priority to the optimized route, the destination HoA selecting unit 607 refers to the home network connection information and selects an HoA to which appended is the information indicative of the connection with the home network, thereby enabling the packet to be directly transferred to that MN 100. On the other hand, for giving priority to the HA condition, the destination HoA selecting unit 607 gives an instruction to the HA inquiry executing unit 608 for making an inquiry at an HA managing each of the HoAs and then selects an HoA by referring to the HA condition obtained as a result. When an HA indicated by the HA information stored in the plural-HoA information holding unit 604 is selected as an HA which is an object of inquiry, the execution of the inquiry processing is suppressible up to the degree still needed.

Moreover, upon receipt of an instruction from the destination HoA selecting unit 607, the HA inquiry executing unit 608 carries out a function to transmit a message or the like to the HA related to the instruction for making a request for information on the condition of this HA and to notify the information on the condition of the HA, acquired as a result, to the destination HoA selecting unit 607. In this connection, since the contents based on the information notified from the MN 100 are held in the plural-HoA information holding unit 604, instead of the address of the HA, the ID of the HA or the like is sometimes used as the HA information. In this case, it is also acceptable that, for example, the HA inquiry executing unit 608 generates a home agent anycast address from a prefix of an HoA of the MN 100 and transmits an inquiry message with this address being set as a destination.

As the information indicative of the condition of the HA, for example, conceivable are information indicative of the current and future conditions of the HA, information on the current processing load, a management domain of the HA, roaming thereof, and others. The information indicative of the condition of the HA is not limited to these pieces of information, provided that it is information usable for the comparison/selection of the HA. Moreover, it is also possible to employ a method in which a message for making a verification as to whether or not the HA is in operation is transmitted and, in the case of no response, this HA is considered to be in a non-operating state and is removed from the selection candidate. Still moreover, it is also acceptable that this message is used as information for the comparison of a state of a QoS of a communication route between the CN 150 and the HA. Incidentally, the acquisition method and acquisition source for the information on the HA condition are not limited to these, but the request can be made with respect to another HA existing in the home network, and it can also be made to an intensively managing server.

In this connection, in a case in which the CN 150 does not select an HoA in consideration of the condition of the HA but an address is selected on the basis of a policy on each HoA notified from the MN 100, the home network connection information on the MN 100 can also be used as one of the conditions. Moreover, the home agent information on each HoA can also be used as one of the conditions.

As described above, the CN 150 shown in FIG. 6 can acquire the mobility association information on the MN 100 (for example, the information illustrated in FIG. 4) and, at the selection of an HoA to be set as a destination address of a packet to be transmitted to the MN 100, it can grasp whether or not the MN 100 is currently in connection with the home network which is managing the HoA of the MN 100 itself (that is, whether or not there is, of a plurality of HoAs, an HoA which allows a packet to be sent directly to the MN 100 without passing through an HA.

In consequence, for example, in a case in which the HoA in the home network with which the MN 100 is in connection is one of the plurality of HoAs, the CN 150 selects this HoA, thereby enabling the direct delivery of a packet to the MN 100. This enables avoiding the transfer route passing through an HA which occurs in the case of the selection of an HoA in the other non-connection home network, thereby achieving the route optimization.

In addition, the CN 150 is also capable of selecting an HoA by taking a state of an HA into consideration. In this case, the CN 150 can search an HoA, where the same HA information is set, to grasp that, of a plurality of HoAs, there exists an HoA managed by the same HA, which allows specifying the HA which is an object of inquiry. This prevents frequent inquiry operations at the same HA.

Furthermore, a brief description will be given hereinbelow of a concrete operation according to the first embodiment of the present invention. For example, as shown in FIG. 1, let it be assumed that the MN 100 makes a communication with the CN 150 in a state where the MN 100 is in connection with a foreign network. At this time, as mentioned above, the information shown in FIG. 4 is notified from the MN 100 to the CN 150 through the use of a plural-HoA information notification message, and the CN 150 can grasp the following two facts by the acquisition of this information.

The first is that, on the basis of the home network connection information, the CN 150 can see that the MN 100 is not currently in connection with any home network but it is in connection with a foreign network. In this case, even if the CN 150 selects and transmits every HoA as a destination address, the packets reach the MN 100 through the corresponding HA. Moreover, in a case in which there exists home network connection information indicative of in-connection with the home network, the CN 150 selects a HoA corresponding to the home network connection information indicating that the MN 100 is in connection therewith and sets it as a destination address of a packet to be transmitted to the MN 100, thereby enabling the packet to run along an optimized route and arrive at the MN 100.

The second is that, on the basis of the HA information, the CN 150 can grasp that the PF2. HoA and the PF3. HoA which are HoAs of the MN 100 are HoAs under management by the same HA2 lying in the home network 2. Therefore, for example, for preventing a packet from being transmitted to an HA which is in a non-operating condition or for selecting the best HA in a communication condition between the CN 150 and the HA, at the inquiry at each HA, when the CN 150 only once makes an inquiry at the HA 2 lying in the home network 2, the CN 150 can easily seize the fact that the inquiry at the HA managing two HoAs of the PF2. HoA and the PF3. HoA reach completion. Moreover, the CN 150 selects an HoA according to the result of the inquiry at the HA and sets it as a destination address of a packet to be transmitted to the MN 100, which allows the packet to be sent through the optimum HA to the MN 100.

As described above, according to the first embodiment of the present invention, even in a case in which, for example, for the reason that the MN 100 wants to prevent the CN 150 from knowing the position of a movement destination of the MN 100, the notification of a CoA is not made through the use of a normal binding update message, since the plural-HoA information, the HA information for managing these HoAs and the plural-HoA information notification message including the home network connection information and others are transmitted from the MN 100 to the CN 150, the CN 150 can seize that the MN 100 is in connection with the home network and an HoA in this home network is allocated to an interface, and it can gasp that, when a packet is transmitted to that HoA, the packet directly reaches the MN 100.

In addition, since the CN 150 can identify an HA managing a plurality of HoAs held by the MN 100, the CN 150 becomes capable of grasping the situation in which the plurality of HoAs are managed by the same HA and, even in the case of making an inquiry at the HA, it can accurately specify the object HA so as to avoid the useless inquiry processing at the HA, such as making an inquiry at the same HA several times. Likewise, also in the MN 100, it is possible to prevent the useless processing at the inquiry at the HA.

Second Embodiment

Figure 7:
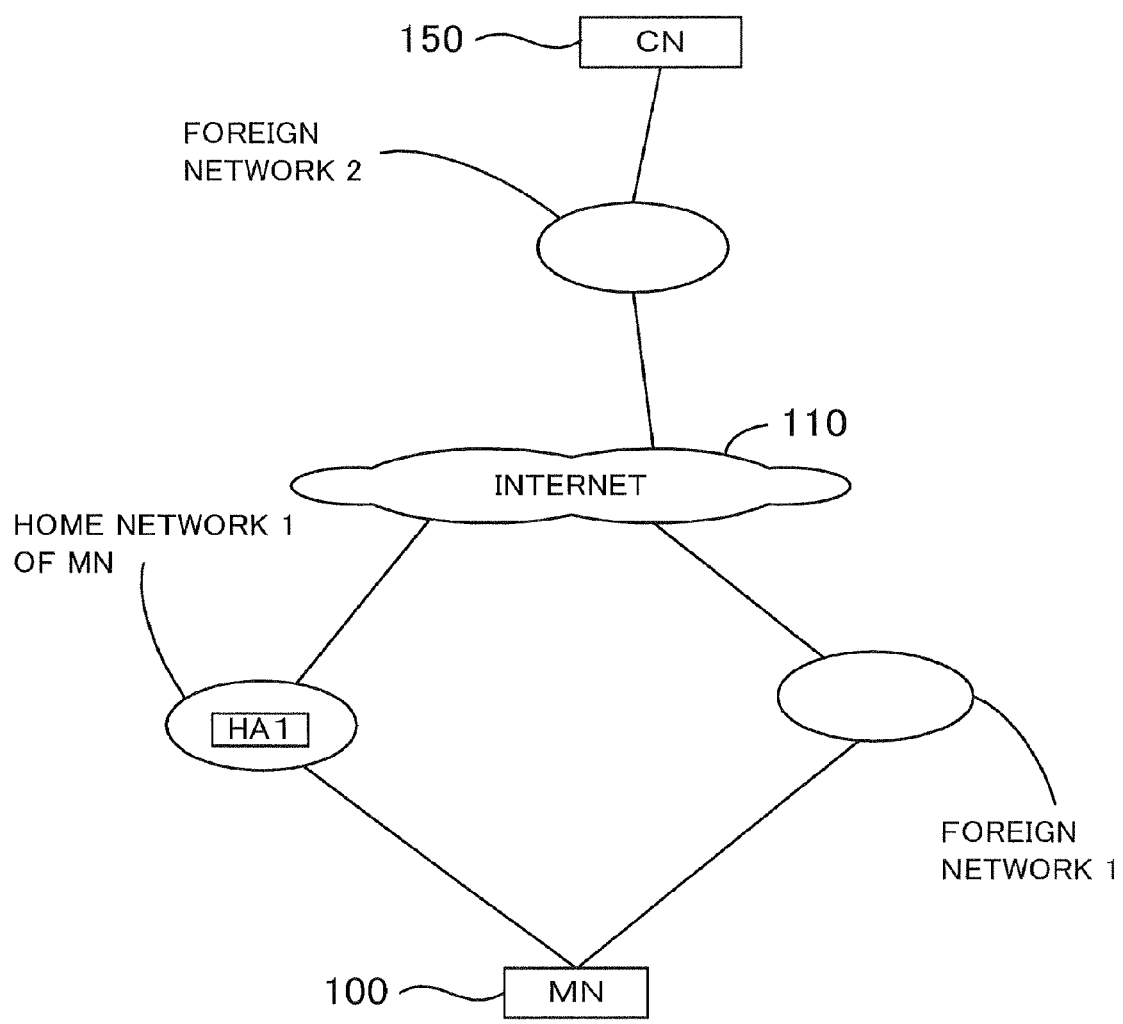
FIG. 7 is an illustration of a first example of a configuration of a network according to second and third embodiments of the present invention.

Secondly, referring to FIG. 7, a description will be given hereinbelow of a configuration of a network according to a second embodiment of the present invention. FIG. 7 is an illustration of a first example of a configuration of a network according to a second embodiment of the present invention. The configuration of a communication system shown in FIG. 7 is only one example, and the present invention is not limited to the configuration shown in FIG. 7.

In FIG. 7, there are shown three networks (home network 1 of MN 100, foreign network 1, foreign network 2), an MN 100 having two interfaces of an interface which is in connection with the home network 1 and an interface which is in connection with the foreign network 1, and a CN 150 which is in connection with the foreign network 2. Moreover, each network is connected through the internet 110, and an HA 1 which is a home agent of the MN 100 exists in the home network 1.

The MN 100 shown in FIG. 7 has a plurality of interfaces so as to enable the simultaneous connections with a plurality of different networks. An HoA of the MN 100 is allocated to the interface connected to the home network 1 and, in the following description, this address is referred to as HoA1. On the other hand, an address valid in the foreign network 1 is allocated to the interface connected to the foreign network 1 and this address is handled as CoA. In the following description, this address is referred to as a CoA1. The number of the interfaces held by the MN 100 is not limited to two. Likewise, the numbers of home networks to be allocated to the MN 100, foreign networks and home agents are not limited to the configuration shown in FIG. 7. One or a plurality is acceptable.

FIG. 7 shows a case in which one of the networks with which the MN 100 is in connection is a home network for the MN 100 and the other is a foreign network for the MN 100. Whether the network with which the MN 100 is in connection is a home network or a foreign network depends upon the judgment as to whether this MN 100 recognizes that network as a home network or a foreign network. For example, conceivable are a method of making a judgment on the basis of which of the networks is the connection-accepting network to the MN 100, a method of making a judgment which of the networks the MN 100 itself configures as the connection-accepting network and a method of using a combination of both the judgments. In the case of the former judgment method, it is considered that the recognition on the network by the MN 100 depends upon the information on the home network allocated dynamically or statically, while in the case of the latter judgment method, it is considered that the network recognition depends on a configuration taken by the MN 100 itself. In FIG. 7, the home network and the foreign network have a configuration the MN 100 recognizes.

The second embodiment of the present invention will be described hereinbelow in consideration of a case in which, in the network configuration shown in FIG. 7, in a state where the MN 100 uses two interfaces to establish the connections with the home network 1 and the foreign network 1 at the same time, the MN 100 makes a communication with the CN 150 through the use of both the interfaces.

Figure 8:
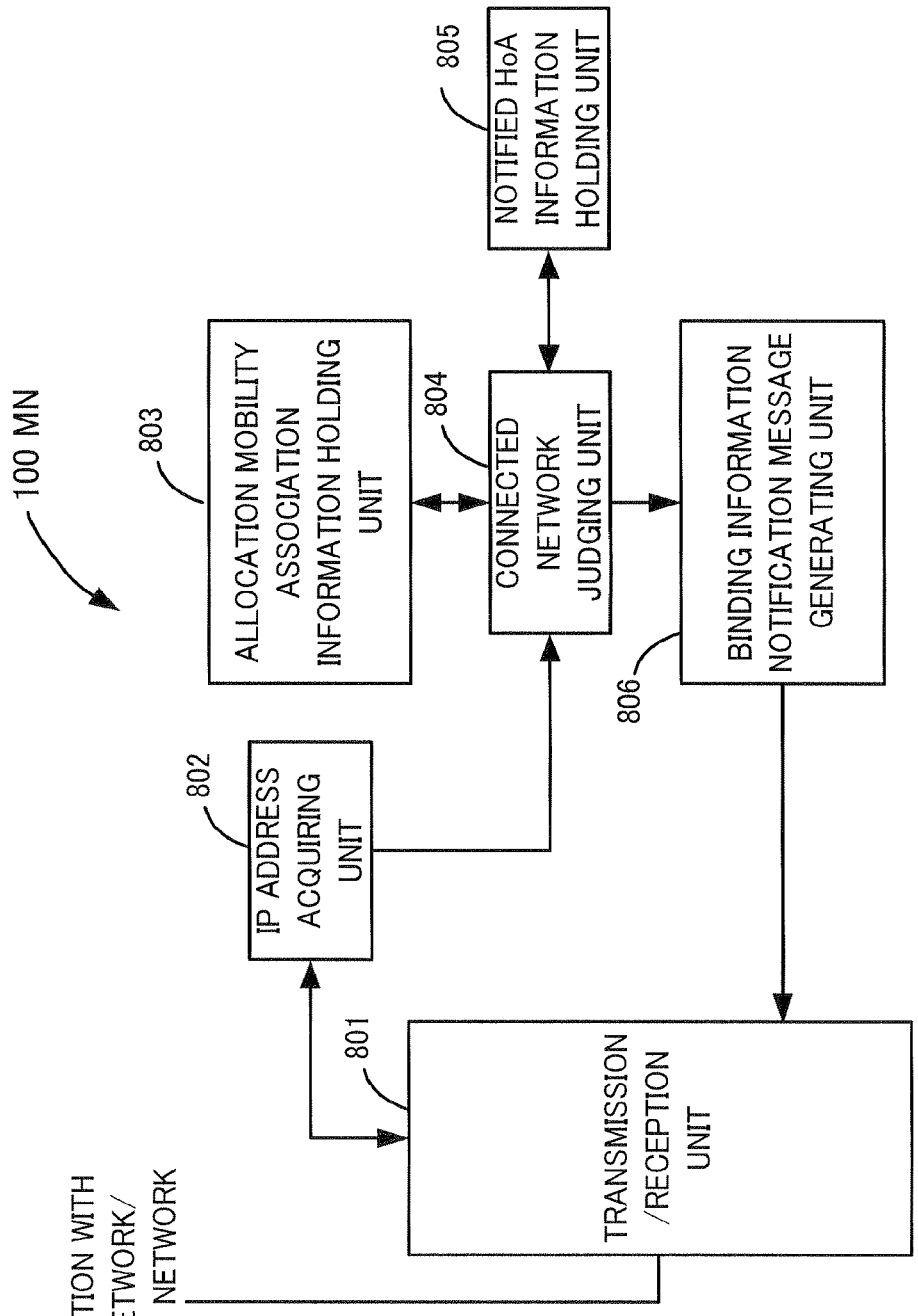
FIG. 8 is a block diagram showing one example of a configuration of an MN according to the second embodiment of the present invention.

First, a description will be given of a configuration of the MN 100 according to the second embodiment of the present invention. FIG. 8 is a block diagram showing one example of a configuration of the MN 100 according to the second embodiment of the present invention. The MN 100 shown in FIG. 8 is composed of a transmission/reception unit 801, an IP address acquiring unit 802, an allocation mobility association information holding unit 803, a connected network judging unit 804, a notified HoA information holding unit 805 and a binding information notification message generating unit 806. In FIG. 8, although functions realized in the MN 100 are shown by blocks, these functions are realizable by hardware or software. The transmission/reception unit 801, the IP address acquiring unit 802 and the allocation mobility association information holding unit 803 are the same as the transmission/reception unit 201, the IP address acquiring unit 202 and the allocation mobility association information holding unit 203, and the description thereof will be omitted.

The connected network judging unit 804 fulfills a function to make a judgment as to which of the networks it is in connection. The connected network judging unit 804 acquires a prefix of its own home network from the allocation mobility association information holding unit 803 and makes a comparison between it and a prefix in the network with which it has established a connection. If both agree with each other, a judgment is made that it is in connection with the home network. If they do not agree with each other, a judgment is made that it is in connection with the foreign network. The connected network judging unit 804 hands over a result of the judgment (home network connection information indicative of whether or not the connection-accepting network is the home network) to the IP address acquiring unit 802. The connected network judging method is not limited to the above-mentioned method, but it is also acceptable to employ an arbitrary method whereby a variation of the connected network is detectable.

In addition, in a case in which the connected network judging unit 804 makes a judgment that the network connected to the interface of the MN 100 is the home network, the connected network judging unit 804 hands over the information (in-connection information) indicative of the fact that the connection-accepting network is the home network to the notified HoA information holding unit 805 and gives an instruction thereto for holding this information and further hands it over to the binding information notification message generating unit 806 and gives an instruction thereto for generating a binding information notification message which is for notifying the information to an HA and/or the CN 150.

On the other hand, if the connected network judging unit 804 makes a judgment that the network connected to the interface of the MN 100 is the foreign network, the connected network judging unit 804 hands over an address (CoA) allocated to the interface connected to this foreign network and an HoA for the association of this CoA to the notified HoA information holding unit 805 and gives an instruction thereto for holding this information and further hands it over to the binding information notification message generating unit 806 and gives an instruction thereto for generating a binding information notification message which is for notifying the information (CoA associated information) to the HA and/or the CN 150.

It is also appropriate that, in a case in which the connected network judging unit 804 makes a judgment that the network connected to the interface of the MN 100 is the foreign network, the connected network judging unit 804 hands over the information (non-connection information), indicative of the fact that the connection-accepting network is not the home network, to the notified HoA information holding unit 805 and gives an instruction thereto for holding this information, and further hands it over to the binding information notification message generating unit 806 and gives an instruction thereto for generating a binding information notification message which is for notifying the information to an HA and/or the CN 150.

In this case, it is also acceptable that the non-connection information and the CoA association information are handled as information related to the same interface and pluralities of information are notified simultaneously or separately. Moreover, it is also acceptable that only the information to be notified is selected and notified. Still moreover, it is also possible that the home network connection information and the CoA association information, related to the respective interfaces, are notified simultaneously as information on a plurality of interfaces of the MN 100, or that they are notified separately. Likewise, with respect to these pieces of information, only the information to be notified can also be selected and notified.

In the following description, the information indicative of the fact that the MN 100 is in connection with the home network will be referred to as in-connection information, the information indicative of the fact that the MN 100 is not in connection with the home network will be referred to as non-connection information and, when these two information are put together, the information indicative of whether or not the MN 100 is in connection with the home network will be referred to as home network connection information. Moreover, the binding information including the in-connection information and the non-connection information will sometimes be referred to as home network connection information.

The binding information notification message generating unit 806 fulfills a function to generate a binding information notification message including the home network connection information notified from the connected network judging unit 804, and hand over the binding information notification message to the transmission/reception unit 801 and give an instruction thereto for the transmission thereof.

As the binding information notification message, a binding update message according to the mobile IP is usable, and a message based on a different protocol or a newly generated message is also available. If the information shown in FIG. 9A or 9B and mentioned later can be notified to a destination, every format is acceptable. Through the use of the binding information notification message, the MN 100 notifies, to a destination, the information for specifying an HoA which is an object of registration and the information indicating that this HoA is an address allocated to the interface connected to the home network. Moreover, it is also appropriate that the MN 100 notifies, to the destination, the information (information including non-connection information) shown in FIG. 9C or 9D and mentioned later. Also in this case, a message with every format is available.

With respect to the transmission of the home network connection information, it is preferable to make the notification of the in-connection information when the MN 100 establishes a connection with its own home network or when it is in connection therewith. On the other hand, it is preferable to notify the non-connection information when the MN 100 itself is not connected to the home network. Moreover, it is also acceptable to make the transmission at the same timing as the binding update based on the mobile IP. It is also appropriate that the home network connection information is not always transmitted at the connection with the home network, the in-connection therewith and the non-connection therewith but the transmission is arbitrarily made according to a decision by a user or operator. Still moreover, the destination of the binding information notification message is not limited to the nodes (HA1 and/or CN 150) constituting the network shown in FIG. 7, but all nodes are acceptable, provided that they can utilize the home network connection information and the CoA association information on the MN 100. For example, the transmission can also be made to a proxy node serving as a proxy for the HA or CN 150 and made to a management node having a function to manage the information on the MN 100.

In addition, in a case in which the CoA association information on a different address allocated to the same interface or a different interface and the home network connection information are held in the notified HoA information holding unit 805, or when a judgment is made that the notification of these pieces of information is necessary, it is also appropriate that these pieces of information are also included in the binding information notification message generated to notify the above-mentioned home network connection information and CoA association information before being transmitted. For example, in the case of the MN 100 in the configuration shown in FIG. 7, the home network connection information on the interface connected to the home network 1 and the binding information on the interface connected to the foreign network 1 can be transmitted through the use of separate binding information notification messages, and they can also be transmitted in a state included in a single binding information notification message.

Figure 10:
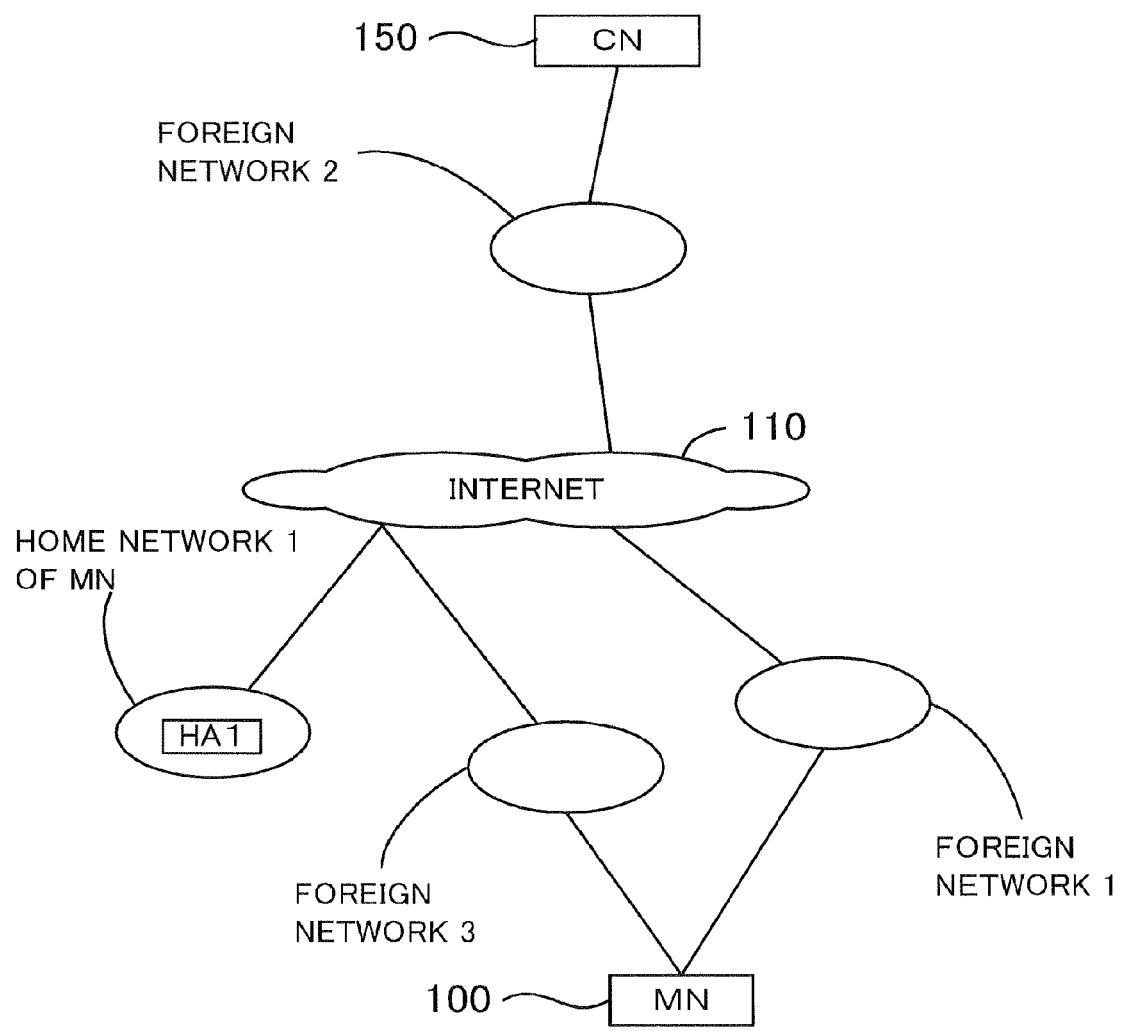
FIG. 10 is an illustration of a second example of a configuration of a network according to the second and third embodiments of the present invention.

Still additionally, in a case in which the MN 100 is in connection with the foreign network 1 and the foreign network 3 as shown in FIG. 10, the CoA association information on the interface connected to the foreign network 1 and/or the foreign network 3 and the non-connection information, which is home network connection information, can be transmitted through the use of separate binding information notification messages, and they can also be transmitted in a state included in a single binding information notification message.

Yet additionally, the notified HoA information holding unit 805 exhibits a function to hold the binding information handed over from the connected network judging unit 804 and notified to the HA or CN 150. In the notified HoA information holding unit 805, as well as the CoA association information indicative of the association between an HoA and a CoA, transmitted through the use of a binding update message based on the normal mobile IP, the in-connection information indicative of the connection with the home network and the non-connection information indicative of the non-connection with the home network are also held as the information transmitted from the MN 100 to its own HA or the CN 150. It is also acceptable that the notified HoA information holding unit 805 is realized as a binding update list specified in the mobile IP, or that it is realized with a different data holding unit.

Figure 9A:
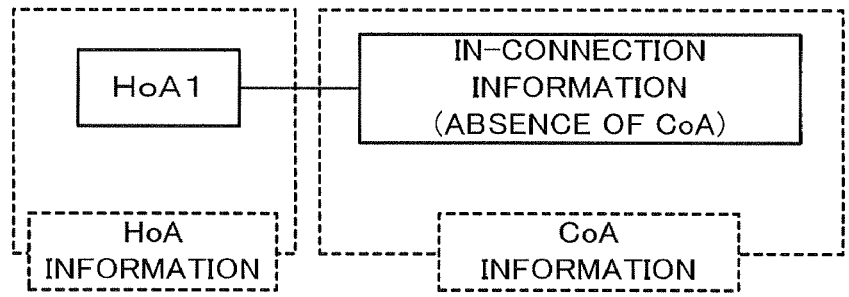
FIG. 9A is an illustration of a first example of in-connection information which is to be handed over from a connected network judging unit to a notified HoA information holding unit and a binding information notification message generating unit in an MN according to the second embodiment of the present invention.
Figure 9B:
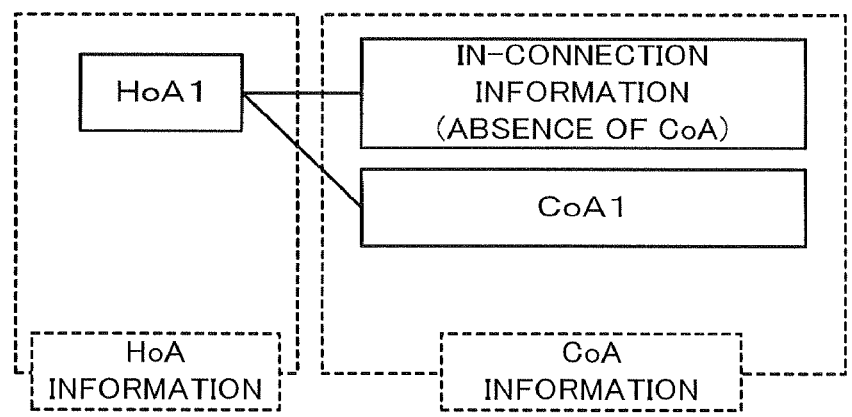
FIG. 9B is an illustration of a second example of in-connection information which is to be handed over from a connected network judging unit to a notified HoA information holding unit and a binding information notification message generating unit in an MN according to the second embodiment of the present invention.

Furthermore, referring to FIGS. 9A, 9B, 9C and 9D, a description will be given hereinbelow of the information (home network connection information) the connected network judging unit 804 hands over to the notified HoA information holding unit 805 and the binding information notification message generating unit 806 in the MN 100. FIGS. 9A and 9B are illustrations of first and second examples of the in-connection information the connected network judging unit 804 hands over to the notified HoA information holding unit 805 and the binding information notification message generating unit 806 in the MN 100 according to the second embodiment of the present invention.

As shown in FIG. 9A, the connected network judging unit 804 appends, to the HoA1 allocated to the interface connected to the home network 1, the information indicative of the fact that it is currently in connection with the home network 1 which has allocated this HoA1. As shown in FIG. 9B, it is also possible to append simultaneously the information on the address (CoA1), allocated to a different interface, to as a CoA associated with the HoA1.

Figure 9C:
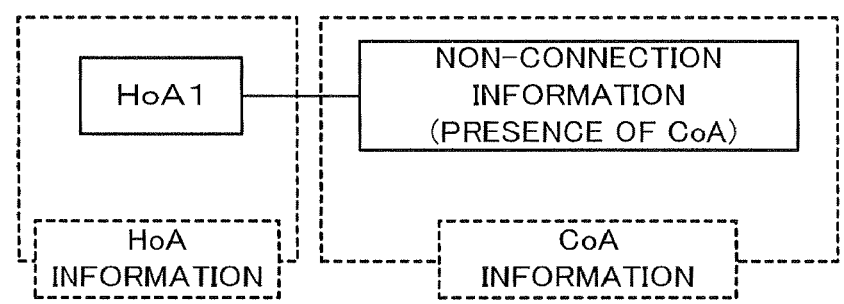
FIG. 9C is an illustration of a first example of non-connection information which is to be handed over from a connected network judging unit to a notified HoA information holding unit and a binding information notification message generating unit in an MN according to the second embodiment of the present invention.
Figure 9D:
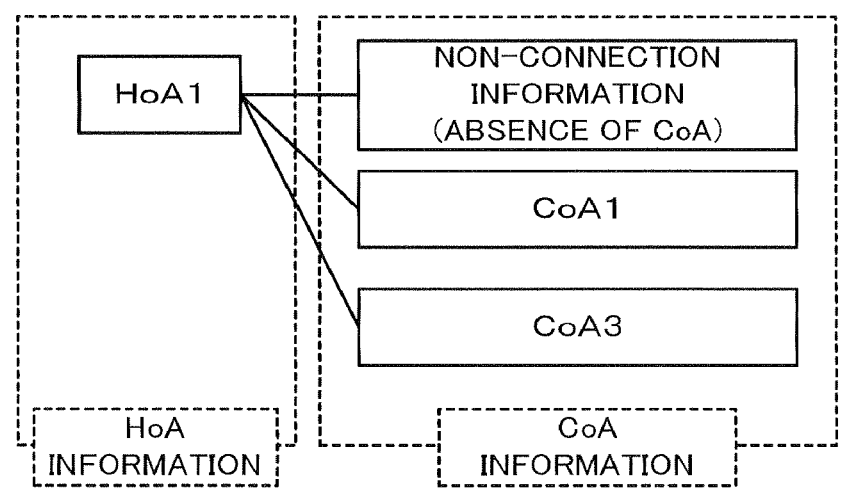
FIG. 9D is an illustration of a second example of non-connection information which is to be handed over from a connected network judging unit to a notified HoA information holding unit and a binding information notification message generating unit in an MN according to the second embodiment of the present invention.

Moreover, FIGS. 9C and 9D are illustrations of first and second examples of the non-connection information the connected network judging unit 804 hands over to the notified HoA information holding unit 805 and the binding information notification message generating unit 806 in the MN 100 according to the second embodiment of the present invention. The information shown in FIGS. 9C and 9D indicates a state in which, as shown in FIG. 10, the MN 100 is in connection with the foreign network 1 and the foreign network 3 and the CoA1 and the CoA3 are allocated to the interfaces connected to the foreign network 1 and the foreign network 3, respectively.

As shown in FIG. 10, in a case in which the MN 100 is in connection with the foreign network 1 and the foreign network 3 and the CoA1 is allocated from the foreign network 1 while the CoA3 is allocated from the foreign network 3, as shown in FIG. 9C, the connected network judging unit 804 appends, to the HoA1, the information indicative of the fact that it is not currently in connection with the home network 1 which has allocated this HoA1. It is also acceptable that, as shown in FIG. 9D, the information on the addresses (CoA1 and CoA3) allocated to the respective interfaces is simultaneously appended thereto as CoAs associated with the HoA1.

The MN 100 can transmit a binding information notification message, generated by the binding information notification message generating unit 806, to the HA and/or the CN 150 so as to notify, to the HA and/or the CN 150, the information which is indicative of the fact that the HoA1 is an address allocated to the interface which is in connection with the home network and which is independent from the information on an address allocated to a different interface. The MN 100 can notify that the MN 100 is in connection with the foreign network but not in connection with the home network. That is, as shown in FIGS. 9A to 9D, the information grasped and managed by the MN 100 is notified to the HA and/or the CN 150 through the use of a binding information notification message.

Figure 11:
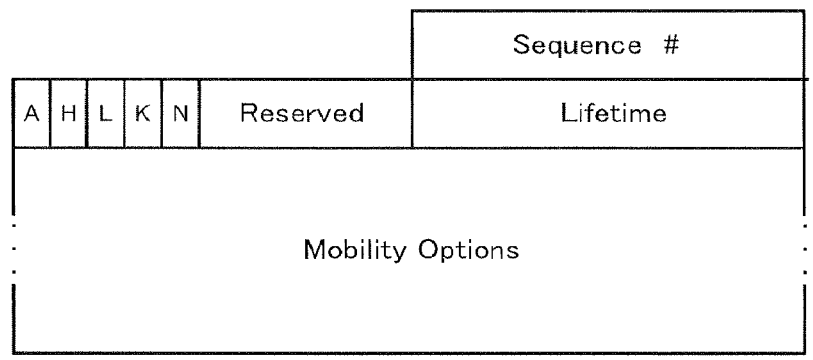
FIG. 11 is an illustration of a first example of a configuration of a binding information notification message to be generated by a binding information notification message generating unit of an MN according to the second embodiment of the present invention.

For the binding information notification message carrying the home network connection information, for example, as shown in FIG. 11, a new flag (N flag) is added to a reserved field as an extension of a conventional binding update message (see the Non-Patent Document 2) based on the mobile IP. In this case, when this flag is set, it can indicate a binding update message according to the second embodiment of the present invention and indicate the fact that the HoA included in the message is an address allocated to the interface connected to the home network. Moreover, for a message using a mobility header specified in the mobile IP, it is also appropriate that a new mobility message to which a new mobility header type is allocated is produced and used as home network connection information.

Moreover, with respect to the information to be notified, the binding information notification message according to the present invention is indicated by various types of field values, flags and combinations thereof to be appended to a binding update message to be transmitted for the registration or deletion of the CoA association information indicative of the association between an HoA and a CoA, specified in the conventional mobile IP, and necessary information is added thereto.

Still moreover, it is also appropriate that, in the binding update message for notifying the CoA association information, the HoA on the in-connection information is specified in a section for specifying the HoA and CoA to be registered, thereby notifying the fact of the connection with the home network to the communication partner. Yet moreover, it is also acceptable that, in the binding update message for the deletion of the CoA association information, the HoA on the non-connection information is specified in a section for specifying the HoA and CoA to be deleted, thereby notifying the fact of no connection with the home network to the communication partner. According to the mobile IP, although the CoA association information is notified to the HA or the CN 150 through the use of a home address option carried by a destination option header based on the IPv6, it is also possible to extend this option so as to indicate the home network connection information, and it is also possible that the home network connection information is carried by use of a different option type.

Figure 12:
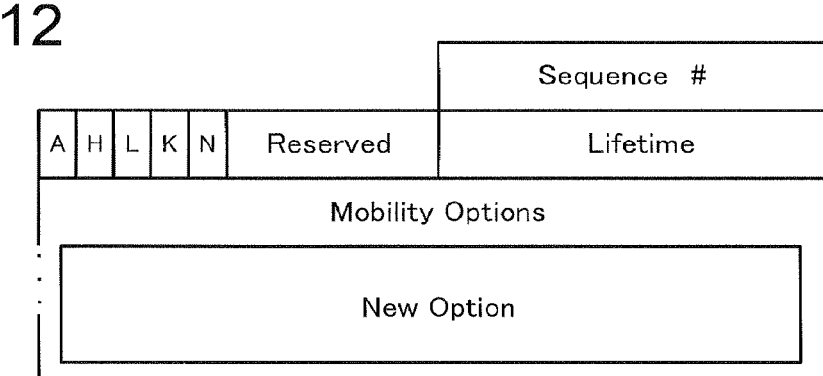
FIG. 12 is an illustration of a second example of a configuration of a binding information notification message to be generated by a binding information notification message generating unit of an MN according to the second embodiment of the present invention.
Figure 13:
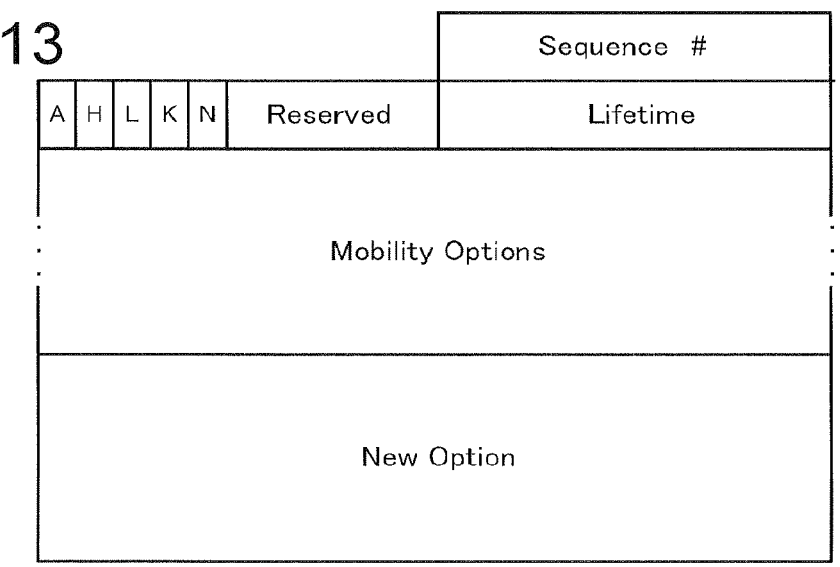
FIG. 13 is an illustration of a third example of a configuration of a binding information notification message to be generated by a binding information notification message generating unit of an MN according to the second embodiment of the present invention.

In addition, as shown in FIG. 12, it is also acceptable that a new option is produced as one of mobility options to be appended to a binding update message and necessary information is put therein and transmitted. Still additionally, as shown in FIG. 13, it is also appropriate that a new option different from the mobility options is produced and necessary information is put therein and transmitted.

Yet additionally, in a case in which, for enabling the HA and/or the CN 150 to distinguish among a plurality of CoA association information, the MN 100 appends an ID to each of the information or to a message carrying this information, it is also appropriate that a home CoA flag is set in an option including this ID.

The binding information notification message is not limited to the extension of a binding update message based on the mobile IP as mentioned above. For example, it is also acceptable that these pieces of information are included in a message based on a protocol handling the multihome and transmitted, and that a new message for carrying these pieces of information is produced and put to use. Moreover, it is also acceptable that these pieces of information are put in the plural-HoA information notification message containing the information on the HA managing the HoA, mentioned above in the first embodiment of the present invention.

Furthermore, even in a case in which the MN 100 which is made to notify a plurality of CoA association information to a communication partner through the use of separate binding update messages appends a unique ID to each message so that the communication partner can distinguish between the respective binding update messages, the MN 100 can append such a unique ID to the binding update message including the home network connection information. Moreover, likewise, even in a case in which IDs are appended to the respective binding information and they are transmitted through the use of separate binding update messages and in a case in which a plurality of binding information are transmitted with the same binding update message, such an ID can be appended to the binding information including the home network connection information. Thus, the communication partner can achieve the registration, replacement and deletion of the home network connection information, included in the received message, according to the appended ID.

Still furthermore, in a case in which the MN 100 notifies a policy on the destination address selection to the CN 150, it is also appropriate to append similar policies to not only the CoA association information but also in-connection information and then transmit them.

Yet furthermore, it is also appropriate to transmit a normal binding update message for the deletion of the CoA association information or a binding update message for the detection of the CoA association information to which appended is the information indicative of the inclusion of the home network connection information and to give an instruction to the communication partner, which has received this message, for correcting or replacing the held entry which is of an object of deletion and holding the new home network connection information.

When the MN 100 itself transmits a packet, it is also possible to carry out the source address selection using the home network information notified to the HA and/or the CN 150. Moreover, also in the case of managing a plurality of addresses held by the MN 100 itself and mapping these addresses into the IDs (addresses) to be notified to an upper layer, it is also possible to utilize the home network connection information for the address selection for this function. Even if the mapping function exists, it can function as a destination address selecting unit independent of this function.

Furthermore, a description will be given hereinbelow of an operation of the MN 100 in consideration of the states of the MN 100 before and after movement.

(Case of the CoA Association Information Before the Movement and the Home Network Connection Information after the Movement)

In a case in which, with respect to an address acquired before the interface, which has established a connection with the home network, establishes the connection therewith, an entry indicative of the registration of the binding information on the association between this address and an HoA in the HA and/or the CN is held in the notified HoA information holding unit 805, the connected network judging unit 804 gives an instruction to the binding information notification message generating unit 806 for making a request for replacing the old address associated with the HoA with the home network connection information.

Figure 14:
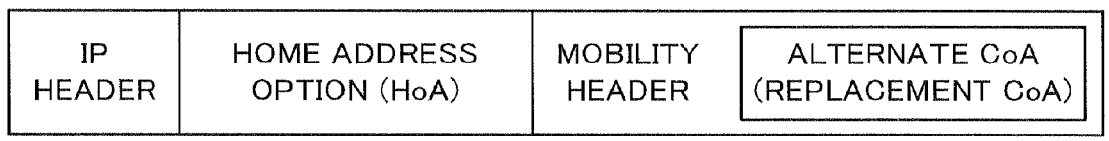
FIG. 14 is an illustration of a first example of a binding information notification message including an alternate CoA, generated by a binding information notification message generating unit of an MN according to the second embodiment of the present invention.

In this case, with respect to the binding information notification message to be generated by the binding information notification message generating unit 806, for example, in the case of a binding update message based on the mobile IP, as shown in FIG. 14, an HoA which is home network connection information to be notified can be put in a home address option (or a new option) specified in the mobile IP while, as the information for specifying the CoA association information which is an object of replacement of the home network connection information, the CoA can be put in an alternate CoA (alternate Care-of Address) option to be employed for a binding update message according to the normal mobile IP.

Figure 15:
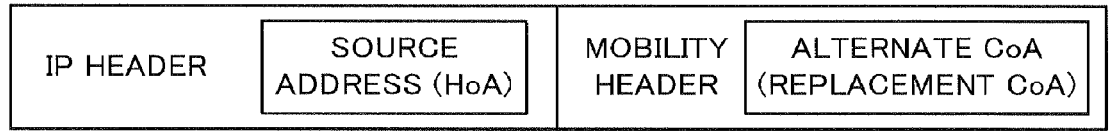
FIG. 15 is an illustration of a second example of a binding information notification message including an alternate CoA, generated by a binding information notification message generating unit of an MN according to the second embodiment of the present invention.
Figure 16:
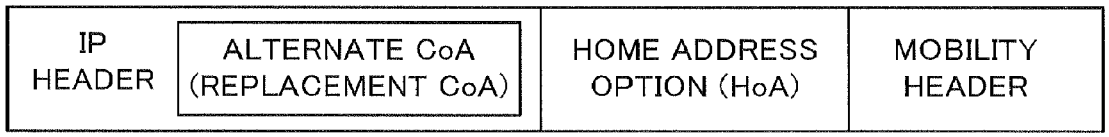
FIG. 16 is an illustration of a third example of a binding information notification message including an alternate CoA, generated by a binding information notification message generating unit of an MN according to the second embodiment of the present invention.

In addition, as shown in FIG. 15, it is also acceptable that the address specified as the source address of the binding information notification message is set as an HoA to be notified as the in-connection information. Still additionally, as shown in FIG. 16, it is also acceptable that, instead of the alternate CoA option, the address specified as the source address of the binding information notification message is set as a CoA included in the CoA association information which is an object of replacement.

The binding information notification message can include, for example:

information for specifying an HoA which is an object of registration;

home network connection information indicating that this HoA is an HoA allocated to an interface which is in connection with a home network; and information for specifying CoA association information to be replaced with this HoA.

All formats are acceptable, provided that information can be notified to a destination. Moreover, in the case of no CoA association information to be replaced, there is no need to include this information. Still moreover, it is also appropriate that the type of a message to be notified is made to identify the fact that the HoA which is an object of registration is an HoA allocated to the interface connected to the home network.

(Case of Home Network Connection Information Before and after Movement)

In a case in which an address acquired before the interface, which has established a connection with the home network, establishes the connection therewith is held as home network connection information in the notified HoA information holding unit 805, the connected network judging unit 804 notifies, as an HoA connected to the home network, the old address information notified to the HA and/or the CN 150 and the information for specifying the address to be replaced with this home network connection information.

In this case, the binding information notification message to be generated by the binding information notification message generating unit 806 can include, for example:

information for specifying an HoA which is an object of registration;

home network connection information indicating that this HoA is an HoA allocated to an interface which is in connection with a home network; and information for specifying the Home Network connection information to be replaced with this HoA.

All formats are acceptable, provided that information can be notified to a destination. Moreover, in the case of no CoA association information to be replaced, there is no need to include this information. Still moreover, it is also appropriate that the type of a message to be notified is made to identify the fact that the HoA which is an object of registration is an HoA allocated to the interface connected to the home network.

(Case of Home Network Connection Information Before Movement and CoA Association Information after Movement)

In a case in which an address acquired before the interface, which has established a connection with the foreign network, establishes the connection therewith is held as home network connection information in the notified HoA information holding unit 805, the connected network judging unit 804 gives an instruction to the binding information notification message generating unit 806 so as to generate a binding information notification message for making a request for replacing the old address information notified as an HoA connected to the home network to its own HA and/or the CN 150 with the CoA association information on the association of the CoA with the HoA.

In this case, the binding information notification message to be generated by the binding information notification message generating unit 806 can include, for example:

information for specifying an CoA which is an object of registration;

information for specifying an HoA with which a CoA is associated; and information for specifying the home network connection information to be replaced with binding information including this CoA.

All formats are acceptable, provided that information can be notified to a destination. Moreover, in the case of no home network connection information to be replaced, there is no need to include this information. Still moreover, it is also appropriate that the type of a message to be notified is made to identify the fact that the CoA which is an object of registration is a CoA with which the home network connection information is replaced.

As described above, the MN 100 shown in FIG. 8 is capable of notifying, to communication nodes such as its own HA and/or the CN 15, through the use of a binding information notification message, the fact that the address allocated to the interface is an HoA allocated from the home network under the connection. Since the information to be registered through this notification can exist independently of the normal CoA association information (association between an HoA and a CoA), the MN 100 can notify, to its own HA and/or the CN 150, the fact that it is possible to receive both a packet addressed to the HoA and an encapsulated packet addressed to the CoA.

In addition, the MN 100 can notify the fact that it is in connection with the foreign network and is not in connection with the home network. In this case, the MN 100 can notify, to the HA1 and/or the CN 150, the fact that all the packets addressed to this HoA pass through the HA1 and reach the MN 100. Thus, even if the CoA association information on the MN 100 is not registered, the HA1 and/or the CN 150 can grasp that the MN 100 is not in connection with the home network.

Still additionally, it is also appropriate that, in addition to the in-connection/non-connection information, as one of the home network connection information, the MN 100 notifies the information (HA use-inhibition information) for making a request for inhibiting the communication through the HA, for example, in a case in which some trouble has occurred in the HA managing the HoA or when the communication through the HA is not preferable for other arbitrary reasons. Upon receipt of this notification, it is desirable that anode makes a transmission to the CoA through the use of the route optimization based on the mobile IP without using the HoA as a destination address.

Also in a case in which the MN 100 has a plurality of HoAs (for example, HoA1 and HoA2) and the HoA1 is used as an address associated with the HoA2, it is also acceptable that this address is notified to communication nodes such as the HA and/or the CN 150 as an HoA corresponding to the home network connection information (in-connection information, non-connection information) or the HA use-inhibition information. In this case, if a CoA section registered is an HoA serving as the in-connection information, the HA and/or the CN 150 can grasp the fact that the CoA of the MN 100 registered is an HoA on the interface connected to the home network and, when this CoA is transmitted as a destination, they can grasp the fact that a packet can be directly delivered to the MN 100. Moreover, when the CoA section is an HoA serving as the non-connection information, the HA and/or the CN 150 can grasp the fact that the CoA of the MN 100 registered is an HoA which is not connected to the home network and further, when this CoA is transmitted as a destination, they can seize the fact that a packet can be delivered through the HA to the MN 100.

Furthermore, in a case in which the MN 100 uses a given HoA in a state associated with a CoA of a different HoA, when the information explicitly indicating that the CoA is the HoA is appended in a binding information notification message (binding update message), the HA and/or the CN 150 can recognize that a packet transmitted using this CoA association information is sent to the HoA of the MN 100. Still furthermore, in a case in which the home network connection information according to the present invention is appended to the HoA serving as the CoA, the HA and/or the CN 150 can grasp that a packet transmitted to this CoA is directly sent to the MN 100 or that the packet is sent through the HA thereto. If the home network connection information according to the present invention is not appended thereto, the HA and/or the CN 150 cannot make a judgment as to whether the packet transmitted to this CoA is directly sent or sent through the HA managing the HoA serving as the CoA.

For example, although the HA can recognize that an encapsulated packet addressed to the MN 100 and generated using the CoA association information to which the information indicative of the CoA being the HoA is added is transmitted to the HoA of the MN 100, the HA cannot make a judgment as to whether the packet is directly sent to the MN 110 or sent thereto through a different HA. On the other hand, for example, in a case in which the non-connection information is added as the home network connection information according to the present invention, the HA can recognize the fact that the encapsulated packet again passes through at least one of different Has. Meanwhile, although, by using the CoA association information to which the information indicative of the CoA being the HoA is appended, the CN 150 can recognize that the packet directed to the MN 100 and generated by use of a routing header is transmitted to the HoA of the MN 100 as well as the above-mentioned case of the HA, the CN 150 cannot judge whether the packet is directly sent to the MN 100 or sent thereto through the HA managing this HoA. In a case in which the in-connection information is added as the home network connection information according to the present invention, the CN 150 can recognize that the packet transmitted directly arrives at the MN 100 connected to the home network. Thus, the HA and/or the CN 150 can carry out the address selection on the basis of these recognition. Moreover, when the non-connection information is appended to the HoA serving as the CoA, the HA and/or the CN 150 can recognize that there is a possibility that a CoA associated with the HoA indicated as that CoA exists, which creates a ground for making a request for further CoA association information to the MN 100.

Figure 17:
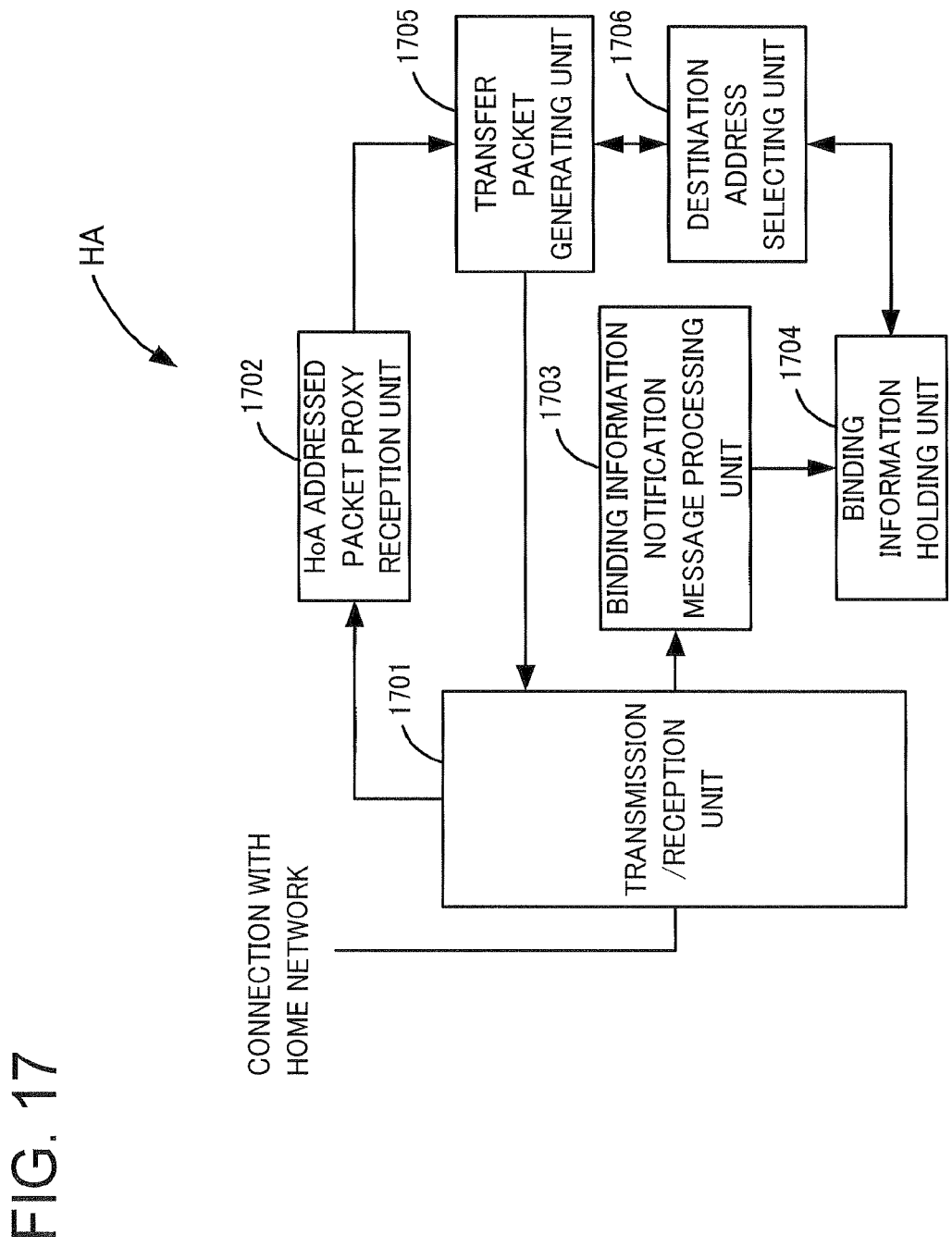
FIG. 17 is a block diagram showing one example of a configuration of an HA according to the second embodiment of the present invention.

Furthermore, referring to FIG. 17, a description will be given hereinbelow of a configuration of an HA according to the second embodiment of the present invention. FIG. 17 is a block diagram showing one example of a configuration of an HA according to the second embodiment of the present invention. The HA shown in FIG. 17 includes a transmission/reception unit 1701, an HoA addressed packet proxy reception unit 1702, a binding information notification message processing unit 1703, a binding information holding unit 1704, a transfer packet generating unit 1705, and a destination address selecting unit 1706. In FIG. 17, although functions realized in the HA are shown by blocks, these functions are realizable by hardware or software.

The transmission/reception unit 1701 is connected to its own network (home network) and fulfills a function to make a communication with an arbitrary node, connected to a different network, through an arbitrary node in the home network and an ISP.

The HoA addressed packet proxy reception unit 1702 has a function to proxy-receive a packet addressed to the HoA of the MN 100. Upon receipt of the packet directed at the HoA, the HoA addressed packet proxy reception unit 1702 hands over this packet to the transfer packet generating unit 1705 and gives an instruction thereto for transferring it to the MN.

The binding information notification message processing unit 1703 has a function to conduct the processing on a binding information notification message received from the MN 100. The binding information notification message processing unit 1703 gives an instruction to the binding information holding unit 1704 to hold the home network connection information, for example, included in a binding update message as shown in FIG. 11, in the binding information holding unit 1704.

For example, in a case in which the information on the old address acquired before the MN 100 establishes a connection with the home network is included as the information to be replaced with the notified home network connection information or the CoA association information in the binding information notification message, the binding information notification message processing unit 1703 gives an instruction to the binding information holding unit 1704 so as to replace the information on the old address with the notified home network connection information or the CoA association information.

Moreover, upon receipt of the instruction from the binding information notification message processing unit 1703, the binding information holding unit 1704 fulfills a function to store the home network connection information included in the binding information notification message received from the MN 100 or the CoA association information. The binding information holding unit 1704 is made to hold the information similar in contents to the above-mentioned information shown in FIGS. 9A to 9D for each MN 100. The binding information holding unit 1704 can be realized as a binding cache specified in the mobile IP, or it can also be realized with a different data holding unit.

Still moreover, in a case in which, as shown in FIG. 9B, there are contained not only the home network connection information but also the CoA association information on the address allocated to a different interface, the binding information holding unit 1704 holds both the information of the home network connection information and the CoA association information. The method of holding the information indicative of the HoA connected to the home network is not limited to the method of producing a different entry as mentioned above, it is also acceptable that, for example, information (flag or the like) indicative of the connection with the home network is appended into the entry of the CoA association information indicative of the normal association between an HoA and a CoA so as to indicate that not only the HoA included in this entry is associated with the CoA allocated to the interface connected to the foreign network but also the HoA is an address allocated to the interface connected to the home network.

In addition, it is also appropriate that, when an entry which does not include the CoA association information is produced and only the home network connection information is added thereto, the HoA included in this entry indicates an address allocate to the interface to the home network although there is no CoA associated therewith. Still additionally, it is also appropriate that an entry holding only the home network connection information and an entry holding the CoA association information are separately held and the fact of these plurality of entries pertaining to a specific MN 100 is grasped by unique information such as an HoA or ID.

The transfer packet generating unit 1705 fulfills a function to transfer, to the MN 100, a packet handed over from the HoA addressed packet proxy reception unit 1702 and addressed to the HoA of the MN 100. At the generation of the transfer packet, the transfer packet generating unit 1705 gives an instruction to the destination address selecting unit 1706 for selecting an address designated as a destination address of the transfer packet and, if the address selected by the destination address selecting unit 1706 is the HoA, hands over the proxy-received packet directly to the transmission/reception unit 1701 while, if it is the CoA, generating a packet encapsulated into an outer header and directed to this address and handing over this packet to the transmission/reception unit 1701 and giving an instruction for the transmission thereof.

Moreover, the destination address selecting unit 1706 has a function to receive an instruction from the transfer packet generating unit 1705 and select an optimum address to be set as a destination of the transfer packet. For the selection of the optimum address, the destination address selecting unit 1706 refers to the information (for example, the information shown in FIG. 9B) stored in the binding information holding unit 1704. At this time, if it includes the CoA association information indicative of the normal association between the HoA and the CoA and the home network connection information, the destination address selecting unit 1706 selects one of the information. In a case in which the destination address selecting unit 1706 selects the in-connection information as the home network connection information, the packet whose destination address is set to the HoA1 is transmitted without carrying out the route optimization, which eliminates the implementation of extra processing such as encapsulation and enables the direct transmission of the packet to the MN 100. In the case of the selection of the binding information between the HoA and CoA, the destination address is set to the CoA1 and the transmission is made in a state encapsulated, thereby allowing the continuous communication.

In this connection, in a case in which the destination address selecting unit 1706 utilizes a function to manage a plurality of addresses notified from the MN 100 and map these addresses into an ID (address) notified to the upper layer, the destination address selecting unit 1706 can also play a role as an address selecting unit for this function. Even if a mapping function exists, it can also function as a destination address selecting unit independently of that function.

Although not shown, it is also appropriate that, after the reception of a binding information notification message including the home network connection information such as a home CoA flag from the MN 100, an HA (for example, the HA shown in FIG. 17) according to the present invention puts, in a response message thereto, the information indicative of a result of the reception of the home network connection information notification from the MN 100 before the transmission thereof. In this case, there is a need for the MN 100 which receives this response message to have a function for interpreting this information.

In addition, although not shown, it is also appropriate that an HA (for example, the HA shown in FIG. 17) according to the present invention puts a flag in a router advertisement message, it transmits, so as to indicate that it handles a function on the home network connection information. In this case, there is a need for the MN 100 which receives this message to have a function for interpreting this flag. When the flag is set in the message, the MN 100 makes a judgment that it is possible to notify the information on the home network connection information to the HA in the home network. On the other hand, if the flag is not set in the message, the MN 100 makes a judgment that it is impossible to notify the information on the home network connection information to the HA in the home network.

As the means for representing the information indicative of the fact that the HA handles the function on the home network connection information, it is also possible to use a dynamic message such as DHCPv6 or employ a static setting means by an operator or user. Moreover, it is also possible that a new flag is provided in a request message of DHAAD specified in the mobile IPv6 and the request message in which this message is set indicates a request for a list of the HAs handling the function related to the home network connection information. Still moreover, it is also possible that a new flag is also provided in a reply message thereto so as to indicate a message including a list of the HAs handling the function related to the home network connection information.

It is also acceptable that a new flag is provided in a home agent information option specified in the mobile IPv6 so that the setting of this flag signifies that the HA indicated by this option is an HA handling the function related to the home network connection information.

As described above, the HA shown in FIG. 17 is capable of acquiring the binding information on the MN 100 and of holding the information (home network connection information) on the connection condition of the MN 100 with respect to the home network. Simultaneously with the holding of the home network connection information, it is also possible to hold the CoA association information in which an address allocated to a different interface connected to a different network is associated as a CoA.

In consequence, for the selection of the destination address at the transfer of a packet to the MN 100, the HA shown in FIG. 17 can preferentially select the transmission to the interface connected to the home network of the MN 100. For example, in a case in which a disconnection occurs between the MN 100 using the HoA as the destination address and the CN 150, the HA can select the CoA associated with this HoA and proxy-receive a packet addressed to the HoA to encapsulate a packet, which takes this HoA as the destination address, and transmit it to the CoA associated with this HoA, thereby achieving the prompt recovery of the communication. This also applies to a converse case. In this case, for example, when a disconnection occurs between the MN 100 using the CoA as the destination address and the CN 150, by referring to the home network connection information, it is possible to select, from the binding information related to this HoA, an address for the transmission to the interface connected to the home network. Thus, although, in a normal condition, there is a need to wait for a binding update message transmitted from the MN 100 at the occurrence of the disconnection of communication, the employment of the method described in the second embodiment of the present invention enables simultaneously holding the information on the HoA connected to the home network and the information on the HoA associated with the CoA, which provides an advantage in that the destination can be switched in a moment so as to minimize the packet loss.

In addition, even in a case in which the HA uses the HoA as a destination address of a packet to be transmitted to the MN 100, as well as the case of the route optimization using the CoA, the HA can grasp the fact of the direct arrival of the packet at the MN 100. In particular, in a case in which the HA holds a plurality of CoA association information on the MN 100 and receives the notification for the registration of the in-connection information from the MN 100, since newly produced entries or entries other than a replaced entry are left as they stand, the HA can grasp the CoA association information on the MN 100 and the fact of the connection of the MN 100 with the home network. Still additionally, with respect to the selection of a destination address of a transfer packet addressed to the MN 100, the HA can hold a policy for preferentially selecting the transfer to the interface connected to the home network of the MN 100. When the home network connection information according to the present invention is added to an entry of the binding information, the HA can carry out the destination address selection according to the aforesaid policy.

Figure 18:
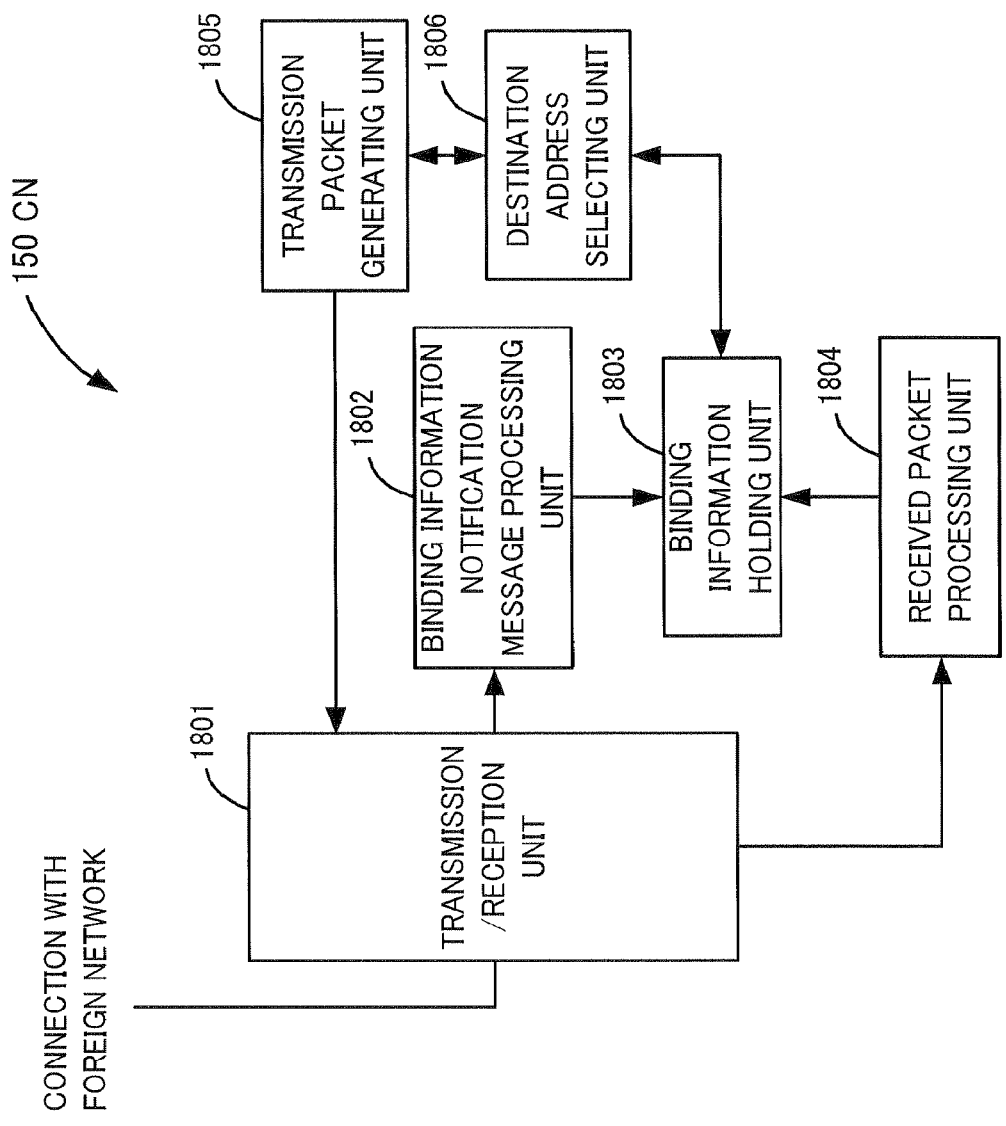
FIG. 18 is a block diagram showing one example of a configuration of a CN according to the second embodiment of the present invention.

Furthermore, referring to FIG. 18, a description will be given hereinbelow of a configuration of the CN 150 according to the second embodiment of the present invention. FIG. 18 is a block diagram showing one example of a configuration of a CN according to the second embodiment of the present invention. The CN 150 shown in FIG. 18 is composed of a transmission/reception unit 1801, a binding information notification message processing unit 1802, a binding information holding unit 1803, a received packet processing unit 1804, a transmission packet generating unit 1805 and a destination address selecting unit 1806. In FIG. 18, although functions realized in the CN 150 are shown by blocks, these functions are realizable by hardware or software. The transmission/reception unit 1801, the binding information notification message processing unit 1802 and the binding information holding unit 1803 are the same as the transmission/reception unit 1701, the binding information notification message processing unit 1703 and the binding information holding unit 1704 in the HA shown in FIG. 17, respectively, and the description thereof will be omitted.

The transmission packet generating unit 1805 is for generating a packet to be transmitted to a communication partner and further for giving an instruction to the destination address selecting unit 1806 for the address selection taking into consideration the binding information held by the binding information holding unit 1803, thereby carrying out the packet processing (packet conversion processing or the like) on the basis of the address selected by the destination address selecting unit 1806. If the selected address is a CoA, since the packet addressed to the MN 100 is transmitted through the use of the route optimization based on the mobile IP, the packet conversion is made according to the method specified in the mobile IP and the converted packet is handed over to the transmission/reception unit 1801. On the other hand, when the selected address is an HoA, the packet addressed to the HoA is directly handed over to the transmission/reception unit 1801 without carrying out the packet conversion.

The received packet processing unit 1804 conducts the processing on a packet received from the MN 100. In a case in which the received packet is a packet converted for the route optimization based on the mobile IP, for restoring the converted packet to the original packet, a confirmation is made as to whether or not the information on the HoA is held in the binding information holding unit 1803. When the CoA association information related to this HoA is held therein, a recognition is made that the packet received from the MN 100 has been transmitted through the use of the route optimization based on the mobile IP.

Moreover, even in a case in which the received packet is a normal packet, the received packet processing unit 1804 can also make a confirmation as to whether or not the information on the address set as the source address of this packet is held in the binding information holding unit 1803. If the confirmation result shows that the home network connection information related to this address is held in the binding information holding unit 1803, the received packet processing unit 1804 can recognize that this address is the HoA of the MN 100 and that the packet is a packet transmitted from the interface connected to the home network of the MN 100.

Still moreover, as well as the aforesaid case of the HA, in the CN 150, upon receipt of a binding information notification message (including information for specifying an object of replacement) for making a request for the replacement of the home network connection information or the CoA association information from a predetermined communication partner in a state where the entry of the predetermined communication partner is held in the binding information holding unit 1803 in advance, the binding information notification message processing unit 1802 gives an instruction to the binding information holding unit 1803 for the replacement with the notified home network connection information or CoA association information.

Yet moreover, upon receipt of an instruction from the transmission packet generating unit 1805, the destination address selecting unit 1806 conducts a selection of a destination address of a packet generated by the transmission packet generating unit 1805. In a case in which the HoA of the MN 100 is set as the destination address of the packet generated by the transmission packet generating unit 1805, the destination address selecting unit 1806 retrieves the entry in which stored is the binding information related to this HoA, and selects a destination address by use of the CoA association information or home network connection information held in that entry. In a case in which both the home network connection information and CoA association information on the MN 100 are held in the binding information holding unit 1803, the destination address selecting unit 1806 can recognize that the MN 100 is connected to the home network and also holds the CoA associated with this HoA. Therefore, in the case of the selection of the CoA, a packet can be sent directly to the CoA through the use of the route optimization based on the mobile IP while, in the case of the selection of the HoA, a packet can be delivered directly to the interface connected to the home network of the MN 100.

Incidentally, in a case in which the destination address selecting unit 1806 utilized a function to manage a plurality of addresses notified from the MN 100 and map these addresses into an ID (address) to be notified to an upper layer, it can also play a role as an address selecting unit for this function. Even if a mapping function exists, it can also function as a destination address selecting unit independent of that function.

Moreover, when only the CoA association information is held therein, the destination address selecting unit 1806 can recognize that the MN 100 is connected to a foreign network and the address acquired therein is usable as a CoA. Still moreover, if only the home network connection information is held therein, the destination address selecting unit 1806 can recognize that the MN 100 is connected to the home network and the direct communication using the home address is feasible. Yet moreover, if neither the home network connection information nor the CoA association information are held therein, the destination address selecting unit 1806 selects the transmission addressed to the HoA. In this case, the transmission is made in a state where difficulty is experienced in making a judgment on whether the MN 100 is connected to the home network or the MN 100 is in connection with the foreign network and the CoA association information is not registered. In such a case, in order to make clear the judgment between these cases, for example, the CN 150 can also make a request for the transmission of a binding information notification message to the communication partner. In addition, upon receipt of the information (the aforesaid HA use-inhibition information) from the MN 100 for making a request for inhibiting the communication through a specified HA, for example, this HA use-inhibition information is held in the binding information holding unit 1803 in a state associated with the corresponding CoA association information, and the destination address selecting unit 1806 can also conduct a selection of a CoA with respect to an entry where the HA use-inhibition information exists.

As described above, the CN 150 shown in FIG. 18 is capable of acquiring the binding information on the MN 100 and capable of holding the information (home network connection information) on the connection condition on the MN 100 to the home network. In addition, the CoA association information where the address allocated to a different interface connected to a different network is associated as a CoA can be held simultaneously with the home network connection information.

In consequence, for the destination address selection at the transmission of a packet to the MN 100, the CN 150 can preferentially select the transmission to the interface connected to the home network of the MN 100. Moreover, in the base of the registration of both the in-connection information and CoA association information on the MN 100, for example, if a disconnection of the communication with the MN 100, using the HoA of the MN 100, has occurred, the CN 150 can select a CoA associated with that HoA as a destination address and further make the switching to the communication using the route optimization based on the mobile IP, thereby enabling the prompt recovery of the communication. This also applies to the contrary case. In this case, for example, if the communication between the MN 100 using the CoA as a destination address and the CN 150 falls into a disconnection state, by referring to the home network connection information, it is possible to select an address for the transmission to the interface connected to the home network, from the binding information related to that HoA. Thus, although usually there is a need to wait for a binding update message to be transmitted from the MN 100 at the disconnection of the communication, by using the method described in the second embodiment of the present invention, it is possible to simultaneously hold the information on the HoA connected to the home network and the information on the HoA associated with the CoA, which enables the switching of the destination in a moment and minimizes the packet loss.

In addition, even in the case of using an HoA as a destination address of a packet to be transmitted to the MN 100, as well as the route optimization using a CoA, the CN 150 can seize that a packet can be delivered directly to the MN 100. In particular, in the case of the reception of a notification for the registration of the in-connection information from the MN 100 in a state where the CN 150 holds a plurality of CoA association information on the MN 100, since a newly produced entry or entries other than the replaced entry are left intact, the CN 150 can grasp the CoA association information on the MN 100 and further seize the fact that the MN 100 is in connection with the home network.

Even in the case of the reception of a notification for the registration of the non-connection information from the MN 100, as well as the case of the in-connection information, since the entries other than the registered entry are left as they stand, the CN 150 can grasp the CoA association information of the MN 100 and further seize the fact that the MN 100 is not in connection with the home network. In addition, even in a state where only the home network connection information is registered, the CN 150 can distinguish between the fact that the MN 100 is in connection with the home network and the fact that the MN 100 is in connection with the foreign network.

Moreover, with respect to the registered CoA association information on the MN 100 and the home network information, if a policy for the destination address selection or the like is appended, the reference and comparison of the home network connection information is made to a policy for other CoA association information, thereby enabling the address selection based on the policy. Even in a case in which the HA of the MN 100 becomes a communication partner of the MN 100, it is possible to provide advantages similar to these in a case in which the CN 150 is a communication partner of the MN 100.

Furthermore, a brief description will be given of a concrete operation according to the second embodiment of the present invention. For example, as shown in FIG. 7, let it be assumed that, when the MN 100 is in connection with both the home network 1 and the foreign network 1, the MN 100 makes a communication with the CN 150. In this case, as mentioned above, the information shown in FIG. 9B is notified from the MN 100 through a binding information notification message to the HA1, and the HA1, which has acquired this information and which has proxy-received a packet transmitted from the CN 150 to the HoA of the MN 100, can transmit the packet not only to the interface connected to the foreign network 1 but also to the interface connected to the home network 1 of the MN 100.

In addition, when the MN 100 has notified the information shown in FIG. 9B to the HA1 through the use of a binding information notification message, the CN 150 can select one of the HoA1 and CoA1 of the MN 100 as a destination address of a packet to be transmitted to the MN 100. In the case of the selection of the HoA, the packet is sent directly to the interface connected to the home network of the MN 100. On the other hand, in the case of the selection of the CoA, the packet is delivered directly to the CoA1 through the use of the route optimization based on the mobile IP.

As described above, the HA shown in FIG. 17 and the CN 150 shown in FIG. 18 can acquire the binding information (for example, information shown in FIGS. 9A to 9D) on the MN 100 and can hold the information (home network connection information) on the connection information of the MN 100 to the home network. In addition, it is possible to hold the CoA association information where the address allocated to a different interface connected to a different network is associated as a CoA, simultaneously with the home network connection information, and by referring to these pieces of information, it is possible to grasp whether the MN 100 is in connection with the home network or is not in connection therewith. If the non-connection information is registered, the HA and/or CN 150 can recognize the fact that the MN 100 can generate/notify further CoA association information, which can provide the basis for a request for this information to the MN 100.

Third Embodiment

Furthermore, a description will be given hereinbelow of a configuration of a network according to a third embodiment of the present invention. The third embodiment of the present invention will also be explained using the network configuration according to the second embodiment of the present invention shown in FIG. 7. The configuration of the communication system shown in FIG. 7 is one example, and the present invention is not limited to the configuration shown in FIG. 7.

In FIG. 7, there are shown three networks (home network 1 of MN 100, foreign network 1, foreign network 2), an MN 100 having two interfaces of an interface which is in connection with the home network 1 and an interface which is in connection with the foreign network 1, and a CN 150 which is in connection with the foreign network 2. Moreover, each network is connected through the internet 110, and an HA 1 which is a home agent of the MN 100 exists in the home network 1.

The MN 100 shown in FIG. 7 has a plurality of interfaces so as to enable the simultaneous connections with a plurality of different networks. The two interfaces of the MN 100 are connected to the home network 1 and the foreign network 1. An HoA valid in the home network 1 is allocated to the MN 100 and, in the following description, this address is referred to as HoA1. On the other hand, an address valid in the foreign network 1 is allocated to the interface connected to the foreign network 1, and this address is handled as a CoA. In the following description, this address is referred to as a CoA1. The number of the interfaces held by the MN 100 according to the third embodiment is not limited to two, and one or plurality is acceptable. Likewise, the numbers of home networks to be allocated to the MN 100, foreign networks and home agents are not limited to the configuration shown in FIG. 7. One or plurality is acceptable.

FIG. 7 shows a case in which one of the networks with which the MN 100 is in connection is a home network for the MN 100 and the other is a foreign network for the MN 100. Whether the network with which the MN 100 is in connection is a home network or a foreign network depends upon the judgment as to whether this MN 100 recognizes that network as a home network or a foreign network. For example, conceivable are a method of making a judgment on the basis of which of the networks is the connection-accepting network to the MN 100, a method of making a judgment which of the networks the MN 100 itself configures as the connection-accepting network and a method of using a combination of both the judgments. In the case of the former judgment method, it is considered that the recognition on the network by the MN 100 depends upon the information on the home network allocated dynamically or statically, while in the case of the latter judgment method, it is considered that the network recognition depends on a configuration taken by the MN 100 itself. In FIG. 7, the home network and the foreign network have a configuration the MN 100 recognizes.

The third embodiment of the present invention will be described hereinbelow in consideration of a case in which, in the network configuration shown in FIG. 7, in a state where the MN 100 uses two interfaces to establish the connections with the home network 1 and the foreign network 1 at the same time, the MN 100 makes a communication with the CN 150 through the use of both the interfaces.

Figure 19:
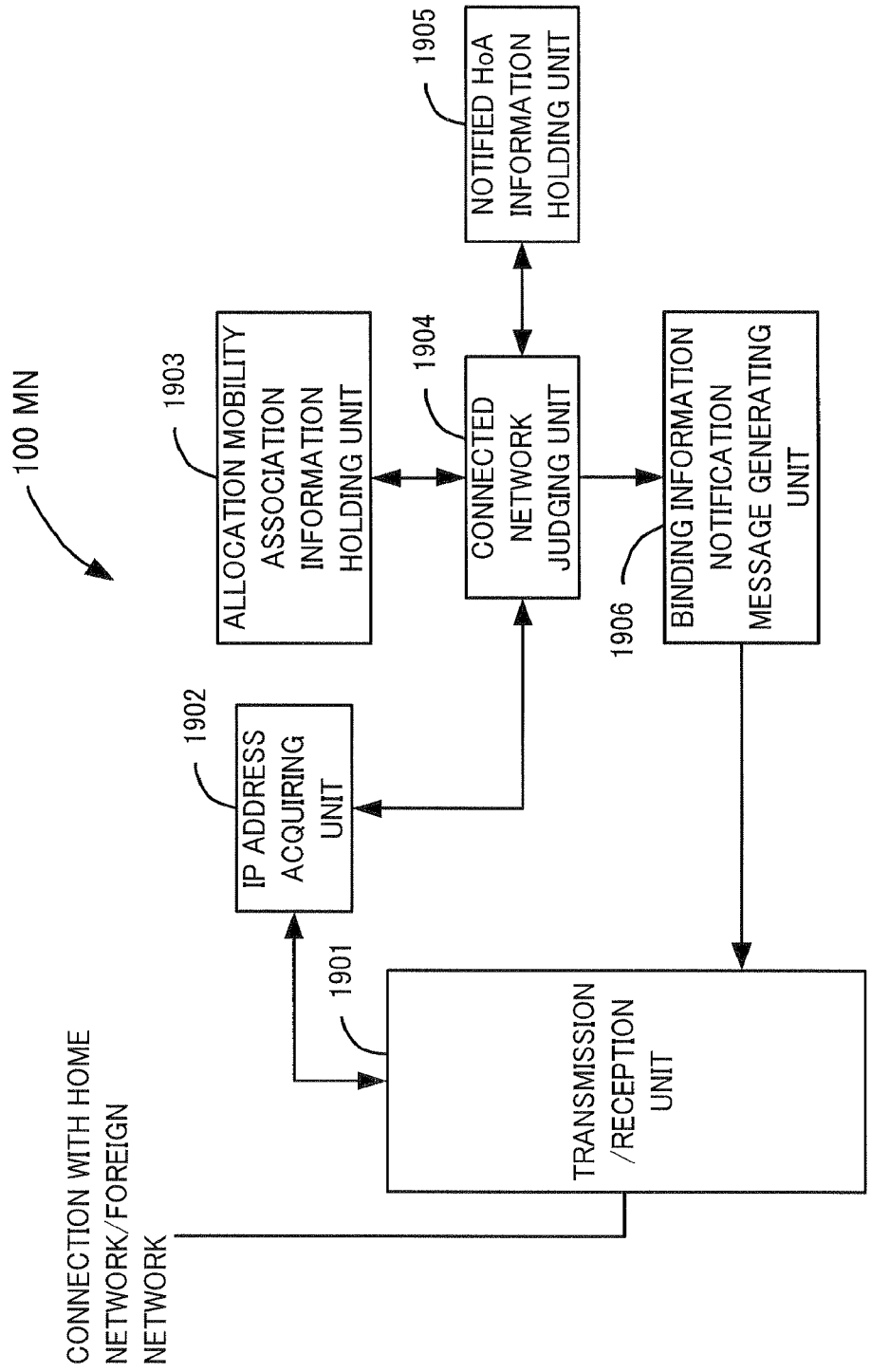
FIG. 19 is a block diagram showing one example of a configuration of an MN according to the third embodiment of the present invention.

First, a description will be given of a configuration of the MN 100 according to the third embodiment of the present invention. FIG. 19 is a block diagram showing one example of a configuration of the MN 100 according to the third embodiment of the present invention. The MN 100 shown in FIG. 19 is composed of a transmission/reception unit 1901, an IP address acquiring unit 1902, an allocation mobility association information holding unit 1903, a connected network judging unit 1904, a notified HoA information holding unit 1905 and a binding information notification message generating unit 1906. In FIG. 19, although functions realized in the MN 100 are shown by blocks, these functions are realizable by hardware or software. The transmission/reception unit 1901 and the allocation mobility association information holding unit 1903 are the same as the transmission/reception unit 201 and the allocation mobility association information holding unit 203, respectively, and the description thereof will be omitted.

The IP address acquiring unit 1902 fulfills a function to generate or acquire an IP address through the use of the address automatic setting (stateless address autoconfiguration), the DHCP (Dynamic Host Configuration Protocol), the manual setting or the like for the purpose of obtaining a valid IP address in a network connected thereto. Moreover, for example, conceivable is a case in which an address is dynamically allocated from an operator side in a manner different from the DHCP.

In addition, the IP address acquiring unit 1902 gives an instruction to the connected network judging unit 1904 for making a judgment as to whether the connected network is the home network or the foreign network. If the judgment result by the connected network judging unit 1904 shows the connection with the home network, the IP address acquiring unit 1902 generates/acquires an address different from its own home address valid in that home network and allocates it to the interface. On the other hand, if the judgment result shows the connection with the foreign network, the IP address acquiring unit 1902 generates/acquires an address valid in that foreign network and allocates it to the interface. It is also acceptable that the aforesaid address is generated in advance before the judgment result.

For example, in the case of the employment of the address automatic setting, the IP address acquiring unit 1902 hands over a prefix, advertised in a connected network, to the connected network judging unit 1904 to indicate the judgment on the connected network on the basis of this prefix. If the judgment result by the connected network judging unit 1904 shows a connection with the home network, the IP address acquiring unit 1902 automatically generates an address by use of a prefix acquired in advance and allocates it to the interface. However, it is necessary that the address to be generated in this case is an address different from the home address valid in the connected home network. On the other hand, if the judgment result shows a connection with the foreign network, the IP address acquiring unit 1902 automatically generates an address by use of the prefix previously acquired. An IP address acquired by the IP address acquiring unit 1902 in this way is allocated to a communication interface of the transmission/reception unit 1901 in a state associated. Incidentally, the acquisition of the prefix information on a connection-accepting side network and the address generation/acquisition method are not limited to the above-mentioned methods.

The connected network judging unit 1904 has a function to make a judgment on a network with which it is in connection. For example, the IP address acquiring unit 1902 uses the address automatic setting, the connected network judging unit 1904 acquires a prefix of its own home network from the allocation mobility association information holding unit 1903 so as to make a comparison between this acquired prefix and a prefix in the connected network notified from the IP address acquiring unit 1902. When this comparison result shows that both the prefixes agree with each other, a judgment is made that it is in connection with the home network. If they do not agree with each other, a judgment is made that it is in connection with a foreign network. The connected network judging unit 1904 hands over this judgment result (the home network connection information indicative of whether or not the connection-accepting network is the home network) to the IP address acquiring unit 1902. Although the judgment method mentioned above is made on the basis of the information on the home network allocated to the MN 100, it is also possible to employ a method of making a judgment in consideration of one of the networks to be employed by the MN 100 itself. The method of making a judgment on a connected network is not limited to the above-mentioned methods, but an arbitrary method is employable which can detect a variation of a connected network.

In addition, the connected network judging unit 1904 hands over, to the notified HoA information holding unit 1905, the result of the judgment on whether the network connected to the interface of the MN 100 is the home network or the foreign network, as the home network connection information to give an instruction for the notified HoA information holding unit 1905 to hold this information, and further hands it over to the binding information notification message generating unit 1906 to give an instruction for the generation of a binding information notification message so that this information is notified to the HA and/or the CN 150.

A description will be given hereinbelow of the home network connection information according to the third embodiment. In a case in which the network connected to one interface is the home network, the connected network judging unit 1904 of the MN 100 according to the third embodiment uses an address (which will be referred to hereinafter as a home CoA), generated/acquired by the IP address acquiring unit 1902 and allocated to this interface, as the information for notifying the home network connection information (in-connection information) indicative of the connection with the home network. Accordingly, when the judgment shows that the connected network is the home network, the connected network judging unit 1904 hands over the home CoA generated/acquired by the IP address acquiring unit 1902 and allocated to the interface and its own HoA valid in this home network to the notified HoA information holding unit 1905 so as to give an instruction so that the notified HoA information holding unit 1905 holds the association information, and hands it over to the binding information notification message generating unit 1906 so as to give an instruction for the generation of a binding information notification message so that this information (home network connection information) is notified to the HA and/or the CN 150.

Figure 20:
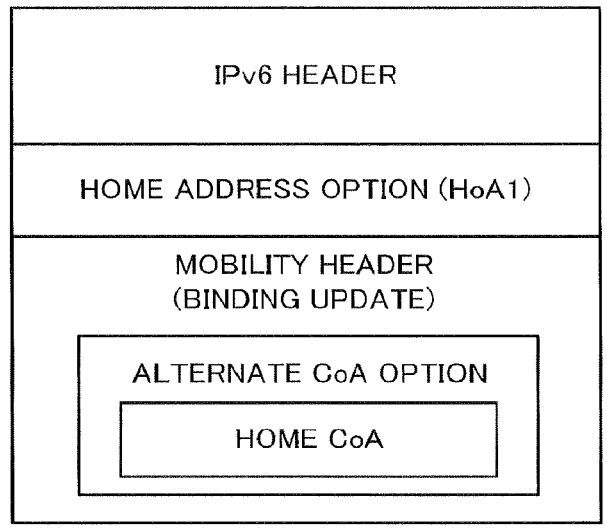
FIG. 20 is an illustration of a first example of a configuration of a binding information notification message including a home CoA, generated by a binding information notification message generating unit of an MN according to the third embodiment of the present invention.

A description will be given hereinbelow of a case in which a binding update message based on the mobile IP is used as a binding information notification message. With respect to a method of generating a binding update message for notifying a home CoA as home network connection information, it is possible to employ the same method as that for the binding update in the case of the notification of a normal CoA (which will be referred to hereinafter as a foreign CoA) allocated to an interface connected to a foreign network. That is, the home CoA is set in a section of the binding update message where the foreign CoA is set in the CoA association information, which enables the home network connection information to be used as a binding information notification message. FIG. 20 shows a binding update message in a case in which a home CoA is set by use of an alternate CoA (alternate Care-of Address) option. In the case of this generation method, as will be mentioned later, the HA and/or the CN 150 according to the third embodiment are required to have a means for making a discrimination as to whether the CoA association information included in the binding update message is a foreign CoA or a home CoA.

Figure 21:
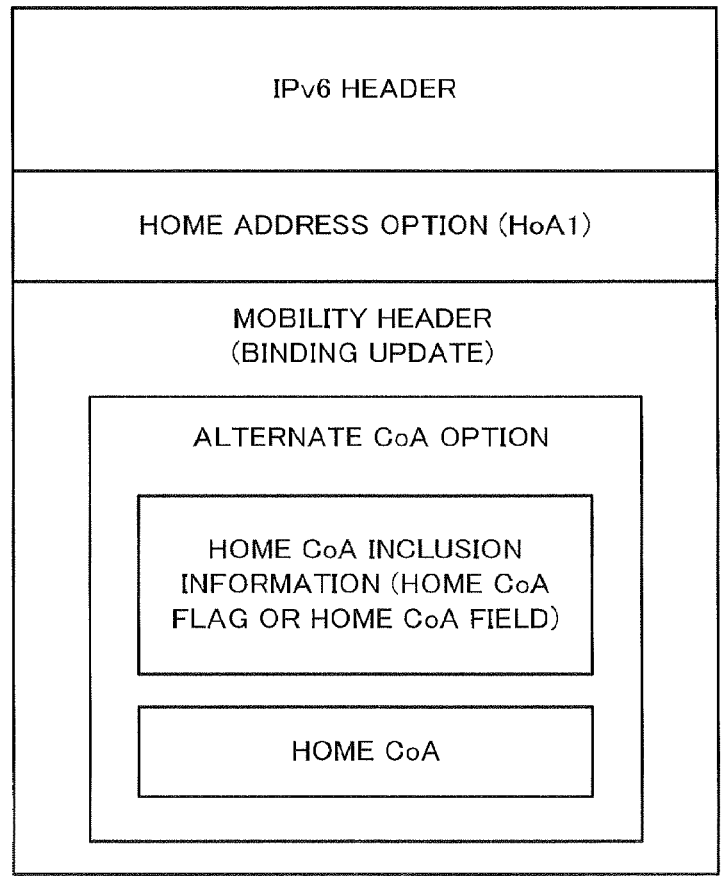
FIG. 21 is an illustration of a second example of a configuration of a binding information notification message including a home CoA, generated by a binding information notification message generating unit of an MN according to the third embodiment of the present invention.
Figure 22:
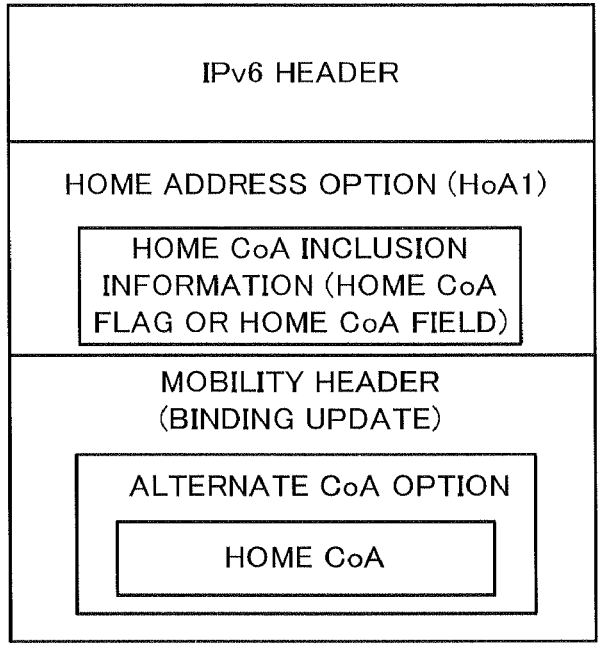
FIG. 22 is an illustration of a third example of a configuration of a binding information notification message including a home CoA, generated by a binding information notification message generating unit of an MN according to the third embodiment of the present invention.
Figure 23:
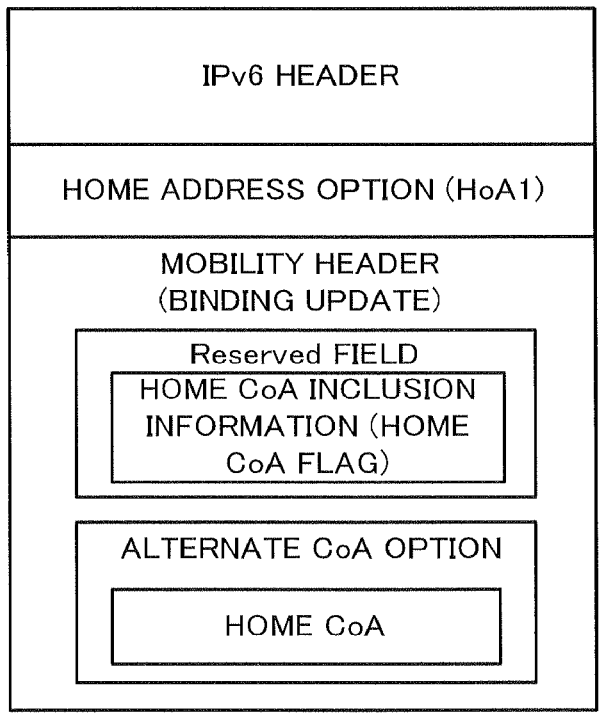
FIG. 23 is an illustration of a fourth example of a configuration of a binding information notification message including a home CoA, generated by a binding information notification message generating unit of an MN according to the third embodiment of the present invention.
Figure 24:
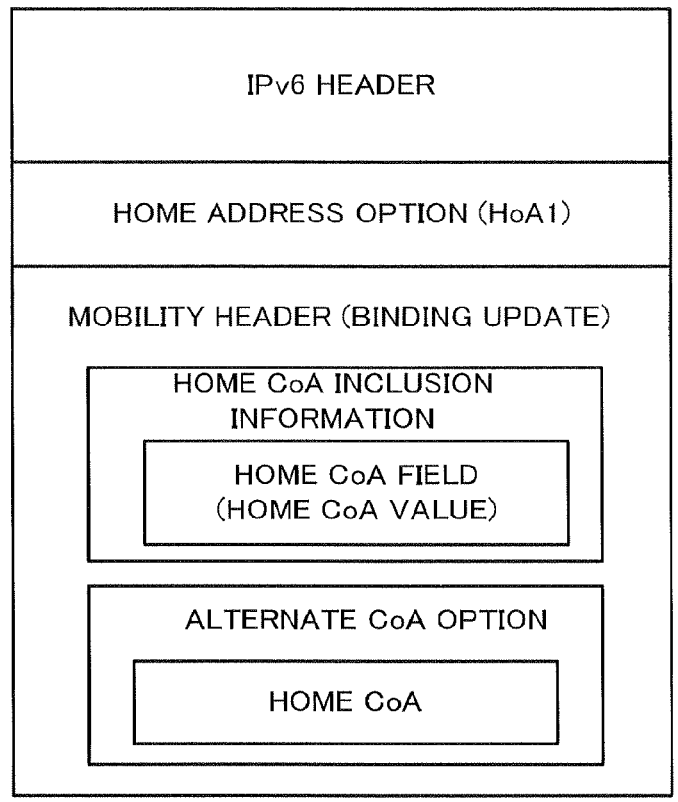
FIG. 24 is an illustration of a fifth example of a configuration of a binding information notification message including a home CoA, generated by a binding information notification message generating unit of an MN according to the third embodiment of the present invention.

In addition, it is also possible that information (which will be referred to hereinafter as home CoA inclusion information) which explicitly indicates the connection with the home network and the fact that the CoA association information included is a home CoA is appended to a binding update message generated in this way. In this case, for example, as shown in FIG. 21, a flag (which will be referred to hereinafter as a home CoA flag) is set in a CoA association information setting section (alternate CoA option or the like) and the flag is set for the setting of the home CoA, which enables the inclusion of the home CoA to be explicitly notified to a reception side node. Also in the case of this generation method, likewise, the HA and/or the CN 150 according to the third embodiment are required to have a means for processing the home CoA flag in the binding update message. With respect to the home CoA flag setting section, in addition to the alternate CoA option, it is also possible to provide it in a reserved field or the like in a binding update message as shown in FIG. 23. Moreover, in place of the flag, it is also acceptable to employ a method in which a field (home CoA flag or home CoA field) is provided to set a value indicative of a home CoA therein as shown in FIGS. 21 to 24.

Still additionally, in a case in which the MN 100 appends an ID to each information or a message carrying the information so that the HA and/or the CN 150 can distinguish among a plurality of CoA association information, it is also appropriate that a home CoA flag is set in an option including this ID. In this case, there is a need for this option to be used not only at the registration of a normal CoA but also at the registration of a home CoA.

Yet additionally, it is also appropriate that a new option for setting a home CoA is produced instead of the alternate CoA option and is put in a binding update message, and it is also acceptable to use an option to which allocated is an option type different from the alternate CoA option. Incidentally, with respect to the binding information notification message to the CN 150, the home CoA is not always notified as the information for the notification of the home network connection information, but it is also acceptable to notify only the aforesaid home CoA inclusion information as the home network connection information. In a case in which the home CoA and/or the foreign CoA are registered in the HA, a packet transmitted from the CN 150 to the HoA is proxy-received by the HA and transferred to the home CoA or a different foreign CoA. In a case in which the home network connection information is notified through the use of the home CoA flag in the alternate CoA option, if it is found that the value included does not depict the home CoA, the value of a portion designating the CoA association information can stand at an arbitrary value. For example, it is possible to designate the HoA itself, or to specify a different value. In this case, the aforesaid home CoA inclusion information is not limited to the information indicative of the inclusion of the home CoA, but it merely indicates that the home CoA inclusion information can be used as the information indicative of the connection with the home network and that the home CoA inclusion information can be handled as the home network connection information.

Moreover, it is also appropriate that the MN 100 puts the home CoA inclusion information in the individual alternate CoA option, the option including an ID, a new option or the like and simultaneously uses a flag in the reserved field of the aforesaid binding update message. In this case, upon receipt of this binding update message, before checking the option, the HA can grasp that the MN 100 has made a request for the registration of the home network connection information or that it handles the registration of the home network connection information.

Still moreover, in a case in which, without using the alternate CoA option, an address set as the source address of the binding update message is used as a CoA to be associated with the HoA, it is also acceptable to set a home CoA as the source address without setting the home CoA in the alternate CoA option as mentioned above. In a case in which the home CoA inclusion information is appended, although it is preferable that the home CoA inclusion information is placed in a section other than the alternate CoA option, in the case of the utilization of the home CoA inclusion information in the alternate CoA option, in a section of the option where set is the CoA association information, there is included a value which indicates that the value in the section designating the CoA association information in the alternate CoA option is not used as a home CoA.

On the other hand, in a case in which the connected network judging unit 1904 makes a judgment that the network connected to the interface of the MN 100 is the foreign network, the connected network judging unit 1904 hands over the address (foreign CoA) allocated to the interface connected to this foreign network and the HoA associated with the foreign CoA to the notified HoA information holding unit 1905 to give an instruction thereto for holding these pieces of information, and it further hands over these pieces of information to the binding information notification message generating unit 1906 to give an instruction thereto so that the binding information notification message generating unit 1906 generates a binding information notification message for notifying these pieces of information (CoA association information related to the foreign CoA) to the HA and/or the CN 150.

In addition, in a case in which the connected network judging unit 1904 makes a judgment that the network connected to the interface of the MN 100 is the foreign network, the connected network judging unit 1904 hands over the information (non-connection information), indicating that the connection-accepting network is not the home network, to the notified HoA information holding unit 1905 to give an instruction thereto for holding this information, and it further hands over this information to the binding information notification message generating unit 1906 to give an instruction thereto so that the binding information notification message generating unit 1906 generates a binding information notification message for notifying this information to the HA and/or the CN 150.

Figure 25:
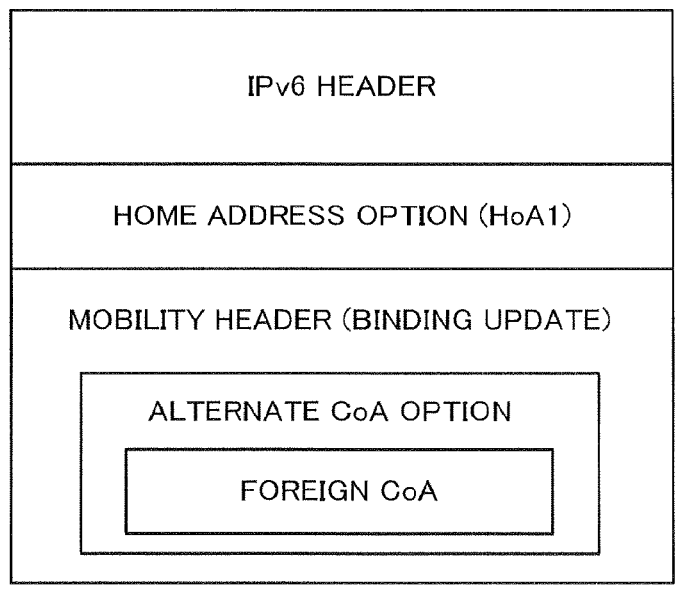
FIG. 25 is an illustration of a first example of a configuration of a binding information notification message including a foreign CoA, generated by a binding information notification message generating unit of an MN according to the third embodiment of the present invention.

A description will be given hereinbelow of a case in which a binding update message based on the mobile IP is used as a binding information notification message for notifying the non-connection information as the home network connection information. As the binding update message for notifying the non-connection information as the home network connection information, it is possible to directly use the binding update message to be used at the notification of the foreign CoA allocated to the interface connected to the foreign network. That is, in a case in which the foreign CoA is included as the CoA association information in the binding update message for notifying the CoA association information, the processing is conducted so that the notification-receiving side recognizes that the interface to which this foreign CoA is allocated is not in connection with the home network. FIG. 25 is an illustration of a binding update message when a foreign CoA is set through the use of an alternate CoA option.

In the case of this generation method, as will be mentioned later, the HA and/or the CN 150 according to the third embodiment is required to have a means for distinguishing whether the CoA association information included in the binding update message is the foreign CoA or the Home CoA.

Figure 26:
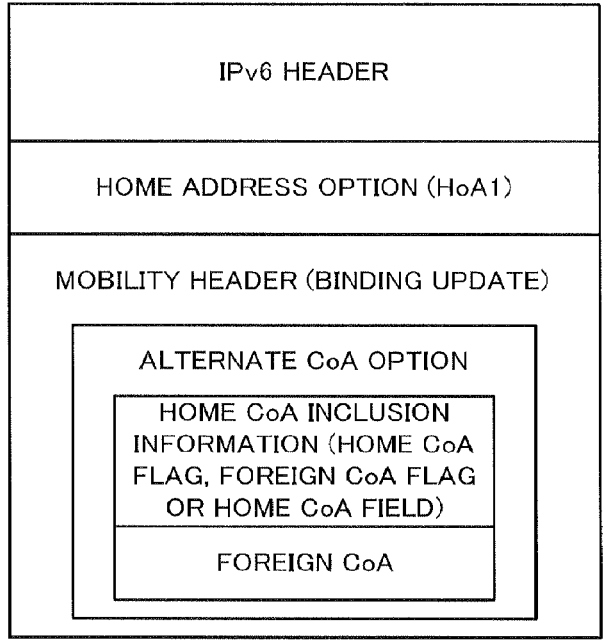
FIG. 26 is an illustration of a second example of a configuration of a binding information notification message including a foreign CoA, generated by a binding information notification message generating unit of an MN according to the third embodiment of the present invention.

It is also possible that the information (foreign CoA inclusion information) explicitly indicating that the included CoA association information is the foreign CoA is appended to the binding update message generated by this method. In this case, for example, as shown in FIG. 26, when the above-mentioned home CoA is not set at the setting of the foreign CoA, it is possible to explicitly notify, to the reception side node, the fact of no inclusion of the foreign CoA. Also in this generation method, likewise, the HA and/or the CN 150 according to the third embodiment is required to have a means for processing the home CoA flag in the binding update message. Moreover, it is also acceptable to employ a method of setting a value indicative of the foreign CoA in the above-mentioned home CoA field. Still moreover, it is also acceptable that a foreign CoA flag similar in type to the home CoA flag is provided separately from the home CoA flag so as to indicate that the foreign CoA is included when this flag is set. Yet moreover, it is also acceptable that, instead of the alternate CoA option, a new option is produced for setting a foreign CoA and is put in the binding update message, or that it is also possible to use an option to which an option type different from the alternate CoA option is allocated.

In a case in which the notification of the non-connection information is explicitly made according to the above-mentioned method, there is no need to put the foreign CoA serving as the CoA association information in the binding update message. Moreover, it is also acceptable that the HoA itself is set in the portion of the CoA association information so as to set it as the binding update message for the notification of the non-connection information, or that the foreign CoA inclusion information is further appended to this message.

In addition, there is no need to limit the above-mentioned foreign CoA inclusion information to the information indicative of the inclusion of the foreign CoA, and it is also possible to use it merely as the information indicative of the connection with the foreign network.

Still additionally, in a case in which, without using the alternate CoA option, an address set as the source address of the binding update message is used as a CoA associated with an HoA, the foreign CoA is not set in the alternate CoA option as mentioned above, the foreign CoA can be set in the source address. Although it is preferable that, when the home inclusion information is appended, it is provided in a section other than the alternate CoA option, in the case of the utilization of the home CoA inclusion information in the alternate CoA option, a value indicating that a value in a section designating the CoA association information in the alternate CoA option is not used as the foreign CoA can be included in a section setting the CoA association information in the alternate CoA option.

It is also acceptable that a plurality of non-connection information each mentioned above and a plurality of CoA association information each mentioned above are notified simultaneously or separately. Moreover, it is also acceptable that only the information to be notified is selected and notified. Still moreover, it is also possible that the home network information (in-connection information, non-connection information) and the CoA association information related to the normal foreign CoA are notified simultaneously or separately as the information related to a plurality of interfaces held by the MN 100. In addition, likewise, with respect to these pieces of information, only the information to be notified is selected and notified.

The binding information notification message generating unit 1906 fulfills a function to generate a binding information notification message including the home network connection information notified from the connected network judging unit 1904 and to hand over this binding information notification message to the transmission/reception unit 1901 so as to drive an instruction thereto for the transmission.

As the binding information notification message, it is also possible to use a binding update message based on the mobile IP as mentioned above, to use a message according to a different protocol, or to use a newly produced massage. Moreover, if the information (information including the in-connection information) shown in FIG. 27A or 27B can be notified to a destination as will be mentioned later, all formats are acceptable. The MN 100 uses the binding information notification message for notifying, to a destination, the information for specifying an HoA which is an object of registration, a home CoA associated with this HoA and the information indicative of home CoA inclusion information (home CoA flag or the like). Still moreover, it is also acceptable that the MN 100 notifies the information (information including the non-connection information), shown in FIG. 27C or 27D and mentioned later, to a destination. Also in this case, likewise, messages with all formats are available.

With respect to the transmission of the home network connection information, in the case of the notification of the in-connection information, it is preferable that the information is transmitted when the MN 100 establishes a connection with its own home network or is in connection therewith. On the other hand, in the case of the notification of the non-connection information, it is preferable that this information is transmitted when the MN 100 is not in connection with its own home network. Moreover, it is also acceptable that the transmission is made at the same timing as the binding update based on the mobile IP. Still moreover, the transmission of the home network connection information is not always made when the MN 100 makes a connection with the home network, it is in connection therewith and it is in non-connection therewith, but it is also acceptable that the transmission thereof is arbitrarily made according to the judgment by a user or operator. Yet moreover, the destination of the binding information notification message is not limited to the nodes (HA1 and/or CN 150) constituting the network shown in FIG. 7, but every node which can utilize the home network connection information and CoA association information on the MN 100 are acceptable. For example, the transmission can be made toward a proxy node having a function to fulfill a proxy for the HA or the CN 150, and it can also be made to a management node having a function to manage the information on the MN 100.

In addition, in a case in which the CoA association information on different addresses allocated to the same interface or different interfaces and the home network connection information are held in the notified HoA information holding unit 1905, or when the judgment shows that there is a need to notify this information, this information can be transmitted in a state included in the binding information notification message which is for notifying the home network connection information and the CoA association information. For example, in the case of the MN 100 in the configuration shown in FIG. 7, the home network connection information on the interface connected to the home network 1 and the CoA association information on the foreign CoA of the interface connected to the foreign network 1 can be transmitted through the use of separate binding information notification messages, or they can also be transmitted in a state included in a single binding information notification message.

Still additionally, in a case in which the MN 100 is in connection with the foreign network 1 and the foreign network 3 like the configuration shown in FIG. 10, the CoA association information on the foreign CoA of the interface connected to the foreign network 1 and/or the foreign network 3 and the non-connection information forming the home network connection information can be transmitted through the use of separate binding information notification messages, or they can also be transmitted in a state included in a single binding information notification message.

The notified HoA information holding unit 1905 has a function to hold binding information handed over from the connected network judging unit 1904 and notified to the HA or the CN 150. The notified HoA information holding unit 1905 holds, as the information the MN 100 has transmitted to its own HA or the CN 150, the CoA association information indicative of the association between the HoA and the CoA transmitted through the use of a normal binding update message based on the mobile IP, the in-connection indicative of the connection with the home network and the non-connection information indicative of no connection with the home network. The notified HoA information holding unit 1905 can be realized in the form of a binding update list specified in the mobile IP, or it can also be realized as a separate data holding unit.

Figure 27A:
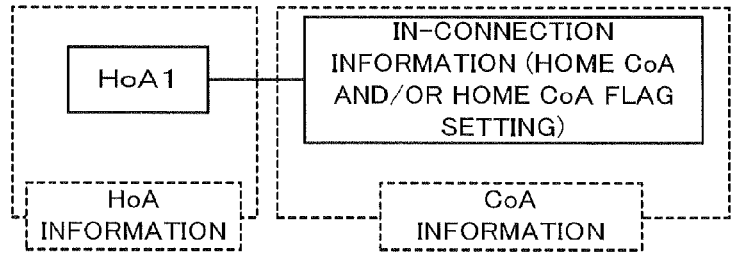
FIG. 27A is an illustration of a first example of in-connection information which is to be handed over from a connected network judging unit to a notified HoA information holding unit and a binding information notification message generating unit in an MN according to the third embodiment of the present invention.
Figure 27B:
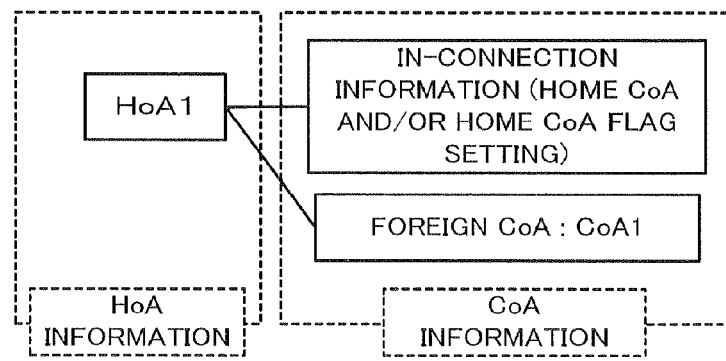
FIG. 27B is an illustration of a second example of in-connection information which is to be handed over from a connected network judging unit to a notified HoA information holding unit and a binding information notification message generating unit in an MN according to the third embodiment of the present invention.
Figure 27C:
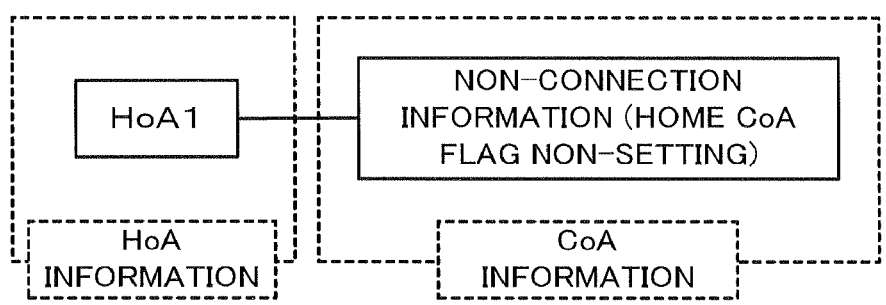
FIG. 27C is an illustration of a first example of non-connection information which is to be handed over from a connected network judging unit to a notified HoA information holding unit and a binding information notification message generating unit in an MN according to the third embodiment of the present invention.

Referring to FIGS. 27A, 27B, 27C and 27C, a description will be given hereinbelow of information (home network connection information) the connected network judging unit 1904 hands over to the notified HoA information holding unit 1905 and the binding information notification message generating unit 1906 in the MN 100. FIGS. 27A and 27B show first and second examples of the in-connection information the connected network judging unit 1904 hands over to the notified HoA information holding unit 1905 and the binding information notification message generating unit 1906 in the MN 100 according to the third embodiment of the present invention.

As shown in FIG. 27A, the connected network judging unit 1904 adds, to the HoA1 allocated to the interface connected to the home network 1, the in-connection information indicative of the fact of being currently in connection with the home network 1 which has allocated this HoA1. As shown in FIG. 27B, it is also possible that the information on an address (CoA1) allocated to a different interface is additionally added simultaneously as a CoA associated with the HoA1.

Figure 27D:
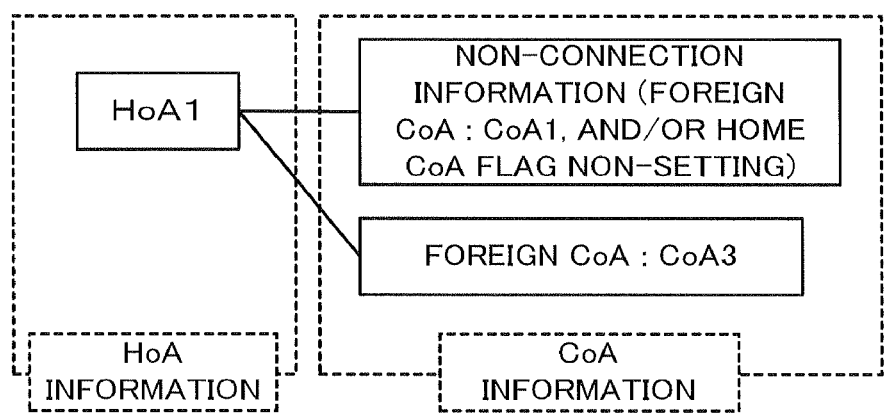
FIG. 27D is an illustration of a second example of non-connection information which is to be handed over from a connected network judging unit to a notified HoA information holding unit and a binding information notification message generating unit in an MN according to the third embodiment of the present invention.

FIGS. 27C and 27D show first and second examples of the non-connection information the connected network judging unit 1904 hands over to the notified HoA information holding unit 1905 and the binding information notification message generating unit 1906 in the MN 100 according to the third embodiment of the present invention. The information shown in FIGS. 27C and 27D signify a state in which, as shown in FIG. 10, the MN 100 is in connection with the foreign network 1 and the foreign network 3 and the CoA1 and the CoA 3 are allocated to the interfaces connected to the foreign network 1 and the foreign network 3.

As shown in FIG. 10, in a case in which the MN 100 is in connection with the foreign network 1 and the foreign network 3 and the CoA 1 is allocated from the foreign network 1 and the CoA 3 is allocated from the foreign network 3, as shown in FIG. 27C, the connected network judging unit 1904 adds, to its own HoA1, the non-connection information indicative of the fact of being not currently in connection with the home network 1 which has allocated the HoA1. Moreover, as shown in FIG. 27D, it is also possible that the foreign CoA is put in the non-connection information. Still moreover, it is also acceptable that the information on an address (CoA3) allocated to a different interface is added simultaneously as a CoA associated with the HoA1. Although the information on only the CoA1 is handled as the non-connection information in FIG. 27D, it is also acceptable that the CoA 3 can also be handled as the non-connection information. Yet moreover, it is also acceptable that, without associating the foreign CoA, the foreign CoA inclusion information is merely handled as the information indicative of the connection with the foreign network so that it is taken as the non-connection information excluding the foreign CoA.

The MN 100 can transmit a binding information notification message, produced by the binding information notification message generating unit 1906, to the HA and/or the CN 150 so as to notify the fact that it is in connection with the home network and, simultaneously, notify the fact of the information independent of the information on the address allocated to a different interface to the HA and/or the CN 150. In addition, the MN 100 becomes capable of notifying that it is in connection with the foreign network but not in connection with the home network. The information shown in FIGS. 27A to 27D and grasped/managed by the MN 100 is notified through a binding information notification message to the HA and/or the CN 150.

Incidentally, the binding information notification message is not limited to the above-mentioned method of extending a binding update message based on the mobile IP and, for example, it is also appropriate that the information is placed in a message according to a protocol handling the multihome before the transmission, or that a new message is produced for carrying the information. It is also possible that the information is put in a plurality of HoA information notification messages including the information on the HA managing the HoAs, which has been described in the first embodiment of the present invention.

In addition, even in a case in which the MN 100, which notifies a plurality of CoA association information through the use of separate binding update messages to a communication partner, adds an ID to each of the binding update messages so that the communication partner can distinguish among the respective binding update messages, the MN 100 can add such IDs to the binding update messages including the home network connection information. Still additionally, also when an ID is added to each of binding information and they are transmitted through the use of separate binding update messages, or if a plurality of binding information are transmitted with the same binding update message, likewise, such IDs can be added to the binding information including the home network connection information. Thus, the communication partner can carry out the registration, deletion and replacement on the basis of the IDs added.

Yet additionally, in a case in which the MN 100 notifies a policy on the destination address selection to the CN 150, combined with the CoA association information, the information (home CoA or foreign CoA) to be notified as the home network connection information can also be transmitted in a state where the same type of policy is added thereto.

Moreover, it is also possible that, by transmitting a binding update message for the deletion of the CoA association information on a normal foreign CoA or a binding update message for the deletion of the binding information to be used as the home network connection information, an instruction is given to a communication partner which has received this message so that the held entry which is an object of deletion is corrected or replaced so as to hold new home network connection information.

When the MN 100 itself transmits a packet, the MN 100 can also carry out the source address selection using the home network connection information similar to that notified to the HA and/or the CN 150. Also in the case of using a function to manage a plurality of addresses held by the MN 100 itself and map these addresses into an ID (address) to be notified to an upper layer, it is possible to utilize the home network connection information according to the third embodiment of the present invention with respect to the address selection for that function. Even if a mapping function exists, it is also possible to fulfill a function as a destination address selecting unit independently of this function.

Moreover, in a case in which the MN 100 which is in connection with the home network carries out the return routability specified in the mobile IP before transmitting a binding update message including the home network connection information to the CN 150, the MN 100 can use a home CoA notified as the in-connection information to the HA, as the source address of a care-of test init (CoTI) message. Still moreover, the MN 100 can use the home CoA as the source address even at the encapsulation into the HA for the transmission of a home test init (HoTI) message. That is, even in the case of the connection with the home network, it is possible to carry out the return routability based on the mobile IP with respect to that interface. Yet moreover, at the implementation of the return routability on the foreign CoA of the interface connected to the foreign network, it is also possible to encapsulate the home test init in a state where the home CoA is set as the source address and transmit it to the HA. In this case, although the care-of init test message is transmitted from the interface to which the foreign CoA is allocated, the home test init message can be transmitted from the interface connected to the home network.

As described above, the MN 100 shown in FIG. 19 can notify the fact of the connection with the home network through the use of a binding information notification message to communication nodes such as its own HA1 and/or the CN 150. Since the information to be registered by this notification can exist independently of the CoA association information (the association between the HoA and the foreign CoA) on the normal foreign CoA, the MN 100 shown in FIG. 7 can notify to its own HA1 and/or the CN 150 the fact that it is possible to directly receive packets from both the interface connected to the home network 1 and the interface connected to the foreign network 1.

In addition, the MN 100 can notify the fact that it is in connection with the foreign network but not in connection with the home network. In this case, the MN 100 can notify to the HA1 and/or the CN 150 the fact that all packets addressed to that HoA are delivered through the HA1 to the MN 100. Thus, even in the case of no registration of the CoA association information on the MN 100, the HA1 and/or the CN 150 can grasp that the MN 100 is not in connection with the home network.

Still additionally, it is also appropriate that the MN 100 not only notifies the in-connection/non-connection with the home network as the home network connection information but also notifies, as one of the home network connection information, the information (HA use-inhibition information) for making a request for the inhibition of the communication through the HA if some trouble has occurred in the HA managing the HoA or when the communication through the HA is not desirable for other arbitrary reasons. It is preferable that a node which has received this notification selects the transmission to the CoA through the use of the route optimization based on the mobile IP without selecting the HoA as the destination address.

In a case in which the MN 100 holds a plurality of HoAs (for example, HoA1 and HoA2), also when the MN 100 uses the HoA1 as an address (CoA) associated with the HoA2, it is also appropriate that the MN 100 applies the home network connection information (in-connection information, non-connection information) or HA use-inhibition information according to the third embodiment of the present invention to this address for the notification to the HA and/or the CN 150. For example, in the case of the notification as the in-connection information, the in-connection information on the home network is notified with respect to the HoA1 set in the section of the CoA. In this case, the in-connection information is appended to the HoA1, and the HA and/or the CN 150 can grasp that the HoA1 of the MN 100 registered as the CoA is in connection with a valid home network and, when making the transmission in a state where this address is set as the destination, they can deliver a packet directly to the MN 100. Moreover, in a case in which the CoA section includes the HoA1 as the non-connection information, the HA and/or the CN 150 can seize the fact of no connection with the home network relative to the HoA1 of the MN 100 registered as the CoA and, when making the transmission in a state where this address is set as the destination, they can seize that the packet is delivered through the HA to the MN 100.

It is also possible that a home CoA and/or home CoA inclusion information are appended to the aforesaid HoA1 to be registered as the CoA. Moreover, it is also acceptable that the above-mentioned plurality of HoAs (HoA1 and HoA2) are allocated from the same home network or allocated from different home networks. A combination thereof is also acceptable. In particular, in the case of the HoAs allocated from the same home network, the MN 100 is capable of using one HoA as a home CoA for a different HoA.

In addition, in a case in which the MN 100 uses one HoA in a state associated with a CoA for a different HoA, by explicitly appending the information indicative of the fact of the CoA being the HoA into a binding information notification message (binding update message), the HA and/or the CN 150 can recognize that the packet transmitted through the use of this CoA association information is transmitted to the HoA of the MN 100. Still additionally, in a case in which the home network connection information according to the present invention is appended to the HoA serving as a CoA, the HA and/or the CN 150 can recognize whether the packet transmitted to the CoA is sent directly to the MN 100 or it is delivered through the HA thereto. If the home network connection information according to the present invention is not appended thereto, HA and/or the CN 150 cannot make a judgment as to whether the packet transmitted to the CoA is sent directly to the MN 100 or it is delivered thereto through the HA which manages the HoA serving as the CoA.

For example, although the HA can recognize that an encapsulated packet addressed to the MN 100 and produced by utilizing the CoA association information to which appended is the information indicative of the CoA being the HoA is transmitted to the HoA of the MN 100, the HA cannot make a judgment as to whether the packet directly reaches the MN 100 or it reaches the MN 100 through a different HA. In a case in which the non-connection information constituting the home network connection information according to the present invention is appended thereto, the HA can recognize that the encapsulated packet again passes through at least one different HA.

On the other hand, as well as the aforesaid case of the HA, the CN 150 can recognize that the packet addressed to the MN 100 and produced by means of a routing header through the use of the CoA association information to which appended is the information indicative of the CoA being the HoA is transmitted to the HoA of the MN 100, but it cannot make a judgment as to whether the packet is directly delivered to the MN 100 or it is sent to the MN 100 through the HA managing this HoA. If the in-connection information constituting the home network connection information according to the present invention is appended thereto, the CN 150 can recognize that the packet transmitted is delivered directly to the MN 100 connected to the home network. Thus, the HA and/or the CN 150 can carry out the address selection on the basis of this recognition. Moreover, when the non-connection information is appended to the HoA serving as the CoA, the HA and/or the CN 150 can recognize that there is a possibility that a CoA associated with the HoA indicated as the CoA exists, and they can acquire a basis for a request for further CoA association information to the MN 100.

Figure 28:
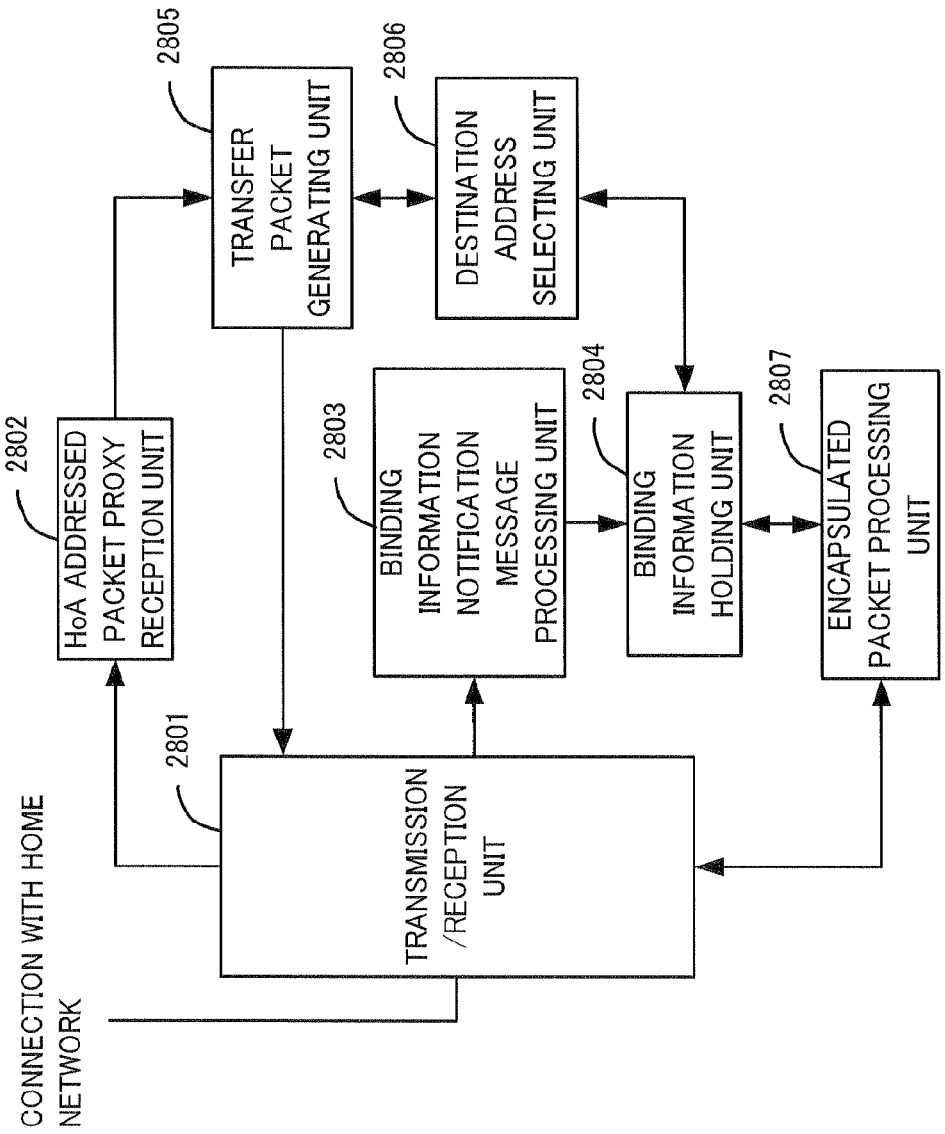
FIG. 28 is a block diagram showing one example of a configuration of an HA according to the third embodiment of the present invention.

Furthermore, referring to FIG. 28, a description will be given hereinbelow of a configuration of an HA according to the third embodiment of the present invention. FIG. 28 is a block diagram showing one example of a configuration of an HA according to the third embodiment of the present invention. The HA shown in FIG. 28 is composed of a transmission/reception unit 2801, an HoA addressed packet proxy reception unit 2802, a binding information notification message processing unit 2803, a binding information holding unit 2804, a transfer packet generating unit 2805, a destination address selecting unit 2806 and an encapsulated packet processing unit 2807. The transmission/reception unit 2801 and the HoA addressed packet proxy reception unit 2802 are the same as the transmission/reception unit 1701 and the HoA addressed packet proxy reception unit 1702 in FIG. 17, and the description thereof will be omitted. In FIG. 28, although functions realized in the HA are shown by blocks, these functions are realizable by hardware or software.

The binding information notification message processing unit 2803 fulfills a function to conduct the processing on a binding information notification message received from the MN 100, and it interprets the home network connection information included in the message to grasp the situation of the connection of the MN 100. Upon receipt of a binding update message shown in FIG. 20, the HA makes a comparison between an HoA (HoA in a home address option) which is an object of registration and an address (address contained in an alternate CoA option) included as the address associated with that HoA and, if the prefixes of both the addresses are identical to each other, makes an interpretation as this message is a binding update message for notifying the in-connection information and gives an instruction to the binding information holding unit 2804 for storing the home network connection information shown in FIG. 27A. Instead of the comparison with the HoA which is an object of registration, the comparison with the prefix information managed by the HA itself can also provide the same result.

Moreover, in a case in which the home CoA inclusion information is included in the message as shown in FIGS. 21 to 24, it is also possible that, by checking the contents of the information, a judgment is made that this message is a binding update message for notifying the home network connection information and the CoA included in the message is a home CoA or a foreign CoA, or that a judgment is made using both the contents of the home CoA inclusion information and the result of a comparison between the CoA actually included as mentioned above and the HoA.

In a case in which, for example, the information on the old address, which has been acquired before the connection of the MN 100 with the home network and which is to be replaced with the notified home network connection information or CoA association information, is included in the binding information notification message, the binding information notification message processing unit 2803 gives an instruction to the binding information holding unit 2804 so that the information on the old address is replaced with the notified home network connection information or CoA association information. As the information on the old address, for example, in a case in which the MN 100 transmits a plurality of binding information through the use of separate binding information notification messages or when it transmits a plurality of binding information through the use of the same binding information notification message, it is possible to use the ID appended for the purpose of distinguishing among the respective binding information.

The binding information holding unit 2804 fulfills a function to, upon receipt of an instruction from the binding information notification message processing unit 2803, store the home network connection information included in the binding information notification message received from the MN 100, or the CoA association information. The binding information holding unit 2804 holds the information indicative of the contents similar to the aforesaid information shown in FIGS. 27A to 27D for each MN 100. The binding information holding unit 2804 can be realized as a binding cache specified in the mobile IP, or it can also be realized as another data holding unit.

In addition, even in a case in which the CoA association information on the address allocated to a different interface is included together with the home network connection information as shown in FIG. 27B, the binding information holding unit 2804 holds both the home network connection information and the CoA association information. As a method of holding the information indicative of the connection with the home network, a home CoA flag is set with respect to the binding information including a home CoA so that this entry explicitly indicates the in-connection information as the home network connection information. In this case, although two CoA information are associated with a single HoA1 in FIG. 27B, it is also acceptable that CoA information are held in a state associated with separate HoA1, respectively. In this case, for the discrimination from binding information on a different normal foreign CoA, a flag can be set and held. The present invention is not limited to the method of producing a separate entry, but it is also possible that, for example, new information (flag or the like) indicative of the connection with the home network is appended into the entry on the CoA association information indicative of the normal association between an HoA and a CoA so as to indicate that the MN 100 having the HoA included in this entry is in connection with not only the foreign network but also the home network.

It is also appropriate that an entry in which held is a home CoA constituting the home network connection information and an entry in which held is CoA association information on a normal foreign CoA are held separately and the fact that these entries pertain to a specified MN 100 is grasped by use of unique information such as an HoA, an ID or the like. Moreover, in a case in which IDs are appended for the purpose of distinguishing among a plurality of binding information such as the home network connection information notified from the MN 100, CoA association information on a normal foreign CoA and others, it is desirable that the information is held in a state where these IDs are associated with the respective entries, respectively.

The transfer packet generating unit 2805 acts as a means for transferring a packet, handed over from the HoA addressed packet proxy reception unit 2802 and addressed to the HoA of the MN 100 to the MN 100. At the generation of a transfer packet, the transfer packet generating unit 2805 gives an instruction to the destination address selecting unit 2806 for selecting an address designated as a destination address of the transfer packet and, if the address selected by the destination address selecting unit 2806 is a home CoA or a foreign CoA, it generates a packet encapsulated into an outer header and directed to this address and hands over this packet to the transmission/reception unit 2801 and gives an instruction thereto for the transmission.

The destination address selecting unit 2806 fulfills a function to, upon receipt of an instruction from the transfer packet generating unit 2805, select an optimum address to be set as a destination address of a transfer packet. For the selection of the optimum address, the destination address selecting unit 2806 refers to the information (for example, the information shown in FIG. 27B) stored in the binding information holding unit 2804. At this time, when the CoA association information indicative of the association between normal HoA and CoA and a home CoA constituting the home network connection information and a foreign CoA are included, the destination address selecting unit 2806 selects one of the information and hands it over to the transfer packet generating unit 2805. In a case in which the destination address selecting unit 2806 selects the in-connection information (home CoA) as the home network connection information, when the home CoA is set as a destination address and an encapsulated packet is transmitted, the packet can be transmitted directly to the MN 100. In the case of the selection of the binding information on the foreign CoA, the destination address is encapsulated as the foreign CoA and transmitted, thereby enabling continuous communication. In the selection of the destination address, it is also appropriate that, when the transmission to the HoA is selected, the home CoA associated with this HoA is handed over as a selection result to the transfer packet generating unit 2805 so as to give an instruction for the encapsulation using this address.

In the case of utilizing a function to manage a plurality of addresses notified from the MN 100 and map these addresses into an ID (address) to be notified to an upper layer, the destination address selecting unit 2806 can play a role as an address selecting unit for this function. Moreover, even if a mapping function exists, it can function as a destination address selecting unit independent of this function.

The encapsulated packet processing unit 2807 has a function to process an encapsulated packet addressed to the HA and transmitted thereto in a case in which the MN 100, it manages, transmits a packet to the CN 150. If binding information corresponding to the source node on the received encapsulated packet exists in the binding information holding unit 2804 as the information on the MN 100 it manages, the decapsulation processing is conducted with respect to this encapsulated packet. Moreover, the encapsulated packet processing unit 2807 hands over the inner packet after the processing to the transmission/reception unit 2801 and gives an instruction thereto for the transmission thereof. The HA can recognize that the MN 100 transmits the packet by use of the interface connected to the home network when the home CoA of the MN 100 it manages is set as the source address of the encapsulated packet. It is also possible that the MN 100 gives an instruction to the binding information holding unit 2804 for holding the information indicative of the interface used by the MN 100 in the current communication.

Although not shown, it is also appropriate that, after the HA (for example, the HA shown in FIG. 28) according to the present invention receives a binding information notification message including home network connection information such as a home CoA flag from the MN 100, the HA transmits a response message thereto which includes the information indicative of a reception result of the home network connection information notification from the MN 100. In this case, there is a need for the MN 100 receiving this response message to hold a function for interpreting this information.

In addition, although not shown, it is also appropriate that the HA according to the present invention puts, in a router advertisement message it transmits, a flag indicating the handling with respect to a function related to the home network connection information. In this case, the MN 100 receiving this message is required to have a function for interpreting that flag. In a case in which the flag is set in the message, the MN 100 makes a judgment that the information related to the home network connection information can be notified to the HA in the home network. On the other hand, if the flag is not set in the message, the MN 100 makes a judgment that the information related to the home network connection information cannot be notified to the HA in the home network.

As a means for indicating the information indicative of the fact that the HA handles a function for the home network connection information, it is also possible to use a dynamic message such as DHCPv6 or use a static setting means by an operator or user. Moreover, it is also possible that a new flag is provided in a request message of the dynamic home agent address discovery specified in the mobile IPv6 and the request message in which the flag is set indicates a request for a list of HAs handling a function related to the home network connection information. Still moreover, it is also possible that a new flag is also provided in a reply message thereto so as to indicate a message including a list of HAs handling a function related to the home network connection information.

In addition, it is also acceptable that a new flag is provided in a home agent information option specified in the mobile IPv6 so that the setting of this flag shows that the HA indicated by the option is an HA handling the function related to the home network connection information.

As described above, the HA shown in FIG. 28 can acquire the binding information on the MN 100 and can hold the information (home network connection information) on the connection condition of the MN 100 to the home network. The CoA association information in which the address allocated to a different interface connected to another network is associated as a foreign CoA can be held simultaneously with the home network connection information.

In consequence, in the destination address selection at the packet transfer to the MN 100, the HA according to the third embodiment of the present invention can preferentially select the transmission to the interface connected to the home network of the MN 100.

In addition, for example, in a case in which a disconnection of communication between the MN 100 using a home CoA as the destination address and the CN 150 has occurred, the HA can select a different foreign CoA associated with the HoA and proxy-receive a packet addressed to the HoA and encapsulate the packet, whose destination address is this HoA, with respect to the foreign CoA associated with this HoA, thereby enabling prompt recovery of the communication. Conversely, for example, in a case in which a disconnection of communication between the MN 100 using a foreign CoA as the destination address and the CN 150 has occurred, by referring to the home network connection information, it is possible to select an address for the transmission to the interface connected to the home network, from the binding information related to that HoA.

Thus, although, usually, there is a need to wait for a binding update message to be transmitted by the MN 100 at a disconnection of communication, the employment of the method described in the third embodiment of the present invention enables simultaneously holding the home network connection information indicative of the connection with the home network and the information on the HoA associated with the foreign CoA, which provides an advantage in that the destination address selection can be conducted on the basis of this information so as to switch the destination in a moment for minimizing the packet loss.

Even if the home CoA has been used as a destination address of a packet to be transmitted to the MN 100, was well as the route optimization using the foreign CoA, the HA can grasp the fact that the packet can be sent directly to the MN 100. In particular, upon receipt of the notification for the registration of the in-connection information from the MN 100 when the HA holds a plurality of CoA association information on the MN 100, since a newly produced entry or entries other than the replaced entry are left intact, the HA can grasp the CoA association information on the MN 100 and the fact that the MN 100 has a home CoA and is in connection with the home network.

In addition, with respect to the destination address selection for a transfer packet addressed to the MN 100, the HA can have a policy for preferentially selecting the transfer to the interface connected to the home network of the MN 100. When the home network connection information according to the present invention is appended to an entry of the binding information, the HA can carry out the destination address selection according to the aforesaid policy.

Figure 29:
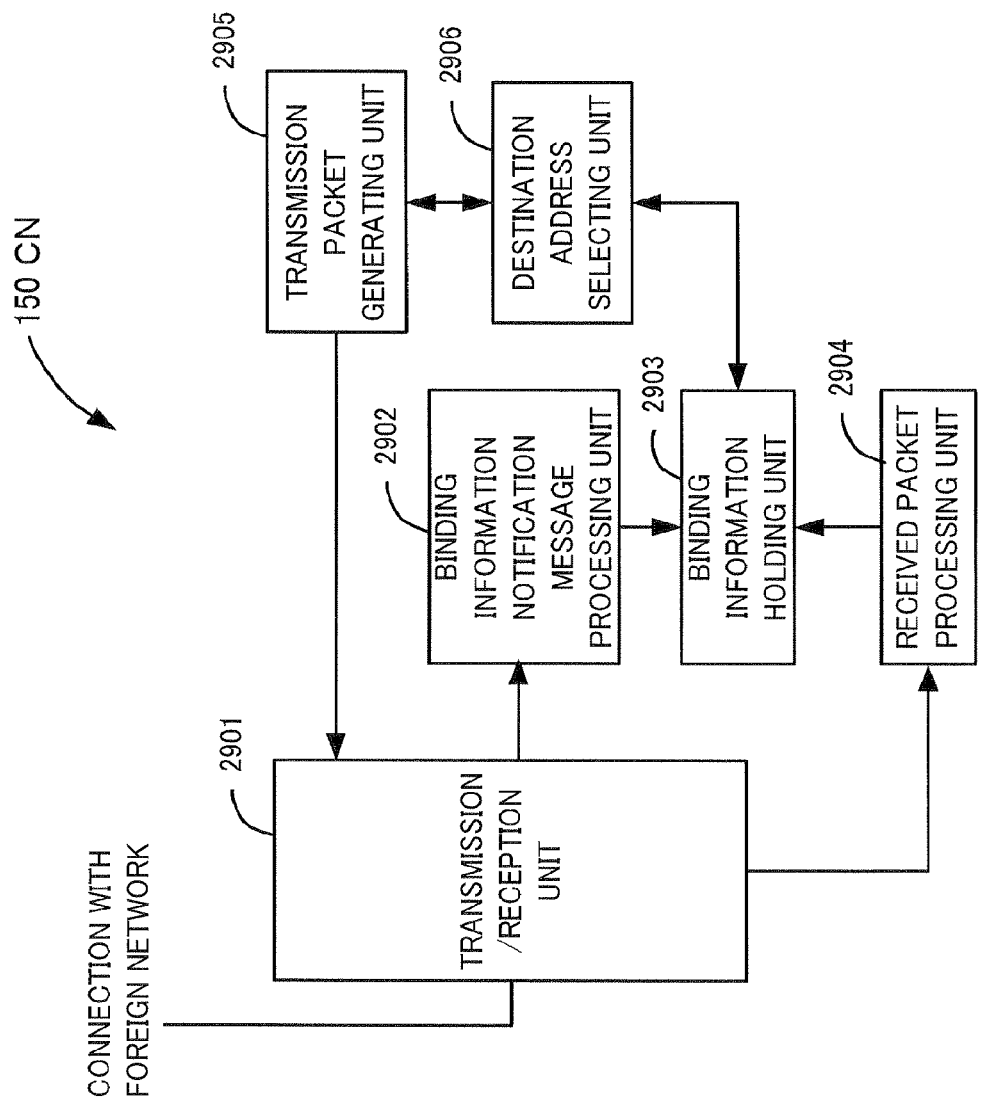
FIG. 29 is a block diagram showing one example of a configuration of a CN according to the third embodiment of the present invention.
Figure 30:
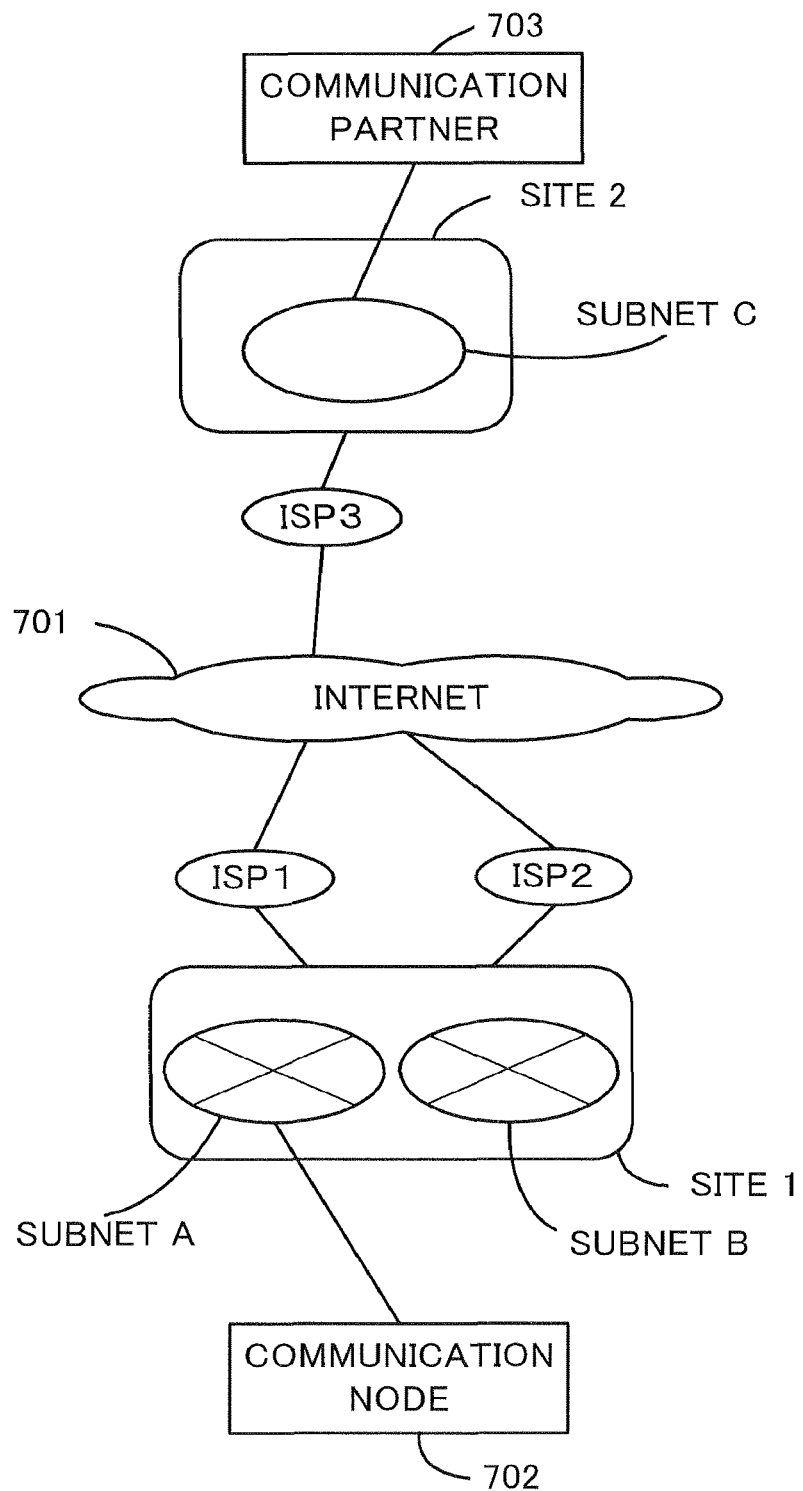
FIG. 30 is an illustration of one example of a configuration of a network for explaining a site multihome according to a conventional technique.
Figure 31:
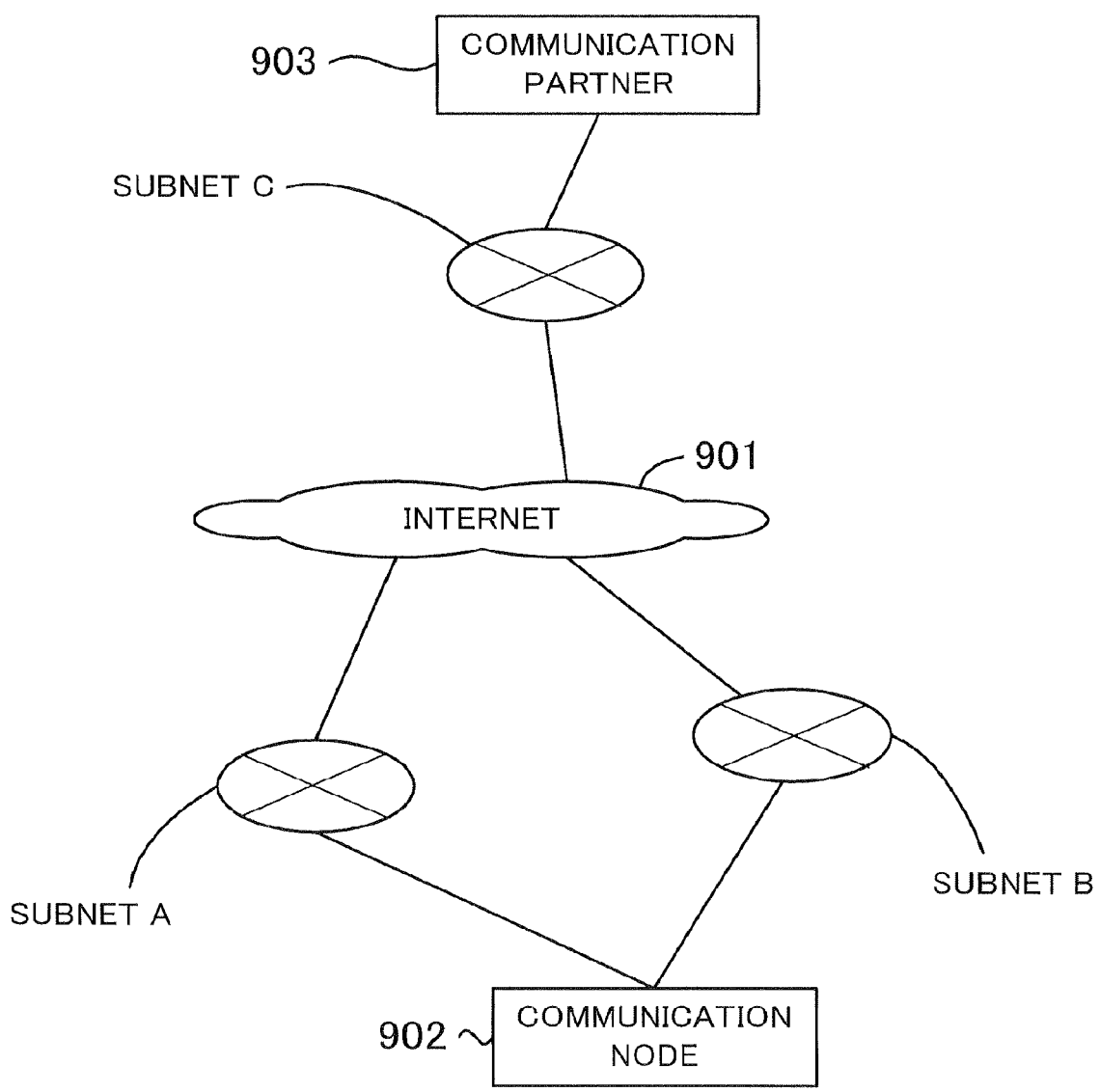
FIG. 31 is an illustration of one example of a configuration of a network for explaining a site multihome according to a conventional technique.

Furthermore, referring to FIG. 29, a description will be given hereinbelow of a configuration of the CN 150 according to the third embodiment of the present invention. FIG. 29 is a block diagram showing one example of a configuration of a CN according to the third embodiment of the present invention. The CN 150 shown in FIG. 29 is composed of a transmission/reception unit 2901, a binding information notification message processing unit 2902, a binding information holding unit 2903, a received packet processing unit 2904, a transmission packet generating unit 2905 and a destination address selecting unit 2906. In FIG. 29, although functions realized in the CN 150 are shown by blocks, these functions are realizable by hardware or software. The transmission/reception unit 2901 is the same as the transmission/reception unit 1801 of the CN 150 shown in FIG. 18, and the description thereof will be omitted.

The binding information notification message processing unit 2902 has a function as the binding information notification message processing unit 2803 of the HA shown in FIG. 28 and further conducts the processing when receiving a binding information notification message excluding the home CoA from the MN 100. In this case, the home CoA inclusion information included in the message signifies the home network connection information. If the in-connection information is included as the home network connection information, the binding information notification message processing unit 2902 recognizes that the MN 100 is in connection with the home network where an HoA which is an object of registration and which is included in the message is valid and gives an instruction so that the binding information holding unit 2903 stores the binding information to which the in-connection information is appended. Even in a case in which the non-connection information is included as the home network connection information, likewise, an instruction is given so that the binding information to which the non-connection information is appended is stored in the binding information holding unit 2903.

In addition, the binding information holding unit 2903 has a function as the binding information holding unit 2804 of the HA shown in FIG. 28 and further has a function to hold the home network connection information excluding the home CoA, handed over from the binding information notification message processing unit 2903. In this case, the home network connection information corresponds to the contents of the home CoA inclusion information included in the message and, when the home network connection information is the in-connection information, the binding information holding unit 2903 holds the binding information to which the in-connection information is appended and, when the home network connection information is the non-connection information, the binding information holding unit 2903 holds the binding information to which the non-connection information is appended.

The transmission packet generating unit 2905 generates a packet to be transmitted to a communication partner and gives an instruction to the destination address selecting unit 2906 for carrying out the address selection by taking into the consideration the binding information held by the binding information holding unit 2903, thereby carrying out the processing (packet conversion processing or the like) on the packet on the basis of the address selected by the destination address selecting unit 2906. If the selected address is a foreign CoA, for the transmission of the packet addressed to the MN 100 through the use of the route optimization based on the mobile IP, the packet conversion is made according to the method specified in the mobile IP and the converted packet is handed over to the transmission/reception unit 2901. On the other hand, also in a case in which the selected address is a home CoA, as well as the case of the foreign CoA, the packet conversion is made according to the method specified in the mobile IP and the converted packet is handed over to the transmission/reception unit 2901. Moreover, when the selected address is an HoA and no home CoA associated with this HoA exists, the packet addressed to the HoA is directly handed over to the transmission/reception unit 2901 without conducting the packet conversion. Still moreover, when the selected address is an HoA and a home CoA associated with this HoA exists, the packet conversion can be made using this home CoA.

Thus, in a case in which the in-connection information (home CoA) is selected as the home network connection information, by generating a packet addressed to the home CoA through the use of a routing header to be utilized in the route optimization based on the mobile IP and transmitting it, the packet can be transmitted directly to the interface connected to the home network of the MN 100. Moreover, it is also acceptable that, instead of the employment of the routing header, the home CoA is set as the destination address and an encapsulated packet is transmitted. On the other hand, in the case of the selection of the binding information on the foreign CoA, the packet can be transmitted to the foreign CoA by means of the route optimization method based on the mobile IP. If the transmission addressed to the HoA is selected in the destination address selection, it is also possible to carry out the encapsulation by use of the home CoA.

The received packet processing unit 2904 is for processing a packet received from the MN 100. In a case in which the received packet is a packet converted for the route optimization based on the mobile IP, for restoring the converted packet into the original packet, the received packet processing unit 2904 checks whether or not the information on the HoA is held in the binding information holding unit 2903. If the check shows that the CoA identical to the CoA used in the packet is held as the CoA association information on that HoA and this CoA is registered as the home CoA, it is possible to recognize that the received packet is a packet transmitted from the interface connected to the home network of the MN 100. On the other hand, when this CoA is registered as a foreign CoA, it is possible to recognize that the received packet is a packet transmitted from the interface connected to the foreign network and transmitted through the use of the normal route optimization based on the mobile IP.

Even if the received packet is a normal packet, the received packet processing unit 2094 can confirm whether or not the information on the address set as the source address of this packet is held in the binding information holding unit 2903. If the confirmation result shows that the home network connection information on the address is held in the binding information holding unit 2903, the received packet processing unit 2094 can recognize that the address is the HoA of the MN 100 and the packet is a packet transmitted from the interface connected to the home network of the MN 100.

As well as the above-mentioned case of the HA, in a state where the CN 150 holds an entry of a predetermined communication partner in the binding information holding unit 2903 in advance, upon receipt of a binding information notification message (including information for specifying an object of replacement) for making a request for the replacement of the home network connection information or the CoA association information on the foreign CoA from the communication partner, the binding information notification message processing unit 2902 gives an instruction to the binding information holding unit 2903 for the replacement with the notified home network connection information or CoA association information.

Upon receipt of an instruction from the transmission packet generating unit 2905, the destination address selecting unit 2906 selects a destination address for a packet generated by the transmission packet generating unit 2905. When the destination address of the packet generated by the transmission packet generating unit 2905 is the HoA of the MN 100, the destination address selecting unit 2906 retrieves an entry in which the binding information on this HoA is stored and selects one from the CoA association information or home network connection information held in the entry. In a case in which both the home network connection information and CoA association information on the MN 100 are held in the binding information holding unit 2903, the destination address selecting unit 2906 can recognize that the MN 100 is in connection with the home network and the CoA associated with this HoA is also held therein.

Incidentally, in the case of using a function for managing a plurality of addresses notified by the MN 100 and mapping these addresses into the IDs (addresses) to be notified to an upper layer, the destination address selecting unit 2906 can play a role as an address selecting unit for this function. Even if the mapping function exists, it can function as a destination address selecting unit independent of this function.

In addition, with respect to the selection of a destination address of a packet to be transmitted to the MN 100, the CN 150 can hold a policy for preferentially selecting the transmission to the interface connected to the home network of the MN 100. When the home network connection information according to the present invention is added to an entry of the binding information, the CN 150 can carry out the destination address selection according to the aforesaid policy.

If only the CoA association information on the foreign CoA is held, the destination address selecting unit 2906 can recognize that the MN 100 is in connection with the foreign network and the address acquired therein can be used as a CoA. Moreover, when only the home network connection information is held, the destination address selecting unit 2906 can recognize that the MN 100 is in connection with the home network and a direct communication is feasible through the use of the interface connected to the home network. Still moreover, if neither home network connection information nor the CoA association information are held, the transmission to the HoA is selected. In this case, the packet transmission is made in a state where difficulty is encountered in making a judgment as to whether the MN 100 is connected to the home network or it is in connection with the foreign network and the CoA association information is not registered. At this time, for making clear which of these cases has taken place, for example, the CN 150 can issue a request for the transmission of a binding information notification message to the communication partner. In addition, upon receipt of the information (the aforesaid HA use-inhibition information) on a request for inhibiting the communication through a specified HA from the MN 100, for example, the CN 150 holds this HA use-inhibition information in the binding information holding unit 2903 in a state associated with the corresponding CoA association information, and the destination address selecting unit 2906 can select a CoA with respect to the entry where the HA use-inhibition information exists.

As described above, the CN 150 shown in FIG. 29 can acquire the binding information on the MN 100 and can hold the information (home network connection information) on the connection status of the MN 100 to the home network. Moreover, simultaneously with the home network connection information, it can hold the CoA association information where the address allocated to a different interface connected to a different network is associated as a foreign CoA.

In consequence, in the destination address selection at the transmission of a packet to the MN 100, the CN 150 can preferentially select the transmission to the interface connected to the home network of the MN 100. Moreover, when both the in-connection information and CoA association information on the MN 100 are registered, for example, at the occurrence of a disconnection of communication between the CN 150 and the MN 100 using the home CoA of the MN 100, the CN 150 can select the CoA associated with that HoA as a destination address and can achieve prompt recovery of the communication by making the switching to the communication using the route optimization based on the mobile IP.

When recognizing a plurality of HoAs held by the MN 100, the CN 150 can preferentially select, from these plurality of HoAs, an HoA valid in the home network with which the MN 100 is in connection, as an address of the MN 100 to be used for the communication. At this time, when the home CoA is associated with this HoA, it is possible to use the home CoA as the destination address of a packet to be transmitted actually, through the use of the routing header or the encapsulation. Incidentally, the CN 150 can directly transmit the packet addressed to the HoA without making a conversion into a packet using the home CoA.

Conversely, in the case of a disconnection of communication between the MN 100 using the foreign CoA as a destination address and the CN 150 or in other cases, by referring to the home network connection information, it is possible to select an address to be transmitted to the interface connected to the home network, from the binding information related to that HoA. Thus, although usually there is a need to wait for a binding update message to be transmitted from the MN 100 at the disconnection of the communication, by using the method described in the third embodiment of the present invention, it is possible to simultaneously hold the home network connection information indicative of the connection with the home network and the information on the HoA associated with the foreign CoA, which provides an advantage of enabling the switching of the destination in a moment by carrying out the destination address selection on the basis of this information, thereby minimizing the packet loss.

In addition, even in a case in which the HoA is used as a destination address of a packet to be transmitted to the MN 100, as well as the route optimization using the CoA, the CN 150 can grasp the fact that the packet can be directly sent to the interface connected to the home network of the MN 100. In particular, in a case in which the CN 150 holds a plurality of CoA association information on the MN 100, when the CN 150 receives a notification for the registration of the in-connection information from the MN 100, a newly produced entry or the entries other than the replaced entry are left intact, the CN 150 can grasp the CoA association information on the MN 100 and the fact that the MN 100 is in connection with the home network.

Still additionally, even in a case in which the CN 150 receives a notification for the registration of the non-connection information from the MN 100, as well as the case of the in-connection information, since the entries other than the registered entry are left intact, the CN 150 can seize the CoA association information on the MN 100 and the fact that the MN 100 is not in connection with the home network. Yet additionally, even in a state where only the home network connection information is registered, the CN 150 can make discrimination as to whether the MN 100 is in connection with the home network or it is in connection with the foreign network.

Moreover, in a case in which a policy for the destination address selection or the like is appended with respect to the CoA association information on the foreign CoA of the MN 100 registered and the home network connection information, by making reference to and making a comparison with the home network connection information together with a policy of another CoA association information, it is possible to carry out the address selection based on the policy. Even if the HA of the MN 100 is a communication partner of the MN 100, it is possible to provide the advantages similar to those in a case in which the aforesaid CN 150 is a communication partner of the MN 100.

Furthermore, a brief description will be given hereinbelow of a concrete operation according to the third embodiment of the present invention. For example, as shown in FIG. 7, let it be assumed that, when the MN 100 is in connection with both the home network 1 and the foreign network 1, the MN 100 makes a communication with the CN 150. In this case, as mentioned above, the information shown in FIG. 27B is notified from the MN 100 through a binding information notification message to the HA1, and the HA1, which has acquired this information and which has proxy-received a packet transmitted from the CN 150 to the HoA of the MN 100, transmits the packet not only to the interface connected to the foreign network 1 but also to the interface connected to the home CoA, which enables it to be also transmitted to the interface connected to the home network 1 of the MN 100.

In addition, in a case in which the MN 100 notifies, to the CN 150, the information shown in FIG. 27B through the use of a binding information notification message, the CN 150 can select one of the HoA1, home CoA and CoA1 of the MN 100 as a destination address of a packet to be transmitted to the MN 100. When the HoA1 or the home CoA is selected, the packet is directly delivered to the interface connected to the home network of the MN 100. On the other hand, in the case of the selection of the CoA1, the packet is sent directly to the CoA1 through the use of the route optimization based on the mobile IP.

As described above, the HA shown in FIG. 28 and the CN 150 shown in FIG. 29 can acquire the binding information (for example, information shown in FIGS. 27A to 27D) on the MN 100 and can hold the information (home network connection information) on the connection status of the MN 100 to the home network. Moreover, they can hold the CoA association information, where the address allocated to a different interface connected to another network is associated as a foreign CoA, simultaneously with the home network connection information and, by referring to this information, they can see the state as to whether the MN 100 is in connection with the home network or is not in connection therewith so as to carry out the destination address selection on the basis of this information. Moreover, when the non-connection information is registered, the HA and/or the CN 150 can recognize the fact that the MN 100 can generate/notify further CoA association information, which provides a basis for a request for this information to the MN 100.

Furthermore, with respect to the home network connection information described in the embodiments of the present invention, a description will be given hereinbelow of an example of an operation by taking into consideration a connection mode before the movement of the MN 100 holding two interfaces (IF1 and IF2). In this case, let it be assumed that the MN 100 has an HoA allocated from a home network and the two interfaces are connectable to one of the home network and a foreign network.

OPERATION EXAMPLE 1

First, a description will be given of an operation example 1. The IF1 of the MN 100 is in connection with the home network, and a home CoA generated in the home network is registered in an HA as a transfer destination of a packet addressed to an HoA and the in-connection information constituting the home network connection information is appended to the home CoA. Moreover, the IF2 is in connection with a foreign network, and a normal CoA is registered as binding information relative to the HoA. Although the following description will be given on the basis of a method of using the home CoA as a transfer destination, if the HA can conduct a direct transfer to the MN 100 with the HoA being set as a destination without employing the method using the home CoA, it is also possible to use this method, or it is also acceptable to realize the packet transfer to the HoA by means of a combination of these methods. In a case in which the HA employs the method of carrying out the direct transfer in a state where the HoA is set as a destination, it is preferable that the in-connection information is appended to the HoA.

In the above-mentioned connection state, if the IF1 connected to the home network is switched to be connected to the foreign network, the MN 100 transmits a message for deleting the in-connection information on the IF1 and the home CoA registered as a transfer destination of a packet addressed to the HoA. At this time, the normal CoA generated/acquired in the foreign network is registered as a transfer destination of a packet addressed to a new HoA on the IF1.

On the other hand, in the above-mentioned connection state, if the IF2 connected to the foreign network is switched to be connected to the home network, the MN 100 registers the in-connection information as the home network connection information on the IF2 in the HA. At this time, the home CoA generated/acquired in the home network is registered as a transfer destination of a packet addressed to the HoA. Thus, since both the interfaces of the MN 100 after the movement are connected to the same home network and the in-connection information is registered with respect to each of the interfaces, the HA can grasp the fact that the MN 100 registers the two interfaces in the HoA as a transfer destination of a packet addressed to the HoA and both the interfaces are in connection with the home network.

OPERATION EXAMPLE 2

Secondly, a description will be given of an operation example 2. Both the IF1 and IF2 are connected to the home network and home CoAs generated/acquired in the home network are registered as transfer destinations of a packet addressed to an HoA with respect to the respective interfaces and the in-connection information constituting the home network connection information is appended to both the home CoAs.

In the above-mentioned connection status, when the IF1 is switched to be connected to the foreign network, the MN 100 transmits a message for deleting the in-connection information on the IF1 and the home CoA registered as the transfer destination of the packet addressed to the HoA. At this time, a normal CoA generated/acquired in the foreign network is registered as a transfer destination of a packet directed to a new HoA on the IF1.

On the other hand, in the above-mentioned connection status, when the IF2 is switched to be connected to the foreign network, likewise, the MN 100 transmits a message for deleting the in-connection information on the IF2 and the home CoA registered as the transfer destination of the packet addressed to the HoA1, and a normal CoA is registered as a transfer destination of a packet directed to a new HoA on the IF2.

OPERATION EXAMPLE 3

Furthermore, a description will be given of an operation example 3. Both the IF1 and IF2 are connected to the foreign network, and normal CoAs are registered as transfer destinations of packets directed to HoAs on the IF1 and the IF2 with respect to the HA.

In the above-mentioned connection status, when the IF1 is switched to be connected to the home network, the MN 100 registers a home CoA, generated/acquired in the home network, in the HA as a new transfer destination of a packet directed to the HoA, and appends the in-connection information constituting the home network connection information thereto.

On the other hand, in the above-mentioned connection status, when the IF2 is switched to be connected to the home network, likewise, the MN 100 registers the in-connection information on the IF2 and a home CoA as a new transfer destination of a packet directed to the HoA.

As described above, the MN 100 becomes capable of notifying the home network connection information according to a network with which each interface is in connection and, by registering the home CoA, becomes capable of designating a transfer destination of a packet directed to the HoA which has been proxy-received by the HA. Incidentally, even in a case in which the MN 100 utilizes three or more interfaces, each of the interfaces can carry out the processing similar to those in the above-mentioned cases. That is, in a case in which the interface connected to the home network exists among the interfaces of the MN 100 and this interface is used as a transfer destination of a packet addressed to the HoA, the home network connection information is notified as the information on that IF.

In a case in which the HA employs a method of making a comparison between the HoA which is an object of registration and the CoA included as an address associated with the HoA so that, when the prefixes of both the addresses (HoA and CoA) are the same as each other, an interpretation is made as this message is a message for notifying the in-connection information, in the operation in the above-mentioned case using the home CoA, there is no need for the MN 100 to append the in-connection information on the interface connected to the home network and, on the basis of a result of the comparison between the prefixes by the HA, a judgment is made as to whether or not it is in connection with the home network.

In addition, it is also appropriate that an MN switches a home network connection information notification method according to a handling situation of an HA and a situation of the MN. Conversely, it is also acceptable that the HA switches a home network connection information processing method and a method of transferring a packet addressed to an HoA to the MN which is a transfer destination according to the handling situation of the MN. For example, in the case of the utilization of two interfaces or in the case of taking into consideration an overhead for the generation/acquisition of a home CoA, it is possible to employ a method in which an HoA is allocated to one interface and a neighbor cache related to this HoA is registered in only the HA while a CoA or a home CoA is allocated to the other interface and this address is associated with the HoA. In the case of the employment of this method, when the HA transfers a packet addressed to the HoA, it proxy-receives, to the interface connected to the home network of the MN 100, the HA transfers the packet intact without carrying out the encapsulation.

Still additionally, although the in-connection information to be notified by the MN 100 is valid information in a case in which the interface in a state connected and the other interface are simultaneously used with respect to the HoA valid in the home network in a state connected, as mentioned below, in a case in which a plurality of addresses are usable in the home network, it is effectively available.

If there is an interface connected to a home network (site multihomed network) where a plurality of different prefixes are valid, the MN 100 allocates its own HoA to this interface and further allocates an address, generated/acquired using a prefix other than the prefix used in this HoA, to a different interface. Following this, the MN 100 associates this address as a CoA with the HoA and further appends the in-connection information to both the HoA and CoA and registers them in a CN.

In the case of normal binding information to which no in-connection information is appended, the CN makes a judgment that the address registered as a CoA is an address in a foreign network while, when the in-connection information is appended thereto, the CN can recognize that both the addresses of the HoA and CoA are addresses allocated to the interfaces connected to the home network where the HoA is valid and, hence, it can grasp an accurate connection status of the MN 100. Moreover, the CN can selectively use the HoA and the CoA as a destination of a packet to be transmitted to the MN 100 on the basis of the connection status of the MN 100 so as to switch the ISP through which the packet passes, which enables providing the site multihome effect.

In addition, in the above-mentioned case of the simultaneous employment of the interface connected to the home network where a plurality of different prefixes are valid and a different interface, the MN 100 generates home CoAs by using prefixes including the prefix used in the HoA with respect to the interface connected to the home network and appends the in-connection information to the respective home CoAs before registering them. This is for registering the address of a different interface as a CoA in the HA, with the same information being registered in the CN. Incidentally, without notifying, to the HA, all the home CoAs generated using the prefixes in the home network, it is also acceptable to notify one of the home CoAs thereto.

The contents described in the first to third embodiments of the present invention are also applicable to the NEMO (Network Mobility) which is a technology for realizing the mobile transparency of a network. In this case, as well as the case of the MN mentioned above, the home network connection information on a mobile router (MR) can be notified to an HA and/or a CN, and the HA and/or the CN are capable of holding the received home network connection information in a manner similar to the above-mentioned method for the MN. The HA and/or the CM according to the NEMO hold, as information on a prefix managed by the MR, information (for example, HoA) which enables specifying the MR relative to this prefix in a state associated and, hence, as well as a case of specifying the CoA association information on the MR associated with the prefix, they can specify the home network connection information on the MR associated with the prefix. It is also appropriate that the home network connection information is held separately from the information, which is for specifying a different MR, in a state associated with the prefix itself, or that the home network connection information is appended to an entry on the prefix information already associated with the information specifying the MR and held in this state. In this case, without referring to the CoA association information on the MR, it is possible to specify the home network connection information on the MR by only referring to the prefix.

Furthermore, the contents described in the first to third embodiments of the present invention are also applicable to the MIPv4 (IP Mobility Support for IPv4) constituting the mobile IP handling the IPv4, and they are also applicable to a case of the utilization of the FMIP (Fast Handovers for Mobile IPv6) or HMIP (Hierarchical Mobile IPv6 mobility management).

The respective functional blocks used in the above description of the first and third embodiments of the present invention are typically realized with an LSI (Large Scale Integration) which is an integrated circuit. It is also acceptable that these functional blocks are individually formed as one chip, or that a portion of or all of these functional blocks are formed as one chip. Although an LSI is taken in this case, it is sometimes referred to as an IC (Integrated Circuit), system LSI, super LSI or ultra LSI according to the level of integration.

Moreover, the technique for the formation of an integrated circuit is not limited to the LSI, but it is also realizable with a dedicated circuit or a general-purpose processor. After the manufacturing of the LSI, it is also acceptable to utilize an FPGA (Field Programmable Gate Array) which enables the programming or a reconfigurable processor which allows the reconfiguration of connections and setting of circuit cells in the interior of the LSI.

Still moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

According to the present invention, an MN has one or a plurality of HoAs and notifies a status of connection with a network, corresponding to the one HoA or each of the plurality of HoAs, to an HA and/or a CN, which provides an advantage of enabling the HA and/or the CN to select an appropriate destination address. Even in a case in which an MN has a plurality of HoAs and several HoAs of these HoAs are managed by the same HA, it is possible to provide an advantage of enabling the HA and/or the CN to select an appropriate HoA and the CN to make an efficient inquiry at the HA by notifying appropriate information to the HA and/or the CN. The present invention is applicable to a technique related to communication using the IP and to a technique for realizing both the multihome function and mobile function.

The invention claimed is:

1. A mobile node comprising:
a plurality of communication interfaces operable to connect to a home network and a foreign network;
a processor which generates a binding update message when at least one of the plurality of communication interfaces is additionally connected to the home network while another communication interface is already connected to the foreign network, wherein a mobility option having a flag is included in the generated binding update message and a care-of address field in the generated binding update message is set to a home address of the mobile node; and
a transmission controller which, in operation, controls transmission of the generated binding update message to a communication node.

2. The mobile node according to claim 1, wherein the mobility option includes an identifier of a binding indicated by the binding update message.

3. The mobile node according to claim 1, wherein the binding update message includes an address of the communication interface already connected to the foreign network.

4. The mobile node according to claim 1, wherein the communication node is a home agent of the mobile node.

5. A communication control method comprising:
a mobile node generating a binding update message when at least one of a plurality of communication interfaces of the mobile node is additionally connected to a home network while another communication interface is already connected to a foreign network, wherein a mobility option having a flag is included in the generated binding update message and a care-of address field in the generated binding update message is set to a home address of the mobile node; and
the mobile node transmitting the generated binding update message to a communication node.

6. The communication control method according to claim 5, wherein the mobility option includes an identifier of a binding indicated by the binding update message.

7. The communication control method according to claim 5, wherein the binding update message includes an address of the communication interface already connected to the foreign network.

8. The communication control method according to claim 5, wherein the communication node is a home agent of the mobile node.

* * * * *